(12) United States Patent
Nagata et al.

(10) Patent No.: US 6,882,378 B2
(45) Date of Patent: Apr. 19, 2005

(54) ACTIVE-MATRIX-TYPE LIQUID CRYSTAL DISPLAY PANEL AND METHOD OF INSPECTING THE SAME

(75) Inventors: Hisashi Nagata, Nara (JP); Takayuki Shimada, Yamatokoriyama (JP); Yasunobu Akebi, Yamabe-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 58 days.

(21) Appl. No.: 10/621,559

(22) Filed: Jul. 18, 2003

(65) Prior Publication Data

US 2004/0017531 A1 Jan. 29, 2004

Related U.S. Application Data

(62) Division of application No. 09/276,524, filed on Mar. 25, 1999, now Pat. No. 6,624,857.

(30) Foreign Application Priority Data

Mar. 27, 1998 (JP) .............................................. 10-82019
Mar. 17, 1999 (JP) .............................................. 11-72641

(51) Int. Cl.[7] ..................... G02F 1/1333; G02F 1/1343

(52) U.S. Cl. .......................... 349/54; 349/139; 349/192

(58) Field of Search ........................... 349/54–55, 139, 349/151, 192

(56) References Cited

U.S. PATENT DOCUMENTS

| | | | | |
|---|---|---|---|---|
| 5,506,516 A | * | 4/1996 | Yamashita et al. | 324/770 |
| 5,576,730 A | * | 11/1996 | Shimada et al. | 345/98 |
| 6,100,865 A | * | 8/2000 | Sasaki | 349/92 |
| 6,127,998 A | * | 10/2000 | Ichikawa et al. | 345/100 |
| 6,342,931 B1 | | 1/2002 | Nagata et al. | |

FOREIGN PATENT DOCUMENTS

| | | | |
|---|---|---|---|
| JP | 60-2989 | A | 1/1985 |
| JP | 3-20721 | A | 1/1991 |
| JP | 3-142499 | A | 6/1991 |
| JP | 5-4137 | U | 1/1993 |
| JP | 05-005866 | | 1/1993 |
| JP | 05-307192 | | 11/1993 |
| JP | 06-051347 | | 2/1994 |
| JP | 06-186586 | | 7/1994 |
| JP | 7-5481 | A | 1/1995 |
| JP | 7-333275 | A | 12/1995 |
| JP | 08-101397 | | 4/1996 |
| JP | 09-297321 | | 11/1997 |
| JP | 10-026750 | | 1/1998 |
| JP | 11-338376 | | * 12/1999 |

OTHER PUBLICATIONS

Japanese Office Action mailed Oct. 5, 2004 (w/English translation).

* cited by examiner

*Primary Examiner*—Dung Nguyen
(74) *Attorney, Agent, or Firm*—Nixon & Vanderhye P.C.

(57) ABSTRACT

Data-line inspection-use switching elements for switching the supply of inspection-use display signals are individually connected to a plurality of data lines, and scanning-line inspection-use switching elements for switching the supply of inspection-use scanning signals are individually connected to a plurality of scanning lines. The data-line inspection-use switching elements connected to the data lines are connected to an inspection-use display signal line for supplying the inspection-use display signals to the data-line inspection-use switching elements. Meanwhile, three data-line inspection-use control signal lines for inputting control signals for switching on/off the data-line inspection-use switching elements are provided in correspondence with the display colors. It is thus possible to provide an active-matrix-type liquid crystal display panel which enables an inspection with higher accuracy by performing a monochromatic display, without increasing unnecessary regions and increasing processes and defective units by cutting such regions, and enables the prevention of the outflow of the defective units and the reduction of the production cost.

10 Claims, 30 Drawing Sheets

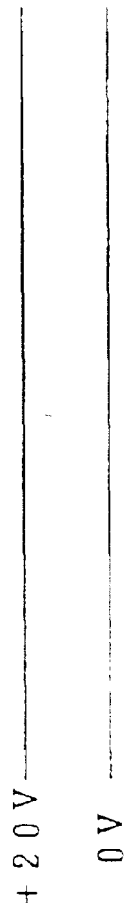
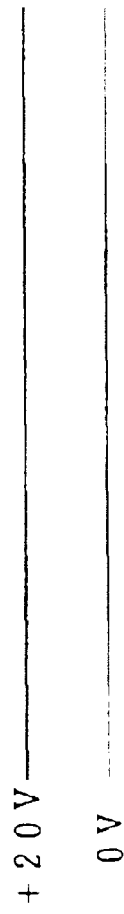
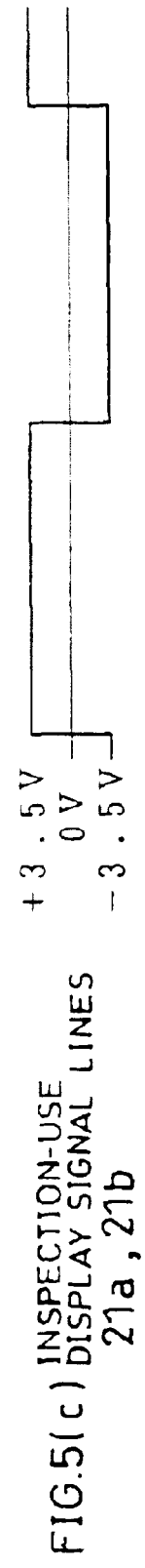
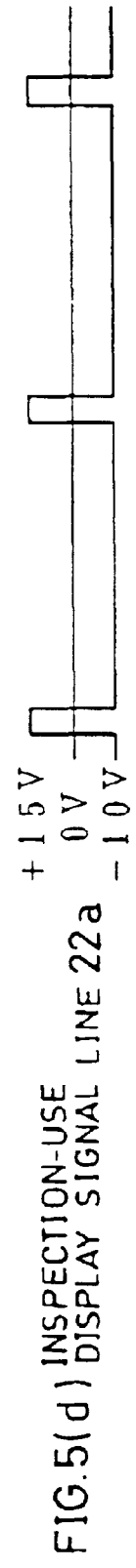
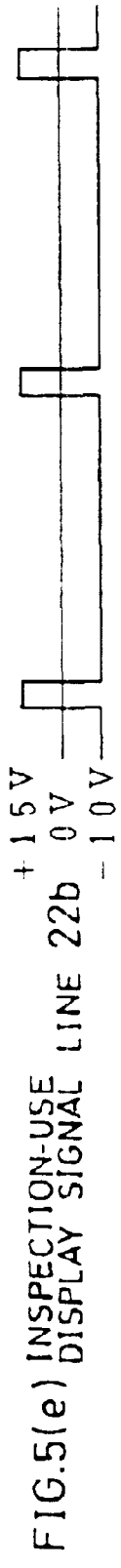
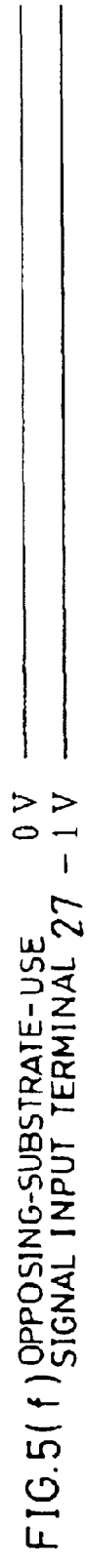
FIG.5(a) INSPECTION-USE DISPLAY SIGNAL LINE 24 +20V / 0V
FIG.5(b) INSPECTION-USE DISPLAY SIGNAL LINE 25 +20V / 0V
FIG.5(c) INSPECTION-USE DISPLAY SIGNAL LINES 21a, 21b +3.5V / 0V / −3.5V
FIG.5(d) INSPECTION-USE DISPLAY SIGNAL LINE 22a +15V / 0V / −10V
FIG.5(e) INSPECTION-USE DISPLAY SIGNAL LINE 22b +15V / 0V / −10V
FIG.5(f) OPPOSING-SUBSTRATE-USE SIGNAL INPUT TERMINAL 27 0V / −1V

ACTIVE-MATRIX-TYPE LIQUID CRYSTAL DISPLAY PANEL AND METHOD OF INSPECTING THE SAME

This is a division of application Ser. No. 09/276,524 filed Mar. 25, 1999, now U.S. Pat. No. 6,624,857.

FIELD OF THE INVENTION

The present invention relates to an active-matrix-type liquid crystal display panel for applying driving signals to pixel electrodes through switching elements and performing a display by an electric potential difference between an opposing electrode and the pixel electrodes. The present invention also relates to a method of inspecting such an active-matrix-type liquid crystal display panel.

BACKGROUND OF THE INVENTION

A conventional liquid crystal display device includes a plurality of pixel electrodes arranged in a matrix form, an opposing electrode as a common electrode provided so as to face the pixel electrodes, and liquid crystal as display medium provided between the pixel electrode and the opposing-electrode. Such a liquid crystal display device performs a display in the following manner. Namely, an electric potential is selectively written into the pixel electrode, and an optical modulation of the liquid crystal provided between the pixel electrode and the opposing electrode is taken place by the electric potential difference between the pixel electrode and the opposing electrode, and visually recognized as a display pattern.

As a method of driving the pixel electrode, a so-called active matrix driving method is known. In this method, the pixel electrodes provided in the matrix form are each connected to switching elements, and each of the pixel electrodes is driven by the switching element. General switching elements are a TFT (thin film transistor), a MIM (metal-insulator-metal) element, etc.

An active-matrix-type liquid crystal display panel provided in an active-matrix-type liquid crystal display device includes an active matrix substrate and an opposing substrate. In the active matrix substrate, a plurality of scanning lines and a plurality of data lines are provided on a transparent insulating substrate so as to cross each other, and a pixel electrode and a switching element for driving the pixel electrode are formed at each intersection of the scanning line and the data line. In the opposing substrate, an opposing electrode is formed oh a transparent insulating substrate. The active matrix substrate and the opposing substrate are provided with alignment films on their surfaces where the two substrates face each other, and adhered to each other with a liquid crystal layer therebetween.

FIG. 28 shows the structure of each pixel of the active matrix substrate using the TFT as the switching element. A gate electrode of a pixel TFT 1 is connected to a scanning line 2, and the pixel TFT 1 is driven by a scanning signal inputted to the scanning line 2. A source electrode of the pixel TFT 1 is connected to a data line 3, and a display signal is inputted to the data line 3. A drain electrode of the pixel TFT 1 is connected to a pixel electrode 14 and one terminal of an auxiliary capacity, through an auxiliary capacity electrode 28. The other terminal of the auxiliary capacity is connected to an auxiliary capacity wiring 4, and then connected to the opposing electrode on the opposing substrate when a liquid crystal cell is constructed. The pixel TFT 1 and the pixel electrode 14 are provided in the matrix form on the insulating substrate.

FIG. 29 shows one example of the structure of the cross section of the active matrix substrate. A gate electrode 8, a gate insulating film 9, a semiconductor layer 10, a $n^+$-Si layer 11 to be the source and drain electrodes, a metal layer 12 to be the data line 3, an interlayer insulating film 13, and a transparent conductive layer to be the pixel electrode 14 are formed in this order on an insulating substrate 7. The pixel electrode 14 is connected to the drain electrode of the pixel TFT 1 through a contact hole 15 piercing the interlayer insulating film 13, specifically through the auxiliary capacity electrode 28.

In the structure shown in FIG. 29, the interlayer insulating film 13 is formed between the scanning line 2 (the same layer as the gate electrode 8) and the pixel electrode 14 and between the data line 3 and the pixel electrode 14. Therefore, the pixel electrode 14 can be arranged to overlap the data line 3. It is known that such an arrangement can improve the aperture ratio, and reduce an alignment defect of liquid crystal by shielding the electric field resulting from the data line 3.

Next, the process thereafter will be explained with reference to FIG. 30. FIG. 30 is a schematic plan view of a conventional active-matrix-type liquid crystal display device. This view shows the state after a large substrate is divided into cells, each of which corresponds to a display device. In the actual process, the cells are often produced in the state where several cells are arranged in rows and columns.

On a viewing area (within the two-dot chain lines) 17 of a completed active matrix substrate 50, an alignment film of the polyimide family is deposited, and the alignment function is added by a treatment such as rubbing. In an opposing substrate 51, a transparent opposing electrode (not shown) such as ITO (Indium Tin Oxide) is deposited, and then the part corresponding to the viewing area 17 is subjected to the same treatment.

A sealing material (not shown) is applied to the surrounding section of the liquid crystal display panel except for a liquid crystal injection port in such a manner as to surround the panel by the printing method, etc. Further, a conductive material 19 is attached onto an opposing-substrate-use signal input terminal 27 on the active matrix substrate 50. Thereafter, a spacer (not shown) for keeping the cell thickness of the liquid crystal layer uniform is sprayed. Then, the active matrix substrate 50 is adhered to the opposing substrate 51, and the sealing material is fixed by adding heat.

Thereafter, liquid crystal is injected through the liquid crystal injection port, and the liquid crystal injection port is closed with an end-sealing material, thereby completing the panel section of the liquid crystal display device. Then, packaging members such as a source driver 20a for applying a display signal to each data line 3, a gate driver 20b for applying a scanning signal to each scanning line 2, a control circuit (not shown), and a backlight (not shown) are installed, thereby completing the liquid crystal display device. Note that the liquid crystal display device shown in FIG. 30 is not provided with the auxiliary capacity wiring 4.

By the way, the inspection of such a liquid crystal display device usually includes an optical inspection performed in each step of the process, an electrical inspection performed in the step where the active matrix substrate is completed, and a dynamic operating inspection and the electrical inspection, performed at the time when the panel section on which the packaging members such as the driver are not yet installed is completed.

Such inspections are performed so as to prevent materials and operations from being wasted by leaving defective parts in the subsequent process. When a deficiency exists in a device, the device is discarded at this time or repaired by means of laser, etc.

However, with the recent improvement of the production technique, the liquid crystal display panel has achieved ever higher definition, and accordingly a higher technique has been required also in the inspection process.

Specifically, since the terminals for inputting the signals to the data lines 3 and the scanning lines 2 are installed with increasingly smaller pitches, when supplying the signals by bringing the respective terminals into electric contact with pins, a prober of extremely high definition and high cost must be prepared. In addition, there is a case where existence of fine dust on the terminals in the inspection interferes with normal dynamic operations, and the defective inspection is recognized as a deficiency of the panel by mistake. In order to avoid such a case, the inspection must be performed in very clean environments. Consequently, a rise in the total cost has been unavoidable.

In order to realize an easier inspection, the liquid crystal display device shown in FIG. 30 has the following structure. Specifically, this liquid crystal display device includes inspection-use display signal lines 52a, 52b and 52c for connecting the data lines 3 which supply the same signal in the inspection with each other, and inspection-use scanning signal lines 53a and 53b for connecting the scanning lines 2 which supply the same signal in the inspection with each other. The inspection-use display signal lines 52a, 52b, 52c and the inspection-use scanning signal lines 53a, 53b are cut off by dicing the substrate along cutting lines L after the inspection or electrically separated by means of laser cutting, etc. in general (for example, as disclosed in the Japanese Publication of Unexamined Patent Application No. 005481/1995 (Tokukaihei 07-005481; published on Jan. 10, 1995)).

However, this method produces another problem that the number of processes is increased because of the cutting process. Moreover, defective units may be newly generated due to fragments of the wiring pattern and scrap pieces of glass, produced by cutting the substrate. In addition, the area to be cut on the large substrate is wasted in the case of dicing, which is disadvantageous in the number of panels to be obtained.

Further, cutting the substrate may produce a static electricity, thereby possibly causing the switching element to be broken by the static electricity.

For example, a method for avoiding the increase of the number of processes for cutting the substrate was devised. In this method, instead of completely bringing the lines for sending the same signal into electric conduction, switching elements such as TFTs are provided for the lines, and signals for switching on the switching elements are supplied as necessary in the inspection, thereby achieving the same effect as the method where the lines are connected to each other.

For example, the method disclosed in Japanese Publication of Unexamined Patent Application No. 142499/1991 (Tokukaihei 03-142499; published on Jun. 18, 1991) is one of the methods in which the signals are supplied to the scanning lines and the data lines through the switching elements. In this method, signals are subsequently supplied through the switching elements in the state where the substrate is still a large substrate, the respective pixels are charged, and the signals are subsequently read out through the switching elements, thereby electrically obtaining defect information in the screen.

Since this method enables the detection of a defective active matrix substrate in the process before adhering the active matrix substrate to the opposing substrate, it is advantageous in that the processes are not wasted. However, since it is necessary to accurately readout the extremely small electric signals especially when detecting dot defects, this method has many difficult problems including the design of a sense amplifier, the circuit sequence, and the optimization of the balance between the time constant and the readout time of the pixel TFT. In addition, especially in the detection of display unevenness and a low lit defect, the result obtained by the electrical inspection was much different from that of the inspection where the display is actually performed.

In order to solve the problems, the liquid crystal display panel disclosed in Japanese Publication of Unexamined Patent Application No. 333275/1995 (Tokukaihei 07-333275; published on Dec. 22, 1995) is arranged so that the signals are supplied through the switching elements in the same manner, and the dynamic operating inspection can be performed as conventionally done.

FIG. 31 shows the arrangement of the liquid crystal display panel disclosed in the above publication (Tokukaihei 07-333275). In this structure, five terminals Z1 to Z5 provided near the edge section on the surface of the panel are connected to inspection-use signal lines x1 to x7. Further, TFTs 66 as the switching elements are individually formed for the respective scanning lines 2 between the signal lines x1, x2, x3 and the scanning lines 2, while TFTs 67 are individually formed for the respective data lines 3 between the signal lines x4, x5 and the data lines 3. The signals inputted from the terminals z1 to z5 are sent to pixel sections 60 through the respective TFTs 67 and 66.

With this arrangement, when performing the inspection of the liquid crystal display panel, the panel can be driven by only inputting the inspection signals to the terminals z1 to z5, without supplying the inspection signals to the terminals p of the scanning lines 2 and to the terminals q of the data lines 3 line by line. It is thus possible to save the efforts in the inspection.

However, the structure disclosed in the above publication (Tokukaihei 07-333275) has the following drawbacks in the inspection.

Specifically, as shown in FIG. 31, the inspection-use signal line for supplying the signals to the respective data lines 3 is only x4. Thus, the line defects and the dot defects are detected by performing the monochromatic display of black or white in this inspection.

However, due to the recent improvement of the production technique, the display devices have been required to achieve higher display quality, and strict standards have been provided for the dark defect as well as the luminous dot. The dark defect has several types, and the most frequent one in the normally white method is the defect caused when a leakage occurs between a pixel electrode and the data line 3 which should not supply the signal to the pixel electrode (in general, the data line 3 which supplies the signal to an adjacent pixel). Such a defect is detected when performing the monochromatic display.

In the conventional structure according to the above publication, it is impossible to detect such a dark defect, because different signals cannot be supplied to the adjacent data lines. In recent years when display devices have achieved ever higher definition, with the densification of the pattern and the increase of the pixel number, the defect of this type cannot be neglected.

Further, in the conventional structure disclosed in the above publication, since different signals cannot be supplied to the adjacent data lines, the leakage between the data lines 3 cannot be detected.

In order to detect the leakage defect between the data lines 3, the electrical inspection as well as the visual inspection must be performed. One reason for this is that the line defect is much more serious than the dot defect. Another reason is that there is a danger that the defect which was not detected in the visual inspection due to the variation with time of the leakage part and the temperature characteristics of the leakage current may cause a problem on the market.

In addition, like the liquid crystal display panel disclosed in the above publication (Tokukaihei 07-333275), in the case where the inspection-use signals are supplied to the data lines or the scanning lines through the switching elements, the data lines and the scanning lines must be electrically independent of each other after the liquid crystal display panel is completed. Therefore, when a leakage is caused in the switching element, a deficiency in the display and a malfunction may occur.

Further, when a static electricity enters the wiring for supplying the inspection-use signals to the data lines and the scanning lines through the switching elements, an electrical breakdown may occur between the gate and drain or between the gate and source of the switching elements due to a high voltage, thereby possibly causing the leakage defect mentioned above.

There has conventionally been an active matrix substrate in which a static-electricity breakdown of the substrate is prevented by connecting the data lines or the scanning lines with a resistive element so as to let the static electricity generated in a specific line escape into another line, thereby dispersing the static electricity. However, such an active matrix substrate has such a problem that when supplying the signals to the data lines or the scanning lines through the inspection-use wiring in inspecting the active matrix substrate, a voltage applied to the data lines or the scanning liens is decreased by a voltage drop in the inspection-use wiring.

In addition, the inspection efficiency is low, because the inspection is performed in such a manner that a plurality of liquid crystal display panels are produced in a state of being a large substrate, the large substrate is cut into individual liquid crystal display panels, and the inspection is performed for each liquid crystal display panel.

SUMMARY OF THE INVENTION

The present invention simultaneously solves the problems of the above-mentioned prior art. A first object of the present invention is to achieve an inspection with higher accuracy by performing a monochromatic display, without increasing unnecessary regions and increasing processes and defective units by cutting such regions, so as to prevent the outflow of the defective units and reduce the production cost.

A second object of the present invention is to prevent the decrease of the yield and the decrease of the display quality of the liquid crystal display panel caused by inspection-use switching elements in an active-matrix-type liquid crystal display panel arranged so that wiring for supplying inspection-use signals to data lines or scanning lines are connected to the data lines or the scanning lines through the inspection-use switching elements.

A third object of the present invention is to prevent the voltage applied to the data lines or the scanning lines from being decreased by a voltage drop in the inspection-use wiring for supplying the inspection-use signals to the data lines or the scanning lines when inspecting the liquid, crystal display panel, in an active-matrix-type liquid crystal display panel including a resistive element between the data lines or the scanning lines so as to avoid the static-electricity breakdown.

A fourth object of the present invention is to inspect a plurality of liquid crystal display panels at the same time so as to significantly improve the inspection efficiency.

In order to achieve the first object, an active-matrix-type liquid crystal display panel in accordance with one embodiment of the present invention is characterized in including:

an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

an opposing substrate including a common electrode, the opposing substrate being adhered to the active matrix substrate with a liquid crystal layer therebetween;

data-line inspection-use switching elements, individually connected to the plurality of data lines, for controlling a supply of an inspection-use display signal;

an inspection-use display signal line for supplying an inspection-use display signal to the data lines through the data-line inspection-use switching elements, the inspection-use display signal line being a common inspection-use display signal line provided for the data-line inspection-use switching elements; and a plurality of data-line inspection-use control signal lines for inputting control signals for switching on/off the data-line inspection-use switching elements, the plurality of data-line inspection-use control signal lines being provided for the data-line inspection-use switching elements so that different control signals are inputted to adjacent data lines.

It is thus possible to provide a liquid crystal display panel enabling a recognition of a leakage defect between the signal lines and a visual detection of a leakage between the data lines without increasing the number of processes.

Further, in a method of inspecting the active-matrix-type liquid crystal display panel, a color display is performed by sequentially switching control signals supplied to a plurality of data-line inspection-use control signal lines, while supplying the inspection-use display signal to the inspection-use display signal line. Therefore, the color display in the inspection is enabled without increasing the number of processes. As a result, in addition to the leakage defect between the signal lines, a leakage between the data lines and a leakage defect between adjacent pixels can be visually detected easily.

In order to achieve the first object, an active-matrix-type liquid crystal display panel in accordance with another embodiment of the present invention is characterized in including:

an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

an opposing substrate including a common electrode, the opposing substrate being adhered to the active matrix substrate with a liquid crystal layer therebetween;

data-line inspection-use switching elements, individually connected to the plurality of data lines, for controlling a supply of an inspection-use display signal;

a data-line inspection-use control signal line for inputting control signals for switching on/off the data-line inspection-use switching elements, the data-line inspection-use control signal line being a common data-line inspection-use control signal line provided for the data-line inspection-use switching elements; and a plurality of inspection-use display signal lines for supplying inspection-use display signals to the data lines through the data-line inspection-use switching elements, the plurality of inspection-use display signal lines being provided for the data-line inspection-use switching elements so that different display signals are inputted to adjacent data lines.

It is thus possible to provide a liquid crystal display panel without increasing the number of processes, where a leakage defect between the signal lines can be recognized, a leakage between the data lines can be visually detected, and a leakage defect between signal lines, which is not to be visually detected, can be electrically detected.

In addition, in a method of inspecting the active-matrix-type liquid crystal display panel, a color display is performed by sequentially switching the inspection-use display signals supplied to a plurality of inspection-use display signal lines, while supplying the control signal to the data-line inspection-use control signal line. Therefore, the color display in the inspection is enabled without increasing the number of processes. As a result, a leakage between the data lines and a leakage defect between adjacent pixels can be visually detected easily, and a leakage defect between signal lines and data lines, which is not to be visually detected, can be electrically detected.

In order to achieve the second object, an active-matrix-type liquid crystal display panel in accordance with one embodiment of the present invention is characterized in including:

(a) an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

(b) an opposing substrate including a common electrode, the opposing substrate being adhered to the active matrix substrate with a liquid crystal layer therebetween;

characteristics (c) and/or characteristics (d).

The characteristics (c) includes:

data-line inspection-use switching elements, individually connected to the plurality of data lines, for controlling a supply of an inspection-use display signal;

an inspection-use display signal line, provided for the data-line inspection-use switching elements, for supplying an inspection-use display signal to the data lines through the data-line inspection-use switching elements; and a data-line inspection-use control signal line, provided for the data-line inspection-use switching elements, for inputting control signals for switching on/off the data-line inspection-use switching elements;

wherein a voltage for switching off the data-line inspection-use switching elements is applied to the data-line inspection-use control signal line while the liquid crystal display panel is driven.

The characteristics (d) includes:

scanning-line inspection-use switching elements, individually connected to the plurality of scanning lines, for controlling a supply of an inspection-use scanning signal;

an inspection-use scanning signal line, provided for the scanning-line inspection-use switching elements, for supplying an inspection-use scanning signal to the scanning lines through the scanning-line inspection-use switching elements;

a scanning-line inspection-use control signal line, provided for the scanning-line inspection-use switching elements, for inputting control signals for switching on/off the scanning-line inspection-use switching elements, wherein a voltage for switching off the scanning-line inspection-use switching elements is applied to the scanning-line inspection-use control signal line while the liquid crystal display panel is driven.

Thus, when the liquid crystal display panel is driven, a voltage for switching off the inspection-use switching elements is applied to the data-line inspection-use control signal line and/or the scanning-line inspection-use control signal line. Therefore, a malfunction can be prevented when the liquid crystal display panel is driven.

An active-matrix-type liquid crystal display panel in accordance with another embodiment of the present invention is characterized in including:

(a) an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

(b) an opposing substrate including a common electrode, the opposing substrate being adhered to the active matrix substrate with a liquid crystal layer therebetween;

characteristics (c) and/or characteristics (d).

The characteristics (c) includes:

data-line inspection-use switching elements, individually connected to the plurality of data lines, for controlling a supply of an inspection-use display signal;

an inspection-use display signal line, provided for the data-line inspection-use switching elements, for supplying an inspection-use display signal to the data lines through the data-line inspection-use switching elements;

a data-line inspection-use control signal line, provided for the data-line inspection-use switching elements, for inputting control signals for switching on/off the data-line inspection-use switching elements; and a resistive element between a signal input point of the data-line inspection-use control signal line and the data-line inspection-use switching elements.

The characteristics (d) includes:

scanning-line inspection-use switching elements, individually connected to the plurality of scanning lines, for controlling a supply of an inspection-use scanning signal;

an inspection-use scanning signal line, provided for the scanning-line inspection-use switching elements, for supplying an inspection-use scanning signal to the scanning lines through the scanning-line inspection-use switching elements;

a scanning-line inspection-use control signal line, provided for the scanning-line inspection-use switching elements, for inputting control signals for switching on/off the scanning-line inspection-use switching elements; and a resistive element between a signal input point of the scanning-line inspection-use control signal line and the scanning-line inspection-use switching elements.

A resistive element is provided between a signal input terminal of the data-line inspection-use control signal line and the inspection-use switching elements to which the data-line inspection-use control signal line is connected, and/or between a signal input terminal of the scanning-line inspection-use control signal line and the inspection-use switching elements to which the scanning-line inspection-use control signal line is connected. It is thus possible to prevent the inspection-use switching elements from being broken by the static electricity flowing through the control signal lines without a hitch in the inspection.

An active-matrix-type liquid crystal display panel in accordance with another embodiment of the present invention is characterized in including:

(a) an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

(b) an opposing substrate including a common electrode, the opposing substrate being adhered to the active matrix substrate with a liquid crystal layer therebetween;

characteristics (c) and/or characteristics (d).

The characteristics (c) includes:

data-line inspection-use switching elements for controlling a supply of an inspection-use display signal, the data-line inspection-use switching elements being individually connected to the plurality of data lines and provided on a side opposite to a region where an external circuit for driving the data lines is provided;

an inspection-use display signal line, provided for the data-line inspection-use switching elements, for supplying an inspection-use display signal to the data lines through the data-line inspection-use switching elements; and a data-line inspection-use control signal line, provided for the data-line inspection-use switching elements, for inputting control signals for switching on/off the data-line inspection-use switching elements.

The characteristics (d) includes:

scanning-line inspection-use switching elements for controlling a supply of an inspection-use scanning signal, the scanning-line inspection-use switching elements being individually connected to the plurality of scanning lines and provided on a side opposite to a region where an external circuit for driving the scanning lines is provided;

an inspection-use scanning signal line, provided for the scanning-line inspection-use switching elements, for supplying an inspection-use scanning signal to the scanning lines through the scanning-line inspection-use switching elements; and a scanning-line inspection-use control signal line, provided for the scanning-line inspection-use switching elements, for inputting control signals for switching on/off the scanning-line inspection-use switching elements.

The inspection-use switching elements are provided on the opposite side of the external circuit. Therefore, a margin in space is secured for pattern forming in the vicinity of the driver circuit, and the inspection-use switching elements can be cut off as necessary when the inspection-use switching elements are broken.

An active-matrix-type liquid crystal display panel in accordance with another embodiment of the present invention is characterized in including:

(a) an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

(b) an opposing substrate including a common electrode, the opposing substrate being adhered to the active matrix substrate with a liquid crystal layer therebetween;

characteristics (c) and/or characteristics (d).

The characteristics (c) includes:

data-line inspection-use switching elements for controlling a supply of an inspection-use display signal, the data-line inspection-use switching elements being shaded and individually connected to the plurality of data lines;

an inspection-use display signal line, provided for the data-line inspection-use switching elements, for supplying an inspection-use display signal to the data lines through the data-line inspection-use switching elements; and a data-line inspection-use control signal line, provided for the data-line inspection-use switching elements, for inputting control signals for switching on/off the data-line inspection-use switching elements.

The characteristics (d) includes:

scanning-line inspection-use switching elements for controlling a supply of an inspection-use scanning signal, the scanning-line inspection-use switching elements being shaded and individually connected to the plurality of scanning lines;

an inspection-use scanning signal line, provided for the scanning-line inspection-use switching elements, for supplying an inspection-use scanning signal to the scanning lines through the scanning-line inspection-use switching elements; and a scanning-line inspection-use control signal line, provided for the scanning-line inspection-use switching elements, for inputting control signals for switching on/off the scanning-line inspection-use switching elements.

Since the inspection-use switching elements are shaded, a leakage current is reduced when the elements are switched off. Therefore, a malfunction caused when the liquid crystal display panel is driven can be prevented, and the problem in reliability can be eliminated.

Further, in a method of inspecting the active-matrix-type liquid crystal display panel, when inspecting the liquid crystal display panel, the data-line inspection-use switching elements and/or the scanning-line inspection-use switching elements are exposed to light. Therefore, the resistance value of the inspection-use switching elements can be lowered only in the inspection, and a satisfactory inspection can be performed.

An active-matrix-type liquid crystal display panel in accordance with another embodiment of the present invention is characterized in including:

(a) an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

(b) an opposing substrate including a common electrode, the opposing substrate being adhered to the active matrix substrate with a liquid crystal layer therebetween;

characteristics (c) and/or characteristics (d).

The characteristics (c) includes:

data-line inspection-use switching elements for controlling a supply of an inspection-use display signal, the data-line inspection-use switching elements being individually connected to the plurality of data lines, and having a higher threshold value than the pixel switching element when the liquid crystal display panel is driven;

an inspection-use display signal line, provided for the data-line inspection-use switching elements, for supplying an inspection-use display signal to the data lines through the data-line inspection-use switching elements; and a data-line inspection-use control signal line, provided for the data-line inspection-use switching elements, for inputting control signals for switching on/off the data-line inspection-use switching elements.

The characteristics (d) includes:

scanning-line inspection-use switching elements, for controlling a supply of an inspection-use scanning signal, the scanning-line inspection-use switching elements being individually connected to the plurality of scanning lines, and having a higher threshold value than the pixel switching element when the liquid crystal display panel is driven;

an inspection-use scanning signal line, provided for the scanning-line inspection-use switching elements, for supplying an inspection-use scanning signal to the scanning lines through the scanning-line inspection-use switching elements; and a scanning-line inspection-use control signal line, provided for the scanning-line inspection-use switching elements, for inputting control signals for switching on/off the scanning-line inspection-use switching elements.

When actually driving the liquid crystal display panel after packaging is completed, the threshold value of the inspection-use switching elements is set higher than that of the pixel switching elements. Therefore, a leakage in the inspection-use switching elements can be prevented. Further, after inspecting the liquid crystal display panel, the threshold value of the inspection-use switching elements can be shifted in a positive direction by applying a positive voltage to the gate electrodes of the inspection-use switching elements. In this case, applying a heat at the same time as the application of the positive voltage is preferable, because it enhances the shift of the threshold value in the threshold value.

In order to achieve the third object, an active-matrix-type liquid crystal display panel in accordance with one embodiment of the present invention is characterized in including:

(a) an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

(b) an opposing substrate including a common electrode, the opposing substrate being adhered to the active matrix substrate with a liquid crystal layer therebetween;

characteristics (c) and/or characteristics (d).

The characteristics (c) includes:

a plurality of inspection-use display signal lines for supplying inspection-use display signals, the plurality of inspection-use display signal lines being provided for the plurality of data lines so that different display signals are inputted to adjacent data lines; and a resistive element provided between the adjacent data lines;

wherein rd/(n/k)>8R is satisfied where rd is a resistance value of each resistive element, n is a number of the data lines, k is a number of the inspection-use display signal lines, and R is a resistance value of the inspection-use display signal lines.

The characteristics (d) includes:

a plurality of inspection-use scanning signal lines for supplying an inspection-use scanning signal, the inspection-use scanning signal lines being provided for the plurality of scanning lines so that different scanning signals are inputted to adjacent scanning lines; and a resistive element provided between the adjacent scanning lines;

wherein rd/(n/k)>8R is satisfied where rd is a resistance value of each resistive element, n is a number of the scanning lines, k is a number of the inspection-use scanning signal lines, and R is a resistance value of the inspection-use scanning signal lines.

Therefore, the voltage drop produced in the inspection-use display signal line and/or the inspection-use scanning signal line is reduced, and a voltage not less than 80% of the voltage applied to the input terminal of the inspection-use wiring can be applied to the data lines or scanning lines. Namely, a sufficient applied voltage can be achieved.

An active-matrix-type liquid crystal display panel in accordance with another embodiment of the present invention is characterized in including:

(a) an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

(b) an opposing substrate including a common electrode, the opposing substrate being adhered to the active matrix substrate with a liquid crystal layer therebetween;

characteristics (c) and/or characteristics (d).

The characteristics (c) includes:

data-line inspection-use switching elements, individually connected to the plurality of data lines, for controlling a supply of an inspection-use display signal;

a data-line inspection-use control signal line for inputting control signals for switching on/off the data-line inspection-use switching elements, the data-line inspection-use control signal line being a common data-line inspection-use control signal line provided for the data-line inspection-use switching elements;

a plurality of inspection-use display signal lines for supplying inspection-use display signals to the data lines through the data-line inspection-use switching elements, the plurality of inspection-use display signal lines being provided for the data-line inspection-use switching elements so that different display signals are inputted to adjacent data lines; and a resistive element provided between adjacent data lines;

wherein rd>8R·(n/k)+16rtr is satisfied where rd is a resistance value of each resistive element, rtr is a resistance value of each data-line inspection-use switching element, n is-a number of the data lines, k is a number of the inspection-use display signal lines, and R is a resistance value of the inspection-use display signal lines.

The characteristics (d) includes:

scanning-line inspection-use switching elements, individually connected to the plurality of scanning lines, for controlling a supply of an inspection-use scanning signal;

a scanning-line inspection-use control signal line for inputting control signals for switching on/off the scanning-line inspection-use switching elements, the scanning-line inspection-use control signal line being a common scanning-line inspection-use control signal line provided for the scanning-line inspection-use switching elements;

a plurality of inspection-use scanning signal lines for supplying inspection-use scanning signals to the scanning lines through the scanning-line inspection-use switching elements, the inspection-use scanning signal line being provided for the scanning-line inspection-use switching elements so that different scanning signals are inputted to adjacent scanning lines; and a resistive element provided between the adjacent scanning lines;

wherein rd>8R·(n/k)+16rtr is satisfied where rd is a resistance value of each resistive element, rtr is a resistance value of each scanning-line inspection-use switching element, n is a number of the scanning lines, k is a number of the inspection-use scanning signal lines, and R is a resistance value of the inspection-use scanning signal lines.

Therefore, the voltage drop produced in the inspection-use display signal line and/or the inspection-use scanning signal line is reduced, and a voltage not less than 80% of the voltage applied to the input terminal of the inspection-use wiring can be applied to the data lines or scanning lines. Namely, a sufficient applied voltage can be achieved.

An active-matrix-type liquid crystal display panel in accordance with another embodiment of the present invention is characterized in including:

(a) an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

(b) an opposing substrate including a common electrode, the opposing substrate being adhered to the active matrix substrate with a liquid crystal layer therebetween;

characteristics (c) and/or characteristics (d).

The characteristics. (c) includes:

a plurality of inspection-use display signal lines for supplying inspection-use display signals, the inspection-use display signal lines being provided for the plurality of data lines so that different display signals are inputted to adjacent data lines; and a resistive element provided between data lines connected to a same inspection-use display signal line.

The characteristics (d) includes:

a plurality of inspection-use scanning signal lines for supplying inspection-use scanning signals, the inspection-use scanning signal lines being provided for the plurality of scanning lines so that different scanning signals are inputted to adjacent scanning lines; and a resistive element provided between scanning lines connected to a same inspection-use scanning signal line.

The data lines or scanning lines connected to the same resistive element are connected to the same inspection-use display signal line or the inspection-use scanning signal line. Therefore, while the resistive element maintains a structure for letting the static electricity escape, no current flows through the resistive element with no voltage applied thereto. Consequently, no voltage drop occurs in the inspection-use display signal line or the inspection-use scanning signal line, and the inspection efficiency is further improved.

An active-matrix-type liquid crystal display panel in accordance with another embodiment of the present invention is characterized in including:

(a) an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

(b) an opposing substrate including a common electrode, the opposing substrate being adhered to the active matrix substrate with a liquid crystal layer therebetween;

characteristics (c) and/or characteristics (d).

The characteristics (c) includes:

data-line inspection-use switching elements, individually connected to the plurality of data lines, for controlling a supply of an inspection-use display signal;

a data-line inspection-use control signal line for inputting control signals for switching on/off the data-line inspection-use switching elements, the data-line inspection-use control signal line being a common data-line inspection-use control signal line provided for the data-line inspection-use switching elements;

a plurality of inspection-use display signal lines for supplying inspection-use display signals to the data lines through the data-line inspection-use switching elements, the plurality of inspection-use display signal lines being provided for the data-line inspection-use switching elements so that different display signals are inputted to adjacent data lines; and a resistive element provided between data lines connected to a same inspection-use display signal line through the data-line inspection-use switching elements.

The characteristics (d) includes:

scanning-line inspection-use switching elements, individually connected to the plurality of scanning lines, for controlling a supply of an inspection-use scanning signal;

a scanning-line inspection-use control signal line for inputting control signals for switching on/off the scanning-line inspection-use switching elements, the scanning-line inspection-use control signal line being a common scanning-line inspection-use control signal line provided for the scanning-line inspection-use switching elements;

a plurality of inspection-use scanning signal lines for supplying inspection-use scanning signals to the scanning lines through the scanning-line inspection-use switching elements, the inspection-use scanning signal line being provided for the scanning-line inspection-use switching elements so that different scanning signals are inputted to adjacent scanning lines; and a resistive element provided between scanning lines connected to a same inspection-use scanning signal line through the scanning-line inspection-use switching elements.

The data lines or scanning lines connected to the same resistive element are connected to the same inspection-use display signal line or the inspection-use scanning signal line. Therefore, while the resistive element maintains a structure for letting the static electricity escape, no current flows through the resistive element with no voltage applied thereto. Consequently, no voltage drop occurs in the inspection-use display signal line or the inspection-use scanning signal line, and the inspection efficiency is further improved.

In order to achieve the first object, a method of inspecting an active-matrix-type liquid crystal display panel in accordance with one embodiment of the present invention is a method of inspecting an active-matrix-type liquid crystal display panel including:

(a) an active matrix substrate having on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

(b) an opposing substrate having a common electrode, the opposing substrate being adhered to the active matrix substrate with a liquid crystal layer therebetween;

characteristics (c) and/or characteristics (d), and the method includes characteristics (e).

The characteristics (c) includes:

data-line inspection-use switching elements, individually connected to the plurality of data lines, for controlling a supply of an inspection-use display signal;

an inspection-use display signal line, provided for the data-line inspection-use switching elements, for supplying an inspection-use display signal to the data lines through the data-line inspection-use switching elements; and a data-line inspection-use control signal line, provided for the data-line inspection-use switching elements, for inputting control signals for switching on/off the data-line inspection-use switching elements, the data-line inspection-use control signal line and the inspection-use display signal line having input terminals, the input terminals and an input terminal for inputting a signal to the common electrode in inspecting the liquid crystal display panel being located on a single side or opposing two sides of the active matrix substrate.

The characteristics (d) includes:

scanning-line inspection-use switching elements, individually connected to the plurality of scanning lines, for controlling a supply of an inspection-use scanning signal;

an inspection-use scanning signal line, provided for the scanning-line inspection-use switching elements, for supplying an inspection-use scanning signal to the scanning lines through the scanning-line inspection-use switching elements; and a scanning-line inspection-use control signal line, provided for the scanning-line inspection-use switching elements, for inputting control signals for switching on/off the scanning-line inspection-use switching elements, the scanning-line inspection-use control signal line and the inspection-use scanning signal line having input terminals, the input terminals and an input terminal for inputting a signal to the common electrode in inspecting the liquid crystal display panel being located on a single side or opposing two sides of the active matrix substrate.

The characteristics (e) includes the step of inspecting a mother substrate by attaching an inspection-use jig thereto before dividing the mother substrate into individual pieces of active-matrix-type liquid crystal display panels, the mother substrate having the plurality of active-matrix-type liquid crystal display panels arranged in rows so that the input terminals of the plurality of active-matrix-type liquid crystal display panels are aligned in a direction of the single side.

Since the inspection can be performed for a mother substrate including a plurality of active-matrix-type liquid crystal display panels arranged in rows, the inspection efficiency is improved.

A method of inspecting an active-matrix-type liquid crystal display panel in accordance with another embodiment of the present invention is a method of inspecting an active-matrix-type liquid crystal display panel including:

(a) an active matrix substrate having on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

(b) an opposing substrate having a common electrode, the opposing substrate being adhered to the active matrix substrate with a liquid crystal layer therebetween;

characteristics (c) and/or characteristics (d), and the method includes characteristics (e).

The characteristics (c) includes:

data-line inspection-use switching elements, individually connected to the plurality of data lines, for controlling a supply of an inspection-use display signal;

an inspection-use display signal line, provided for the data-line inspection-use switching elements, for supplying an inspection-use display signal to the data lines through the data-line inspection-use switching elements; and a data-line inspection-use control signal line, provided for the data-line inspection-use switching elements, for inputting control signals for switching on/off the data-line inspection-use switching elements.

The characteristics (d) includes:

scanning-line inspection-use switching elements, individually connected to the plurality of scanning lines, for controlling a supply of an inspection-use scanning signal;

an inspection-use scanning signal line, provided for the scanning-line inspection-use switching elements, for supplying an inspection-use scanning signal to the scanning lines through the scanning-line inspection-use switching elements; and a scanning-line inspection-use control signal line, provided for the scanning-line inspection-use switching elements, for inputting control signals for switching on/off the scanning-line inspection-use switching elements.

The characteristics (e) includes the step of inspecting a mother substrate by attaching an inspection-use jig thereto before dividing the mother substrate into individual pieces of active-matrix-type liquid crystal display panels, wherein the mother substrate is arranged so that the plurality of active-matrix-type liquid crystal display panels are arranged in rows, inspection-use wiring of a same kind in adjacent liquid crystal display panels are electrically connected to each other, and input terminals of the scanning-line inspection-use control signal line and the inspection-use scanning signal line and an input terminal for inputting a signal to the common electrode in inspecting the liquid crystal display panel are formed in an end section of the mother substrate with regard to a direction the liquid crystal display panels are connected, the end section belonging to none of the liquid crystal display panels.

Since the inspection can be performed for a mother substrate including a plurality of active-matrix-type liquid crystal display panels arranged in rows, the inspection efficiency is improved. In addition, even when the liquid crystal display panels to be detected are different in specifications such as the size, the inspection can be performed with a common inspection-use jig by forming the inspection-use input terminals at the same positions in the region. Therefore, it is favorable in the case where the volume of production is low and there are a wide variety of products to be made.

A method of inspecting an active-matrix-type liquid crystal display panel in accordance with another embodiment of the present invention is a method of inspecting an active-matrix-type liquid crystal display panel including:

(a) an active matrix substrate having on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

(b) an opposing substrate having a common electrode, the opposing substrate being adhered to the active matrix substrate with a liquid crystal layer therebetween;

characteristics (c) and/or characteristics (d), and the method includes the characteristics (e).

The characteristics (c) includes an inspection-use display signal line, provided for the plurality of data lines, for supplying an inspection-use display signal.

The characteristics (d) includes:

an inspection-use scanning display signal line, provided for the plurality of scanning lines, for supplying an inspection-use scanning signal.

The characteristics (e) includes the step of inspecting a mother substrate by attaching an inspection-use jig thereto before dividing the mother substrate into individual pieces of active-matrix-type liquid crystal display panels, wherein the mother substrate is arranged so that a plurality of active-matrix-type liquid crystal display panels are arranged in rows in a direction of the scanning line, and a plurality of scanning lines in each liquid crystal display panel are connected to an inspection-use scanning signal line thereof via a region of an adjacent liquid crystal display panel.

Since the inspection can be performed for a mother substrate including a plurality of active-matrix-type liquid crystal display panels arranged in rows, the inspection efficiency is improved. After inspecting the liquid crystal display panel, the mother substrate is divided into individual panels. At this time, the data line (and/or the scanning line) in a first panel, which is connected to the inspection-use display signal line (and/or the inspection-use scanning signal line) in the first panel via an adjacent second panel, is divided. Therefore, the inspection-use switching elements become unnecessary for the data line (and/or the scanning line) to be divided, and it is favorable in reliability.

For a fuller understanding of the nature and advantages of the invention, reference should be made to the ensuing detailed description taken in conjunction with the accompanying drawings.

BRIEF DESCRIPTION OF THE DRAWINGS

FIGS. 5(a) to 5(f) are timing charts of the respective signals applied in the dynamic operating inspection of a liquid crystal display panel provided in the active-matrix-type liquid crystal display device shown in FIG. 4.

DESCRIPTION OF THE PREFERRED EMBODIMENTS

Embodiment 1

The following descriptions will explain one embodiment of the present invention with reference to drawings. For the sake of explanation, the members having the same function as those described above in the explanation of the prior art will be designated by the same reference numbers, and their descriptions will be omitted.

Figure 1:
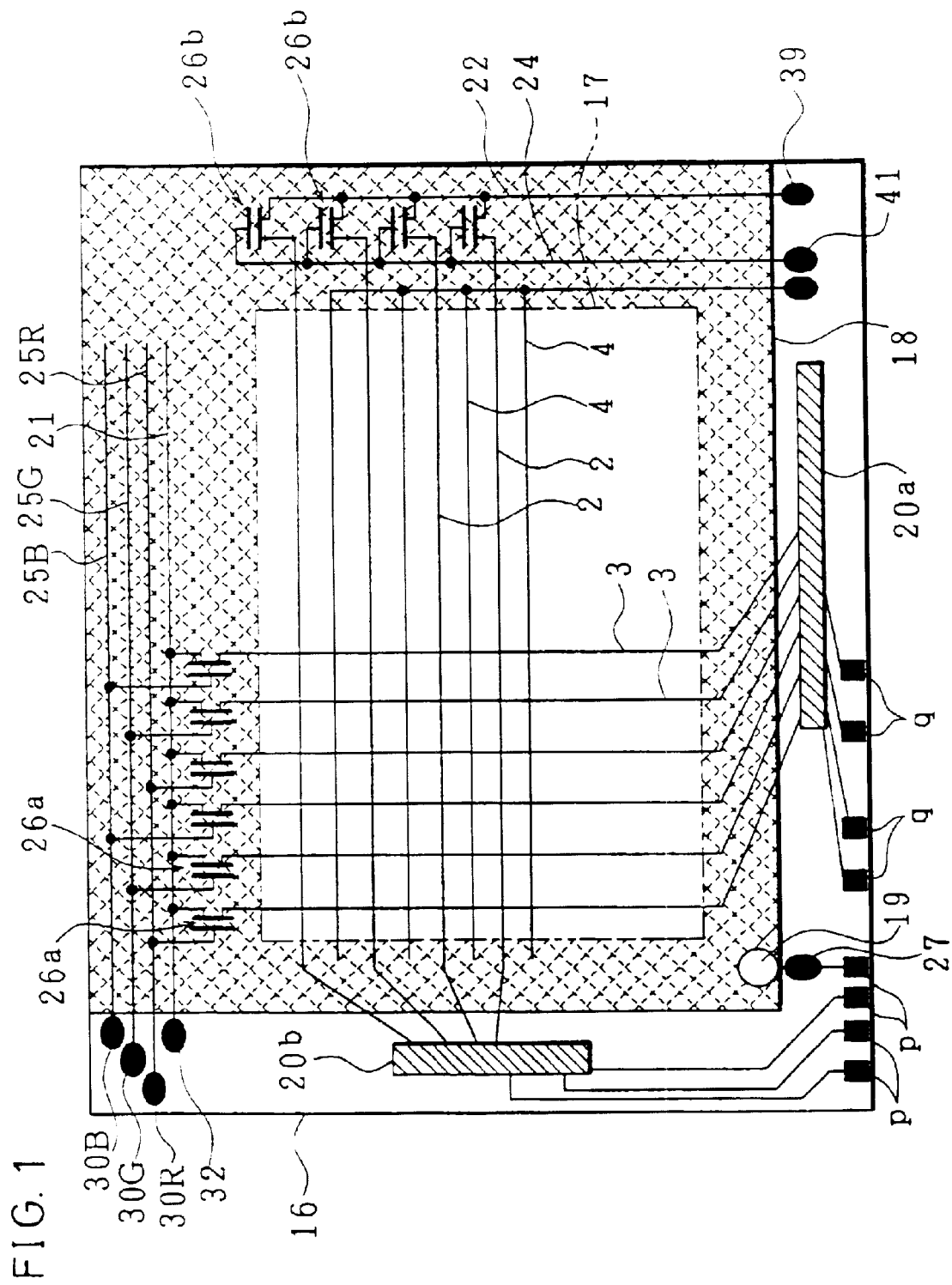
FIG. 1 is a schematic plan view of an active-matrix-type liquid crystal display device in accordance with one embodiment of the present invention.

FIG. 1 is a schematic plan view of an active-matrix-type liquid crystal display device as one embodiment of the present invention. The active-matrix-type liquid crystal display devices in all the embodiments described below including the present embodiment are driven in the normally white mode.

Figure 28:
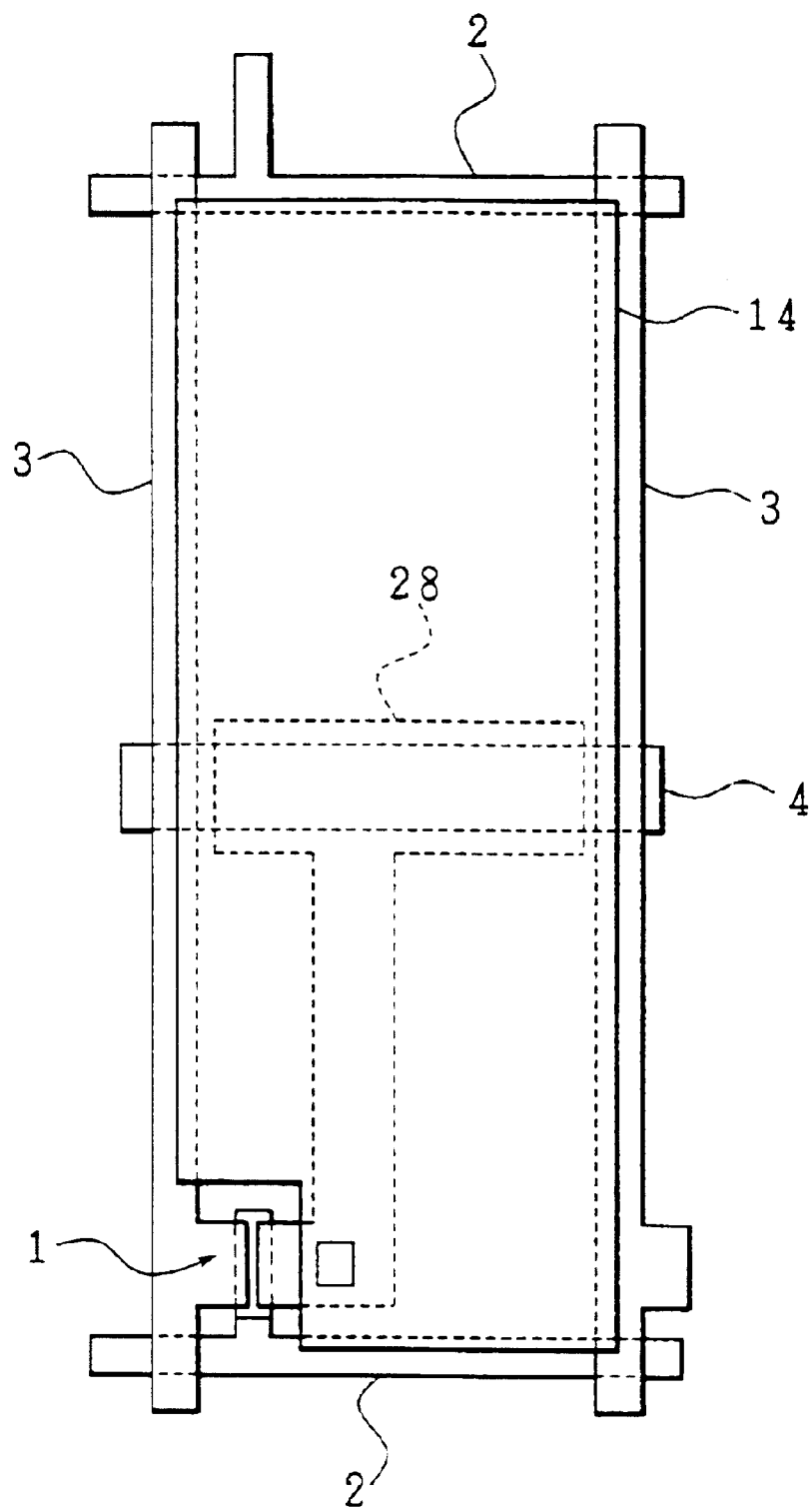
FIG. 28 is a plan view of one pixel section of an active matrix substrate constituting an active-matrix-type liquid crystal display device.
Figure 29:
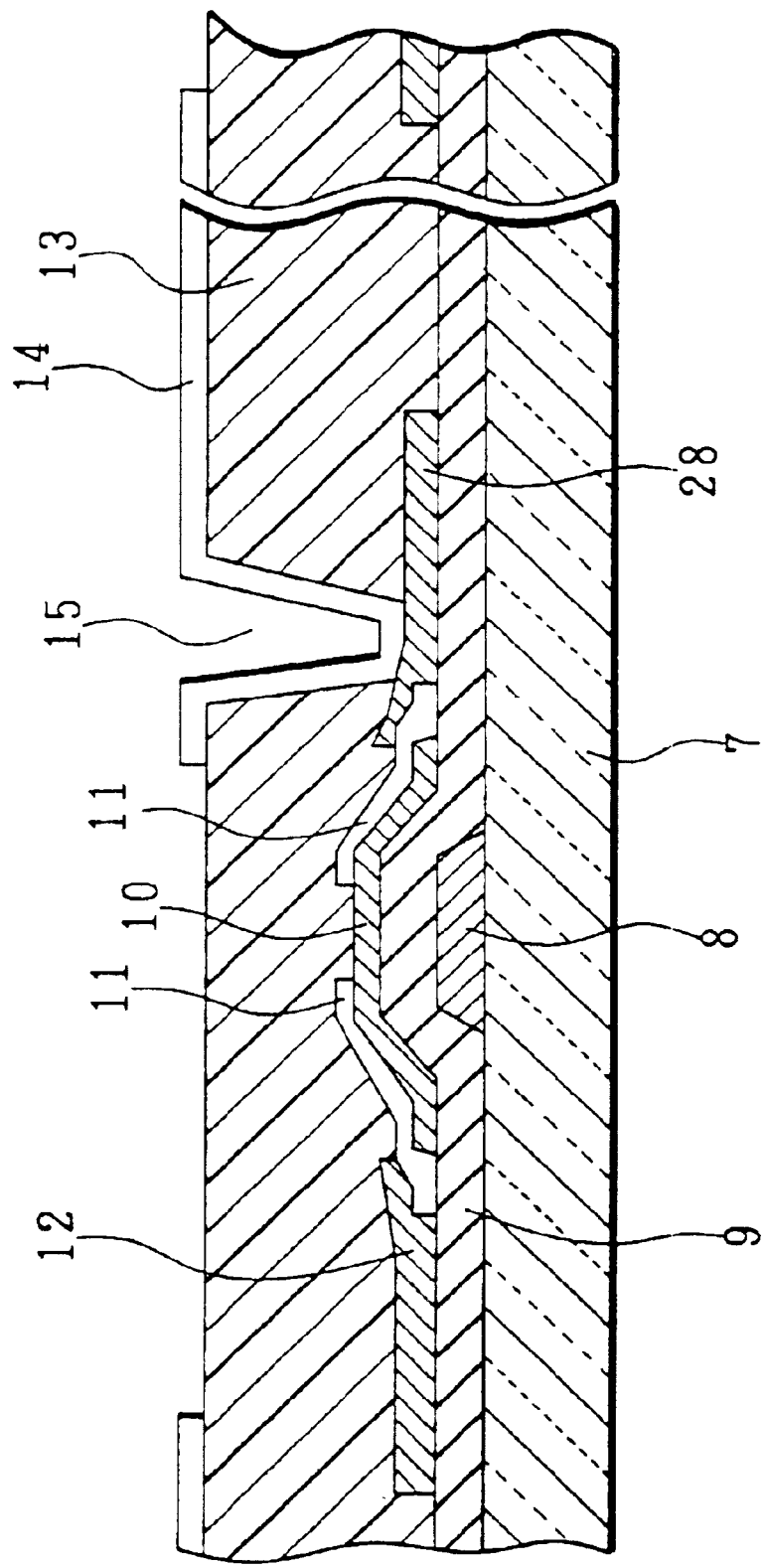
FIG. 29 is a sectional view of essential parts of an active matrix substrate constituting an active-matrix-type liquid crystal display device.

First, as shown in aforementioned FIGS. 28 and 29, a gate electrode 8, a gate insulating film 9, a semiconductor layer 10, a $n^+$-Si layer 11 to be source and drain electrodes, a metal layer 12 constituting a data line 3 are formed on an insulating substrate 7, thereby manufacturing an active matrix substrate 16. The manufacturing process and the structure of a viewing area 17 are the same as conventional ones, and their explanations will be omitted here.

Figure 30:
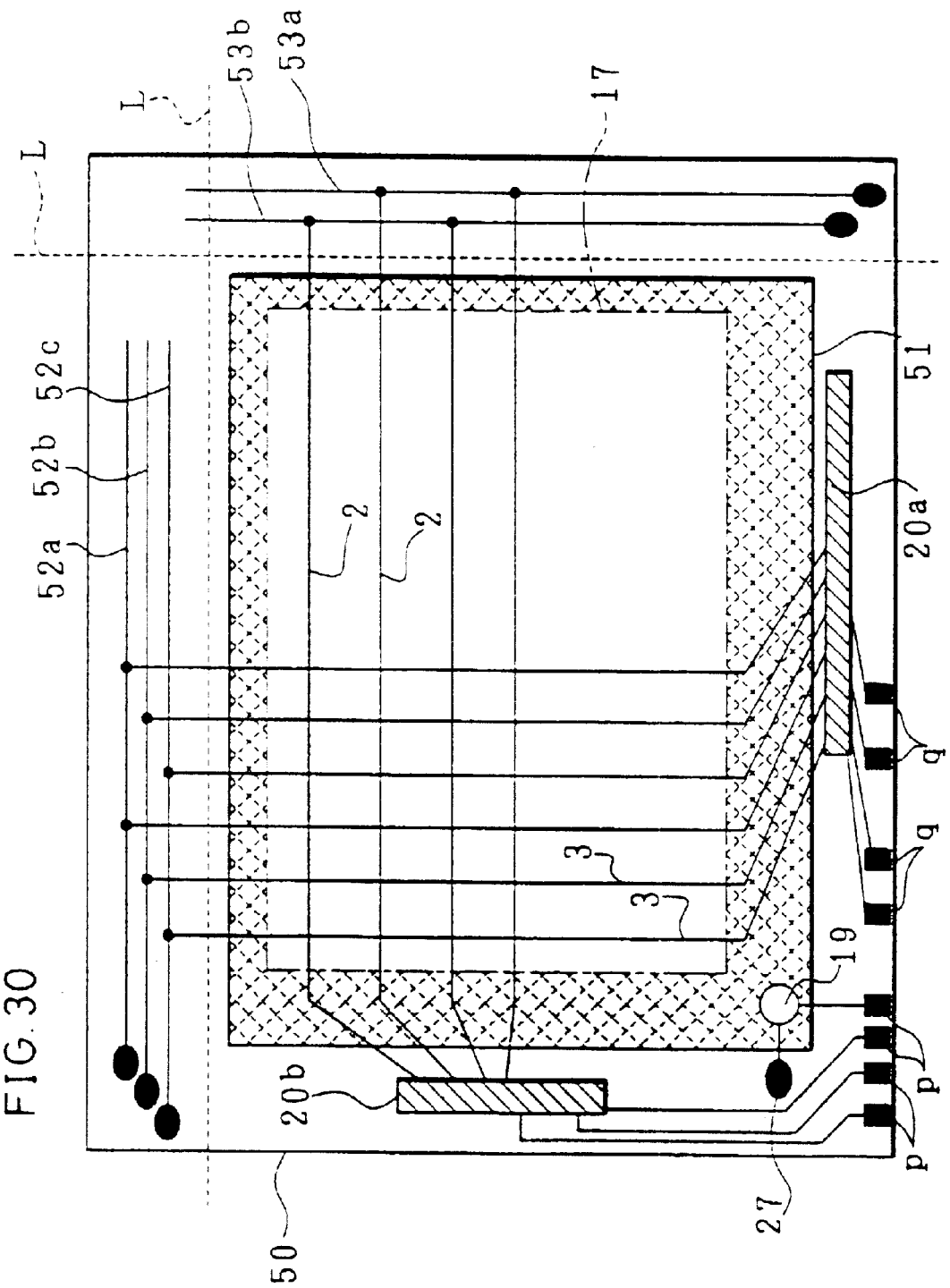
FIG. 30 is a schematic plan view of a conventional active-matrix-type liquid crystal display device.
Figure 31:
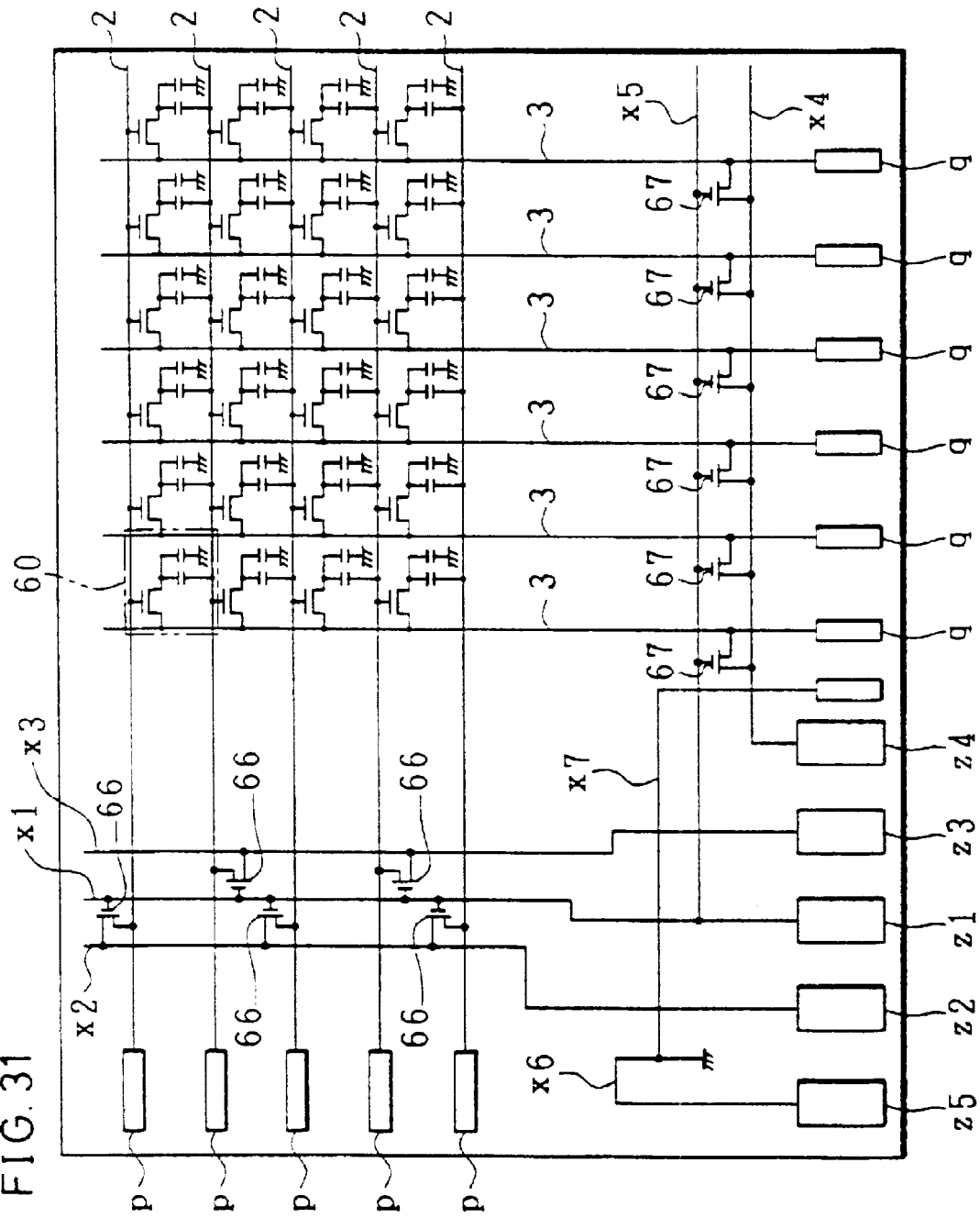
FIG. 31 is an equivalent circuit diagram of another conventional active-matrix-type liquid crystal display device.

In an active matrix substrate 50 of a conventional active-matrix-type liquid crystal display device shown in FIG. 30, the connection between data lines 3 and inspection-use display signal lines 52a, 52b, 52c and the connection between scanning lines 2 and inspection-use scanning signal lines 53a, 53b are realized with the simple electric connection, and each connection is achieved merely by a contact hole formed in an insulating thin film such as the gate insulating film 9 (see FIG. 29) at each intersection of the wiring.

In contrast, an active matrix substrate 16 shown in FIG. 1 in accordance with the present embodiment has the following structure. Namely, the data lines 3 are connected to an inspection-use display signal line 21 through inspection-use TFTs (data-line inspection-use switching elements) 26a, and the scanning lines 2 are connected to an inspection-use scanning signal line 22 through inspection-use TFTs (scanning-line inspection-use switching elements) 26b. Since the inspection-use TFTs 26a and 26b are manufactured in the same process as a pixel TFT 1 (see FIG. 28) in the viewing area 17, the number of processes is not increased.

The drain of each inspection-use TFT 26a is connected to the data line 3, and the source of each inspection-use TFT 26a is connected to the common inspection-use display signal line 21. The gate of the inspection-use TFT 26a is connected to either an inspection-use control signal line 25R for the inspection of red, an inspection-use control signal line 25G for the inspection of green, or an inspection-use control signal line 25B for the inspection of blue, in correspondence with the color of the data line 3 to which the inspection-use TFT 26a is connected. The inspection-use control signal lines 25R, 25G, 25B correspond to the data-line inspection-use control signal lines defined in claims. Signals are inputted from inspection-use input terminals (hereinafter, referred to as inspection terminals) 30R, 30G and 30B to the inspection-use control signal lines 25R, 25G and 25B, respectively, and from an inspection terminal 32 to the inspection-use display signal line 21.

The drain of each inspection-use TFT 26b is connected to the scanning line 2, and the source of each inspection-use TFT 26b is connected to the common inspection-use scanning signal line 22. The gate of each inspection-use TFT 26b is connected to an inspection-use control signal line 24. The inspection-use control signal line 24 corresponds to the scanning-line inspection-use control signal line defined in claims. Signals are inputted from an inspection terminal 41 to the inspection-use control signal line 24, and from an inspection terminal 39 to the inspection-use scanning signal line 22.

Here, the above inspection-use TFTs 26a are provided on the opposite side of input terminals q as regular input terminals for the data lines 3 of the liquid crystal display device. This is for the following reasons.

For example, as shown in FIG. 1, the COG (Chip on Gate) method in which a source driver 20a is directly installed on the active matrix substrate 16 requires higher processing accuracy in driver packaging than the conventional TAB (Tape Automated Bonding) method. However, film processing in the COG method requires small number of processes and low cost of materials, compared with the TAB method. Therefore, the COG method is preferably used for small-scale liquid crystal display devices in which smaller number of pixels and lower cost are required to be achieved.

However, in this method, the data lines 3 in the viewing area 17 of the liquid crystal display panel must be drawn to the source driver 20a which is much smaller. Thus, the pattern forming area naturally becomes highly dense. As a result, it is difficult to form the inspection-use TFTs 26a in this drawing area in many cases except when the frame part is designed to be very wide. In addition, even if the inspection-use TFTs 26a are forced to be disposed in this area, the electric capacity between the inspection-use display signal line 21 and the data line 3 often becomes a problem.

Specifically, in FIG. 1, the data lines 3 only cross the scanning lines 2 and auxiliary capacity wiring 4. If the inspection-use display signal line 21, etc. are disposed on the same side as the source driver 20a, the electric capacity is formed among the wiring, the inspection-use display signal line 21, and the data lines 3, which may cause a deficiency in the display due to the signal delay, depending on the magnitude.

In particular, as described below, since the inspection-use display signal line 21 is required to drive many data lines 3 at the same time, the line width of the inspection-use display signal line 21 is often arranged to be large so as to minimize its resistance. Thus, the inspection-use display signal line 21 has a large electrostatic capacity, and it is concerned that the inspection-use display signal line 21 exerts an ill effect on the data line 3 and does harm to the inspection due to the extremely large delay of the inspection-use display signal line 21.

These problems can be solved by providing the inspection-use TFTs 26a on the opposite side. Further, even if the inspection-use TFT 26a has a deficiency which exerts an ill effect on the display, the inspection-use TFTs 26a and the display section can be electrically separated from each other easily by laser cutting, etc.

Namely, the inspection-use TFT 26a is designed to have a wide channel so as to minimize the wiring delay determined by the time constant obtained by the product of the resistance value and the electrostatic capacity. However, an increase in the rate of occurrence of defectiveness at the same time cannot be avoided originally, since the inspection-use TFT 26a makes no contribution to the display after the display device is completed, the ratio of non-defective units is not allowed to depend on these inspection-use TFTs 26a. Namely, it is required that even if there is defectiveness in the inspection-use TFTs 26a, the display device should be shipped as a non-defective unit. In order to meet this requirement, the inspection-use TFTs 26a must be designed so that they can be easily cut off. Therefore, providing the inspection-use TFTs 26a on the opposite side of the source driver 20a is effective.

Further, it is preferred that a part where the pattern is constricted is formed at a position close to the viewing area 17 near the inspection-use TFTs 26a so as to facilitate laser cutting. In addition, even in the case where the inspection-use TFTs 26a must be provided at the same side as the source driver 20a for some reasons, it is preferable that the data lines 3 have branch lines which can be cut off, and the inspection-use TFT 26a are provided on the branch lines.

Although the explanations were made on the side of the data line 3, it is needless to say that the side of the scanning line 2 is similar. Further, in FIG. 1, the inspection-use control signal line 24 on the side of the scanning line 2 crosses the scanning line 2. However, depending on the magnitude of the electrostatic capacity between the inspection-use control signal line 24 and the scanning line 2, arranging the inspection-use control signal line 24 not to cross the scanning line is effective.

Next, for the active matrix substrate 16 having the data lines 3 formed in the above-described manner, a light-sensitive acrylic resin is formed as an interlayer insulating film 13 by the spin coating method so as to have a film thickness of 3 $\mu$m, exposed to light in accordance with a desired pattern, and treated by an alkaline solution, thereby forming a contact hole 15 piercing the interlayer insulating film 13 (see FIG. 29).

In this case, the interlayer insulating film 13 is not formed on the terminals q of the data lines 3 and terminals p of the scanning lines 2 so as to bring the terminals q and p into electric contact with the external circuit through the TAB. However, the interlayer insulating film 13 is provided as an upper layer of the inspection-use TFTs 26a and 26b so as to prevent an ill effect from being exerted on the display due to the leakage caused by a material of some kind attached between the source and the drain on the inspection-use TFTs 26a and 26b.

Then, a transparent conductive film to be a pixel electrode 14 is formed by the sputtering method and patterned. This pixel electrode 14 is connected to the drain electrode of the pixel TFT 1 through the contact hole 15 piercing the interlayer insulating film 13 (see FIG. 29).

On the viewing area 17 of the active matrix substrate 16 completed in this manner, an alignment film of the polyimide family is deposited, and the alignment function is added by a treatment such as rubbing. In an opposing substrate 18, after depositing a transparent opposing electrode such as ITO (Indium Tin Oxide), the part corresponding to the viewing area 17 is subjected to the same treatment.

Next, a sealing material (not shown) is applied to the surrounding section of the liquid crystal display panel except for a liquid crystal injection port in such a manner as to surround the panel by the printing method, etc. Further, a conductive material 19 is attached onto wiring connected to an opposing-substrate-use signal input terminal on the active matrix substrate 16. Thereafter, a spacer (not shown) for keeping the cell thickness of the liquid crystal layer uniform is sprayed. Then, the active matrix substrate 16 is adhered to the opposing substrate 18, and the sealing material is fixed by adding heat. As a result, the opposing-substrate-use signal input terminal and a common electrode of the opposing substrate 18 are electrically connected to each other with the conductive material 19. Here, as the opposing-substrate-use signal input terminal, an input terminal p used in actually driving the liquid crystal display panel and an input terminal 27 used in inspecting the liquid crystal display panel are formed.

Thereafter, liquid crystal is injected through the liquid crystal injection port, and the liquid crystal injection port is closed with an end-sealing material, thereby completing the panel section of the liquid crystal display device.

For the liquid crystal display panel completed in this manner, a dynamic operating inspection is performed in the following manner. FIGS. 2(a) through 2(d) show the timing of the signals applied in the dynamic operating inspection.

While supplying +20 V (see FIG. 2(a)) to the inspection-use control signal line 24 on the side of the scanning line 2, a signal is supplied to the inspection-use scanning signal line 22. This signal is preferably the one close to the scanning signal to be supplied to any scanning line 2 after the display device is completed. Here, the inspection-use scanning signal line 22 is biased to −10 V, and a pulse voltage of +15 V having a pulse width of 50 $\mu$s is supplied at a period of 16.7 ms (see FIG. 2(b)).

Figure 2:
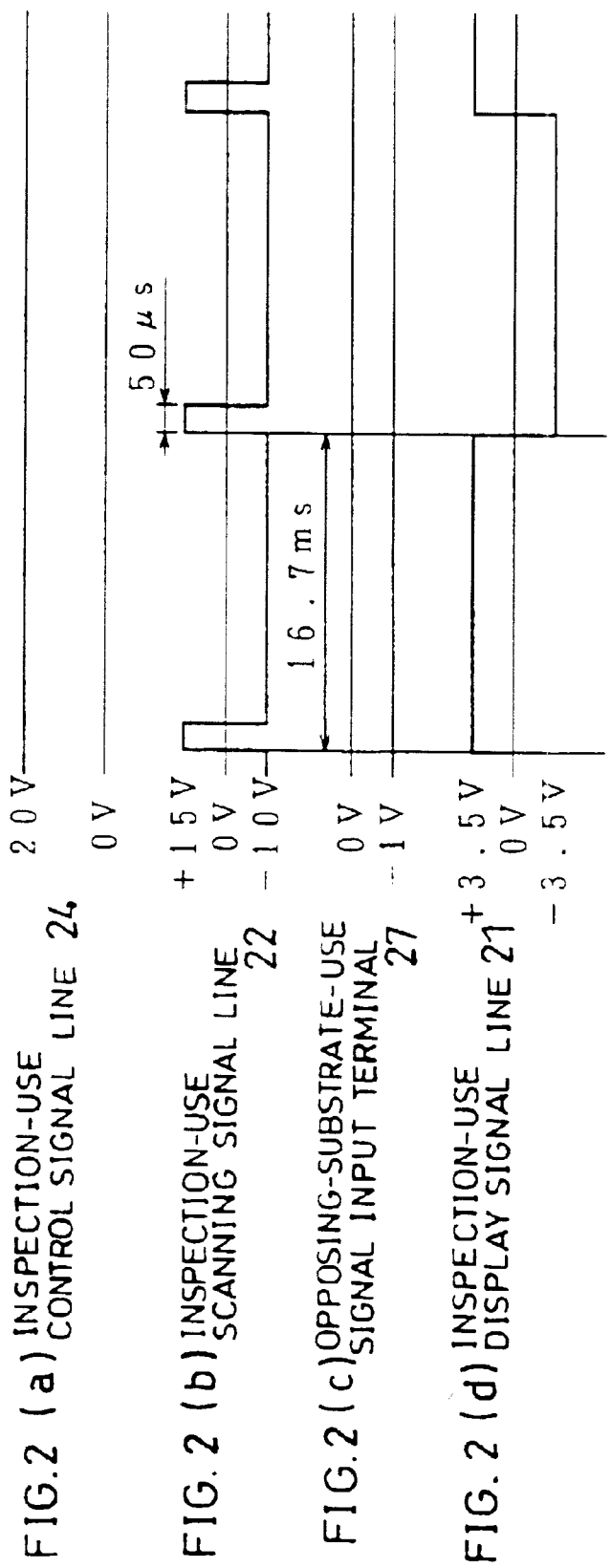
FIGS. 2(a) to 2(d) are timing charts of the respective signals applied in a dynamic operating inspection of a liquid crystal display panel provided in the active-matrix-type liquid crystal display device shown in FIG. 1.

Further, a dc voltage of −1 V is applied to the opposing-substrate-use signal input terminal 27 (see FIG. 2(c)), and a signal of ±3.5 V whose polarity is reversed every 16.7 ms is supplied to the inspection-use display signal line 21 (see FIG. 2 (d))

The inspection-use TFTs 26a on the side of the data line 3 are all switched on, and in this state, for example, when +20 V is supplied to each of the inspection-use control signal lines 25R, 25G, and 25B for the inspection of red, green, and blue, respectively, the voltage is applied to all of the data lines 3. In the case of the present liquid crystal display device employing the normally white method, the display on the screen turns black.

Next, −10 V is applied to only the inspection-use control signal line 25R for the inspection of red. After a while, the display on the screen gradually turns red as the charges on the data lines 3 of red come out. Namely, since the inspection-use TFT 26a corresponding to red is switched off, no signal is supplied to the data lines 3 of red, and the charges supplied to the data lines 3 when the voltage of +20 V is applied to the inspection-use control signal line 25R for the inspection of red gradually come out as the leakage current of the thin film in the display device and the inspection-use TFT 26a. The charges come out at a speed determined by the time constant which depends on the amount of the leakage current and the electrostatic capacity of the data line 3. Since the time constant is much longer than the reversal period of the signals of the inspection-use display signal line 21, the voltage is lowered and finally reaches the average value of the signals applied to the inspection-use display signal line 21.

Note that if the time taken for the charges to come out is too long and does harm to the inspection, for example, 0 V or +5 V instead of −10 V can be applied so that the inspection-use TFT 26a is operated with a moderately large resistance value.

In this manner, by performing the dynamic operating inspection with the respective displays of red, green, and blue, it is possible to easily achieve the visual detection of not only the luminous dot but also the leakage defect between the adjacent pixels, the leakage defect between the adjacent data lines 3, and the dark defect, i.e., the defect caused by the leakage between the pixel electrode 14 and the data line 3 which should not supply the signal to the pixel electrode 14 (in general, the data line 3 for supplying the signal to an adjacent pixel).

In the structure of the active matrix substrate 16 according to the present embodiment, the inspection-use display signal is supplied with the common inspection-use display signal line 21 only. Namely, since the inspection-use wiring where the signal delay must be concerned is only a single line, it is advantageous in the pattern arrangement.

Specifically, as in the below-described second embodiment, in the method where the inspection-use display signals for the inspection of red, green and blue are supplied by the respective lines, the signal delay must be concerned for each of the lines. When the line width is arranged to be large so as to lower the resistance value, the area of the pattern region required in the inspection becomes large on the whole, which is against such a restriction of the specifications that unnecessary regions should be reduced. Therefore, the present method is better in this point. In addition, the number of the signal lines is smaller, and the colors can be very easily switched by only performing the switching between high and low of the inspection-use control signal lines 25R, 25G, and 25B in correspondence with the color to be displayed.

Although only one inspection-use display signal line 21 is provided in this embodiment, more inspection-use display signal lines 21 can be provided. Specifically, in the case where the liquid crystal display device is large and the inspection-use display signal line 21 is overloaded when performing the whole display at the same time, resulting in a deficiency in the inspection, the block to be operated can be divided into a plurality of blocks, and the inspection-use display signal lines can be provided for the respective blocks. In this case, the wiring number is increased, but in addition to the above object, it may be convenient for specifying the position of the defect in the electrical inspection to be described below.

Next, the electrical inspection for detecting line defects is performed. For example, with regard to the leakage between the data line 3 and the scanning line 2, there is a case where although such a leakage is not visually recognized in the dynamic operating inspection, depending on the amount of the leakage, the defectiveness is visually recognized when a complicated signal is supplied after packaging, or the defectiveness is clarified by the gradual increase of the leakage current as used for a long time.

Since such a defect cannot be found in the above-described dynamic operating inspection, it is required that whether the defect exists or not should be judged by electrically performing a resistance inspection. When defective units are found, they are repaired if possible, and other defective units are discarded if their repair is impossible. What is important here is between which signal lines the leakage occurs.

For example, the leakage between the data line 3 and the opposing electrode can be repaired by a comparatively easy method such as applying a force physically. Meanwhile, the leakage between the scanning line 2 and the auxiliary capacity wiring 4 is difficult to repair, because it results from the large amount of remaining film in most cases.

In a conventional liquid crystal display panel, whether the defect exists or not was judged by individually measuring the electric resistance between the signal lines. However, the measurement in this manner takes too much time and is not practical considering the mass production.

In contrast, in the liquid crystal display panel of the present embodiment, for example, the inspection is performed in the following manner. Namely, the current is monitored while applying a negative voltage with short-circuiting the auxiliary capacity wiring 4 and the opposing electrode, and applying a positive voltage with short-circuiting the inspection-use display signal line 21 and the inspection-use scanning signal line 22. From a change in the current when supplying control signals to the inspection-use control signal lines 25R, 25G, 25B and the inspection-use control signal line 24, it is possible to judge between which signal lines a leakage occurs.

In the above case, for example, when the current is detected by switching on the inspection-use TFTs 26b on the side of the scanning line 2, it can be judged that the leakage occurs between the scanning line 2 and the auxiliary capacity wiring 4, because the leakage hardly occurs between the scanning line 2 (the same layer as the gate electrode 8) and the opposing electrode in such a cross-sectional structure as shown in FIG. 29.

When the current is detected by switching on the inspection-use TFTs 26a on the side of the data line 3, whether the leakage occurs between the data line 3 and the opposing electrode or between the data line 3 and the auxiliary capacity wiring 4 cannot be judged.

Thus, a positive voltage is applied with short-circuiting the inspection-use display signal line 21 and the opposing electrode, and a negative voltage is applied with short-circuiting the inspection-use scanning signal line 22 and the auxiliary capacity wiring 4. When the current is detected by switching on the inspection-use TFTs 26a on the side of the data line 3, it can be judged that the leakage occurs between the data line 3 and the auxiliary capacity wiring 4. Further, by detecting the current when bringing the both inspection-use TFTs 26a and 26b on the sides of the data line 3 and the scanning line 2, the leakage between the data line 3 and the scanning line 2 can be detected.

As described above, the advantage of this electrical inspection is that the whole resistance inspection can be completed by performing the switching between the two power-supplying manners and by only switching on/off the switching elements. Unlike the inspection of the conventional active matrix substrate 50 having the structure shown in FIG. 30, this method does not require a complicated relay circuit, etc. to be externally provided for switching the voltages between the terminals to be inspected every time.

In addition, in the structure of the active matrix substrate 16 of the present embodiment, when the leakage occurs in the data lines 3, it can be electrically judged that the data lines 3 including the leakage corresponds to either red, green, or blue. It is thus advantageous in repairing the leakage.

Moreover, by providing the inspection-use control signal line 24 and inspection-use control signal lines 25R, 25G, and 25B for the respective blocks, for example, the position of the leakage can be specified, which is further advantageous.

The method of inspecting the liquid crystal display panel provided with the active matrix substrate 16 in accordance with the present embodiment can be applied as described below. The inspection sequence is not limited to the above-mentioned one. In addition, for example, while applying different voltages to the inspection-use display signal line 21, the inspection-use scanning signal line 22, the opposing electrode, and the auxiliary capacity wiring 4, the current of the inspection-use display signal line 21 and the auxiliary capacity wiring 4 is monitored, and the inspection-use TFTs 26a and 26b are switched on/off, respectively. In this method, an extra power supply system is required, but all the resistance inspection can be performed by only switching on/off the inspection-use TFTs 26a and 26b, thereby achieving a further rapid inspection.

Thereafter, with regard to the liquid crystal display panel judged as a non-defective unit by performing the inspection, a required number of gate drivers 20b for driving the scanning lines 2 and a required number of source drivers 20a for driving the data lines 3 are packaged, and finally a FPC (Flexible Printed Circuit) (not shown) for supplying the signals required for driving these drivers 20 is packaged on the end of the insulating substrate 7 constituting the active matrix substrate 16, thereby completing the active-matrix-type liquid crystal display device.

By the way, as already mentioned, the inspection-use TFTs 26a and 26b make no contribution to the display after the display device is completed. The inspection-use TFTs 26a and 26b are rather harmful, considering that the data lines 3 and the scanning lines 2 are required to be electrically independent of each other. Namely, in order not to exert an ill effect, the inspection-use TFTs 26a and 26b must have a sufficiently high resistance after the display device is completed.

However, since the TFT is a semiconductor element, electron-hole pairs are generated in the intrinsic semiconductor on exposure to light, and the leakage current is increased. Namely, depending on the strength of light incident from the outside, light may exert an ill effect on the performance of the display device, and reliability is also concerned.

It is thus preferred that the inspection-use TFTs 26a and 26b are sufficiently shaded. Here, as shown in FIG. 1, the inspection-use TFTs 26a and 26b are provided at the positions facing the black matrix (crosshatched position in FIG. 1) of the opposing substrate 18.

With this arrangement, the useless region surrounding the viewing area 17 can be effectively used, and complete shading can be achieved. When the extra region is not sufficient in the black matrix region, or when the black matrix does not exist, shading can be achieved by the packaging members or other members.

Alternatively, it is possible to prevent the inspection-use TFTs 26a and 26b from being switched on in the active matrix substrate 16 after packaging is finished, by increasing threshold values of the inspection-use TFTs 26a and 26b. As described above, the situation where the inspection-use TFTs 26a and 26b are switched on when actually driving the liquid crystal panel after finishing the inspection thereof must be avoided, because an ill effect is produced on the display. By increasing the threshold values of the inspection-use TFTs 26a and 26b, the condition where the inspection-use TFTs 26a and 26b produce no ill effect on the display can be broadened.

Figure 3:
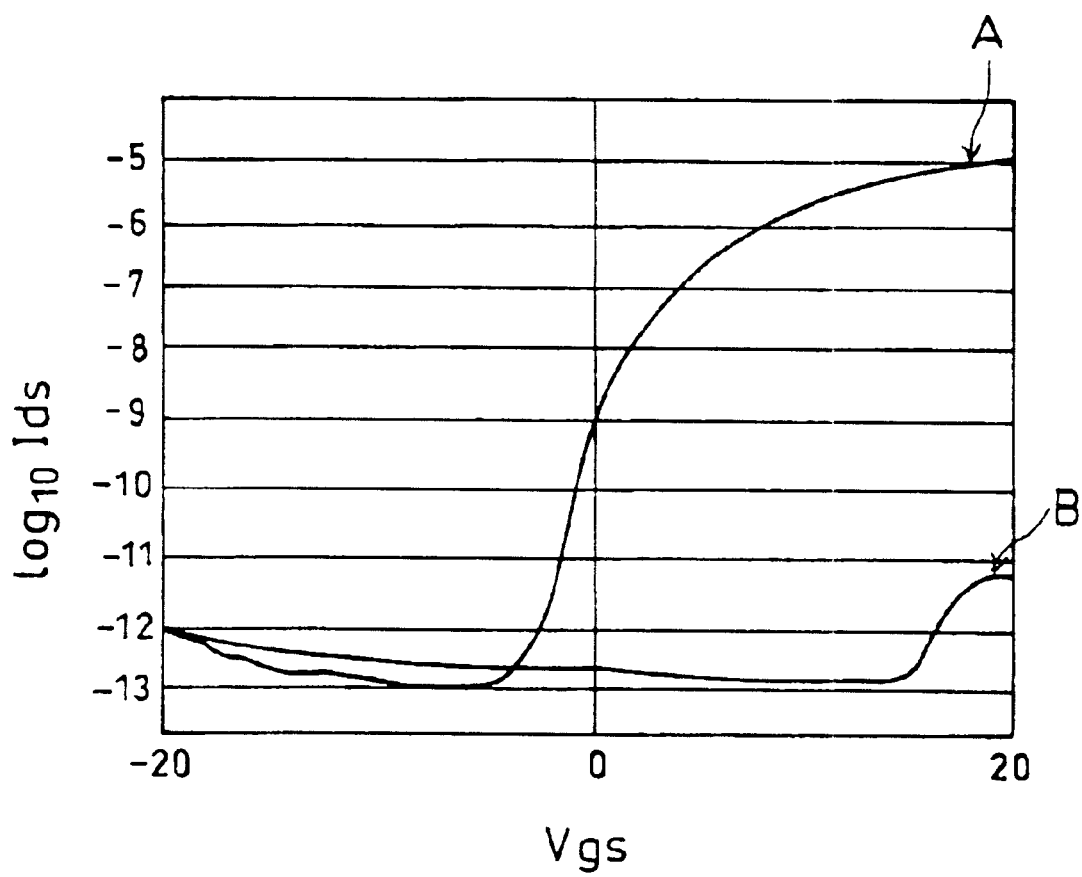
FIG. 3 is a graph showing characteristics of switching elements.

For example, a method for increasing the threshold values of the inspection-use TFTs 26a and 26b is as follows. In the liquid crystal display panel shown in FIG. 1, a positive bias of +50 V was applied to the inspection-use control signal lines 24, 25B, 25G, 25R (i.e., the gate electrodes of the inspection-use TFTs 26a and 26b), and the liquid crystal display panel was placed on a plate at 60° C. for about one minute. As a result, characteristics of the inspection-use TFTs 26a and 26b are significantly changed (from initial characteristic A to characteristic B) as shown in FIG. 3. Specifically, a large shift in the threshold value of the inspection-use TFTs 26a and 26b to a positive value was observed, and the inspection-use TFTs 26a and 26b are switched off even when a voltage of +20 V is applied to the inspection-use control signal lines 24 and 25 (characteristic B in FIG. 3). The shift in the threshold value is caused by only applying a large positive bias to the gate electrodes of the inspection-use TFTs 26a and 26b. However, application of the heat is preferred in that it enhances the shift.

Embodiment 2

Referring to drawings, the following descriptions will explain another embodiment of the present invention. For the sake of explanation, the members having the same function as those described above in the explanation of the prior art and the first embodiment will be designated by the same reference numbers, and their descriptions will be omitted.

Figure 4:
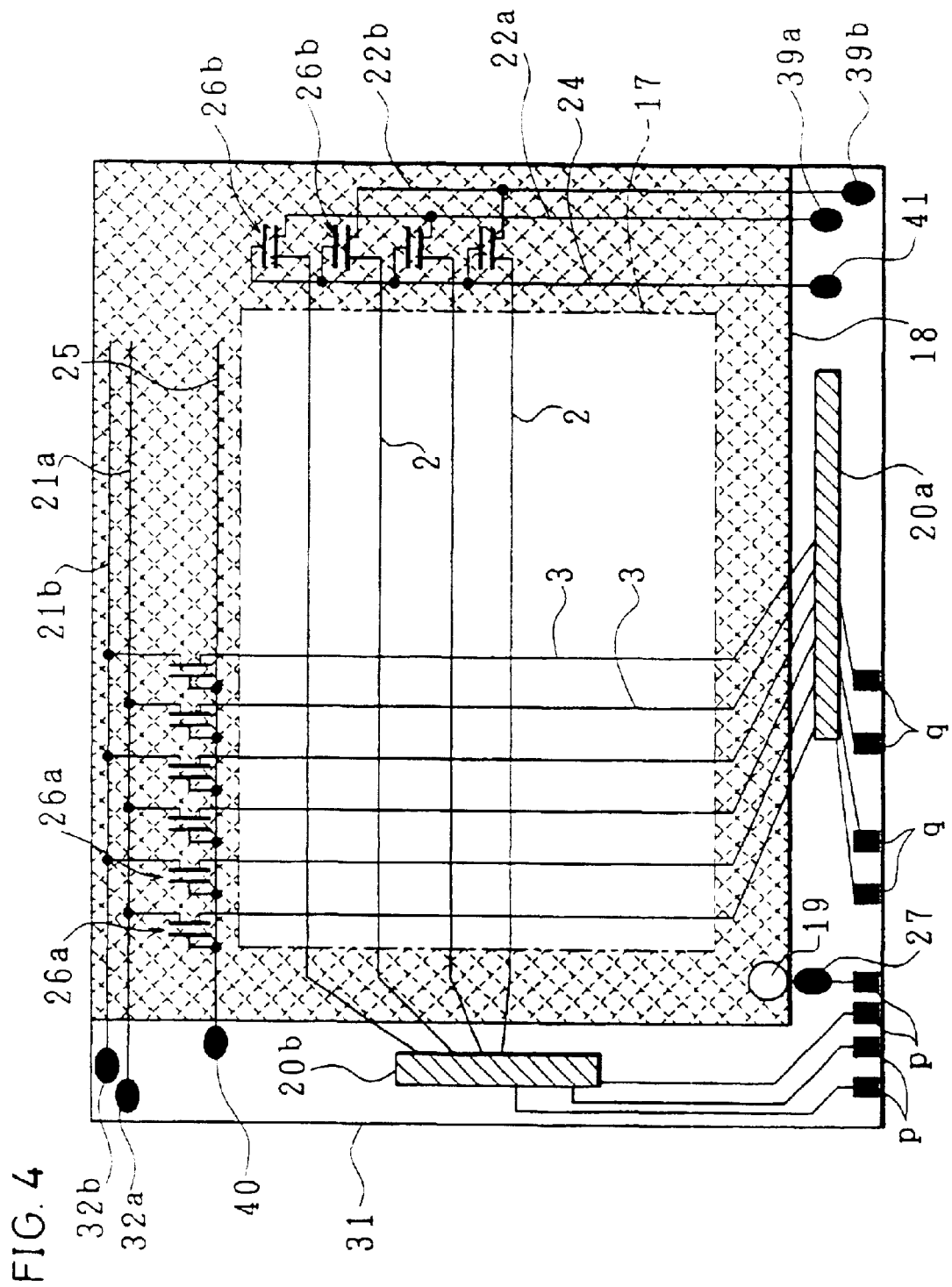
FIG. 4 is a schematic plan view of an active-matrix-type liquid crystal display device in accordance with another embodiment of the present invention.

FIG. 4 is a schematic plan view of an active-matrix-type liquid crystal display device of this embodiment.

Unlike the active matrix substrate 16 shown in FIG. 1 in accordance with the first embodiment, an active matrix substrate 31 of a liquid crystal display device shown in FIG. 4 has the following structure. Specifically, gates of inspection-use TFTs 26a are all connected to an inspection-use control signal line 25, sources of the inspection-use TFTs 26a are connected to an inspection-use display signal line 21a and an inspection-use display signal line 21b alternately. Sources of inspection-use TFTs 26b on the side of scanning lines 2 are connected to an inspection-use scanning signal line 22a and an inspection-use scanning signal line 22b alternately.

Signals are inputted from an inspection terminal 40 to the inspection-use control signal line 25, from inspection terminals 32a and 32b to the inspection-use display signal lines 21a and 21b, respectively, and from inspection terminals 39a and 39b to the inspection-use scanning signal lines 22a and 22b, respectively.

The active matrix substrate 16 shown in FIG. 1 has a Cs-on-Common structure including the auxiliary capacity wiring 4. In contrast, the active matrix substrate 31 has a so-called Cs-on-Gate structure in which the scanning line 2 for driving a pixel TFT 1 (see FIG. 28) of a pixel above or below another pixel is used as a substitute for the auxiliary capacity, thereby increasing the aperture ratio.

For the liquid crystal display panel including the active matrix substrate 31 having-such a structure, the dynamic operating inspection is performed in the following manner. FIGS. 5(a) to 5(f) shows the timings of the signals applied in the dynamic operating inspection.

While applying +20 V to an inspection-use control signal line 24 and to the inspection-use control signal line 25 (see FIGS. 5(a) and 5(b)), the signal same as that in the first embodiment is inputted to the inspection-use display signal lines 21a and 21b (see FIG. 5(c)), and the signal same as that in the first embodiment is inputted to the inspection-use scanning signal lines 22a and 22b at different timings (see FIGS. 5(d) and 5(e)). Further, a dc voltage of −1 V is applied to an opposing-substrate-use signal input terminal 27 (see FIG. 5(f)).

In the structure of the active matrix substrate 31, since the inspection-use wiring is not in correspondence with the colors, i.e., red, green, and blue, the color display cannot be performed, unlike the active matrix substrate 16 in the first embodiment. However, after the dynamic operating inspection, the leakage defect between the data lines 3 in the display device can be electrically detected.

Specifically, while the inspection-use TFTs 26a are switched on by applying +20 V to the inspection-use control signal line 25, the electric resistance between the inspection terminals 32a and 32b of the inspection-use display signal lines 21a and 21b, respectively, is measured.

In general, the leakage between the data lines 3 occur between the adjacent lines. Thus, by connecting the inspection-use TFTs 26a to the inspection-use display signal lines 21a and 21b alternately, such a leakage can be detected.

In order to detect the leakage, the resistance value required for the inspection-use TFT 26a in the switched-on state must be sufficiently smaller than that of the leakage to be detected. Specifically, in the case where a leakage of not more than 10 MΩ occurs between the data lines 3, it is generally necessary to discard the display device as a defective unit, because the leakage might be visually recognized, depending on the environment in which the device is placed and the period of time for which the device is used. Considering variations in the characteristics of the inspection-use TFTs 26a, it is preferred that the total resistance value of the inspection-use TFTs 26a in the switched-on state is not more than 10% of the resistance value (leakage resistance value) to be detected. Here, since two inspection-use TFTs 26a are provided in series between the inspection terminals 32a and 32b, the resistance value of one inspection-use TFT 26a is required to be not more than 500 kΩ (not more than 5% of the leakage resistance value).

In order to meet this requirement, the inspection-use TFT 26a is arranged to have a channel width of 200 ($\mu$m) and a channel length of 5 ($\mu$m) in the present embodiment. This arrangement is designed so that the resistance value becomes 170 kΩ, which is calculated from the electrostatic capacity of the insulating film per unit area and the mobility of the electrons in the semiconductor. Of course, the channel size must be re-designed, depending on the structure of the inspection-use TFT 26a.

The voltage of the control signal is not limited to +20 V mentioned above. Namely, the higher voltage of the control signal supplied to the inspection-use control signal line 25 is the more advantageous if it does not break the inspection-use TFT 26a, because the resistance value of the inspection-use control signal line 25 in the switched-on state becomes lower.

By the way, it was already mentioned that the color display is impossible with the structure of the active matrix substrate 31 shown in FIG. 4. This problem can be solved with the arrangement of an active matrix substrate 33 shown in FIG. 6.

Namely, in the active matrix substrate 33, the source of the inspection-use TFT 26a is connected to inspection-use display signal lines 21R, 21G, or 21B for the inspection of red, green, or blue, respectively, in correspondence with the color of the data line 3 to which the inspection-use TFT 26a is connected.

Therefore, the color display is enabled by supplying the signal for switching on the inspection-use TFTs 26a to the inspection-use control signal line 25, and by independently supplying the signals to the three inspection-use display signal lines 21R, 21G, and 21B. Of course, like the case of FIG. 4, the leakage between the data lines 3 can be detected by measuring the resistance value of inspection terminals 32R, 32G, and 32B.

Figure 6:
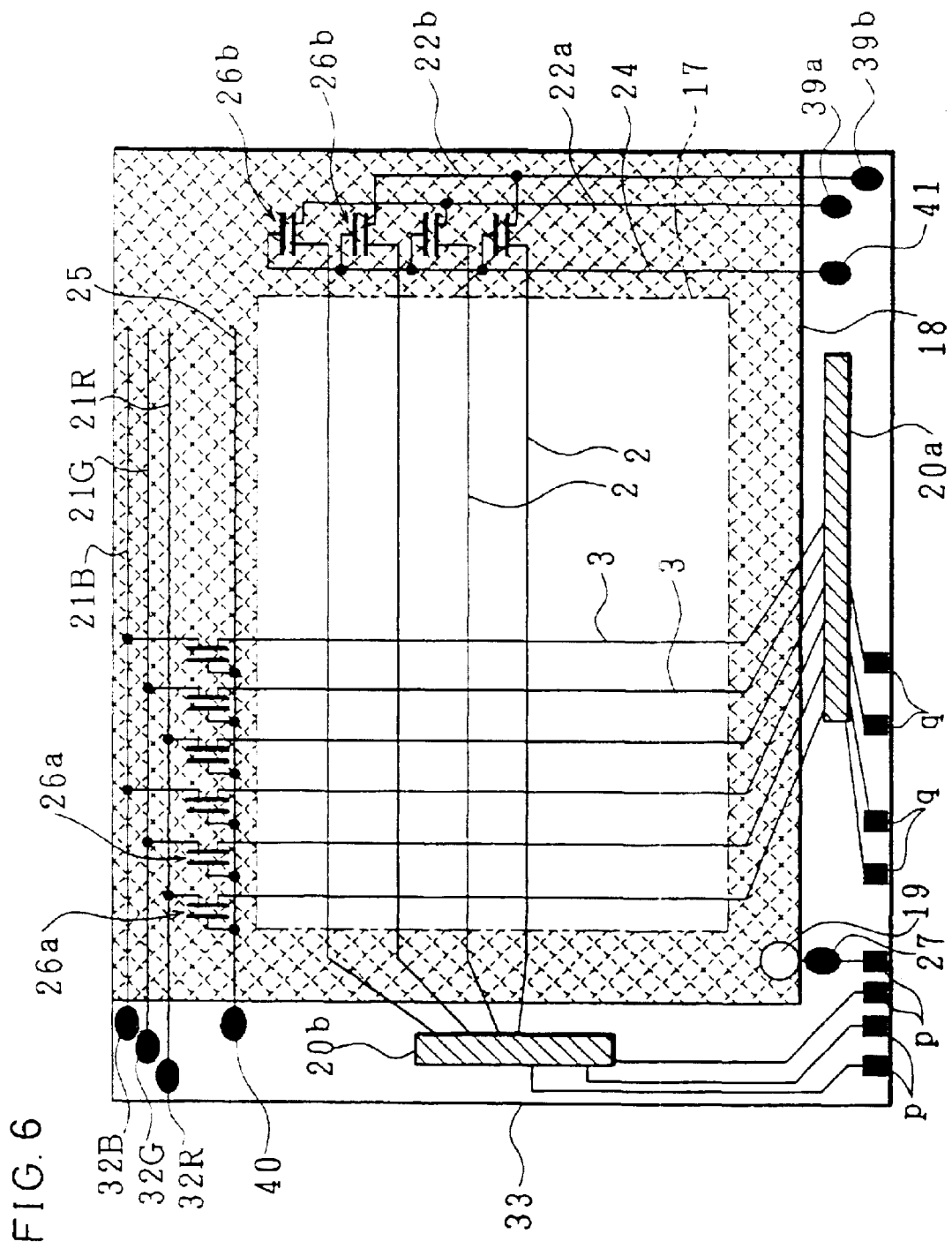
FIG. 6 is a schematic plan view of an active-matrix-type liquid crystal display device in accordance with another embodiment of the present invention.

Further, both in the active matrix substrate 31 shown in FIG. 4 and the active matrix substrate 33 shown in FIG. 6, two inspection-use scanning signal lines 22a and 22b are provided, and the scanning lines 2 are alternately connected to one of the inspection-use scanning signal lines 22a and 22b. Specifically, the nth (n: even number) scanning line 2 is connected to the inspection-use scanning signal line 22a, and the mth (m: odd number) scanning line 2 is connected to the inspection-use scanning signal line 22b.

This arrangement meets the requirement that the signals for switching on the pixel TFTs 1 should be supplied to the adjacent (upper and lower) scanning lines 2 at different timings in the Cs-on-Gate structure.

In this structure where the scanning lines 2 are connected to inspection-use scanning signal lines 22a and 22b alternately, on the principle same as that of the above-mentioned resistance inspection of the leakage of the data lines 3, the leakage between the scanning lines 2 can be detected by measuring the resistance between the inspection terminals 39a and 39b after the dynamic operating inspection. Also in this case, it is preferred that the resistance value of the inspection-use TFTs 26*b* is not more than 500 kΩ (not more than 5% of the leakage resistance value).

Moreover, in the present embodiment, the single inspection-use control signal line 24 and the single inspection-use control signal line 25 are provided on the scanning line side and the data line side, respectively. However, for the same reason as described in the first embodiment, in the case where the inspection-use display signal line and the inspection-use scanning signal line are overloaded when performing the whole display, or the opposing electrode and the auxiliary electrode are overloaded, resulting in a deficiency in the inspection, the line may be divided into a plurality of lines, and each block may be separately operated, thereby solving the problem.

Embodiment 3

Referring to drawings, the following descriptions will explain another embodiment of the present invention. For the sake of explanation, the members having the same function as those described above in the explanation of the prior art and the first and second embodiments will be designated by the same reference numbers, and their descriptions will be omitted.

Figure 7:
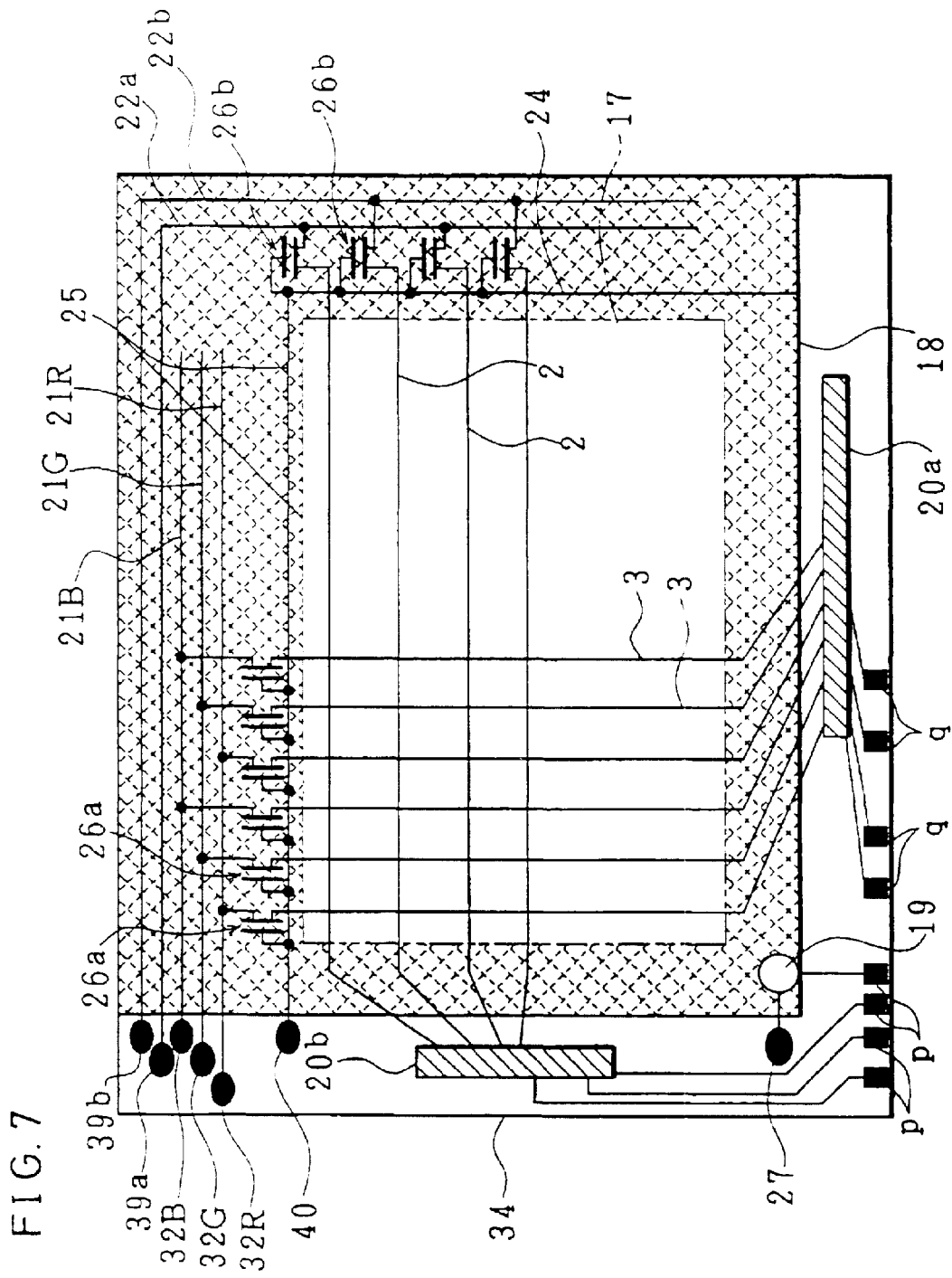
FIG. 7 is a schematic plan view of an active-matrix-type liquid crystal display device in accordance with another embodiment of the present invention.

FIG. 7 is a schematic plan view of an active-matrix-type liquid crystal display device of this embodiment.

An active matrix substrate 34 shown in FIG. 7 is different from the active matrix substrate 33 of the second embodiment shown in FIG. 6 in that signals required in the inspection are all supplied from one side. Namely, inspection-use scanning signal lines 22*a* and 22*b* are extended to a side where a gate driver 20*b* is provided, and inspection terminals 39*a* and 39*b* are formed on this side. An inspection-use control signal line 24 is electrically connected to an inspection-use control signal line 25 on the side of data lines 3, inside the panel. Signals are supplied to the inspection-use control signal line 24 from an inspection terminal 40. In addition, an inspection terminal 27 for the signal input to an opposing substrate 18 is also provided on the same side as the inspection terminals (39*a*, 39*b*, 32R, 32G, 32B, 40) so that signals can be also inputted to the opposing substrate 18 in the inspection.

By providing the inspection terminals (39*a*, 39*b*, 32R, 32G, 32B, 40, 27) on the same side, the design of the inspection-use jig becomes easy and requires low cost, and the rate of occurrence of a defective contact due to deviation in the rotating direction of the liquid crystal display panel when the liquid crystal display panel is placed on the jig is lower than that in the case where the inspection terminals are on more than one side.

In addition, even in the state where a plurality of liquid crystal display panels are placed in a longitudinal direction in the view, the inspection can be performed. Therefore, even when inspecting a number of small-scale panels, they can be inspected at one time, thereby increasing productivity.

Specifically, after producing the substrate as a large substrate, the substrate is divided in a direction parallel to the longer side of the view before the dynamic operating inspection, and then the side of an opposing substrate 18, where the inspection terminals (39*a*, 39*b*, 32R, 32G, 32B, 40, 27) are provided, is cut, thereby enabling a contact with the terminals. After performing the dynamic operating inspection, the substrate is divided into individual liquid crystal display panels. Then, in each liquid crystal display panel, a part of the opposing substrate 18, corresponding to the area on which the source driver 20*a* is packaged, is cut and removed.

With this structure, for example, in the case where an insulating tape, etc. are to be applied to the inspection terminals (39*a*, 39*b*, 32R, 32G, 32B, 40, 27) so as to prevent static electricity and unnecessary, signals from entering from the inspection terminals after packaging, the area where the insulating tape is to be applied is limited to one side, thereby improving workability.

Figure 8:
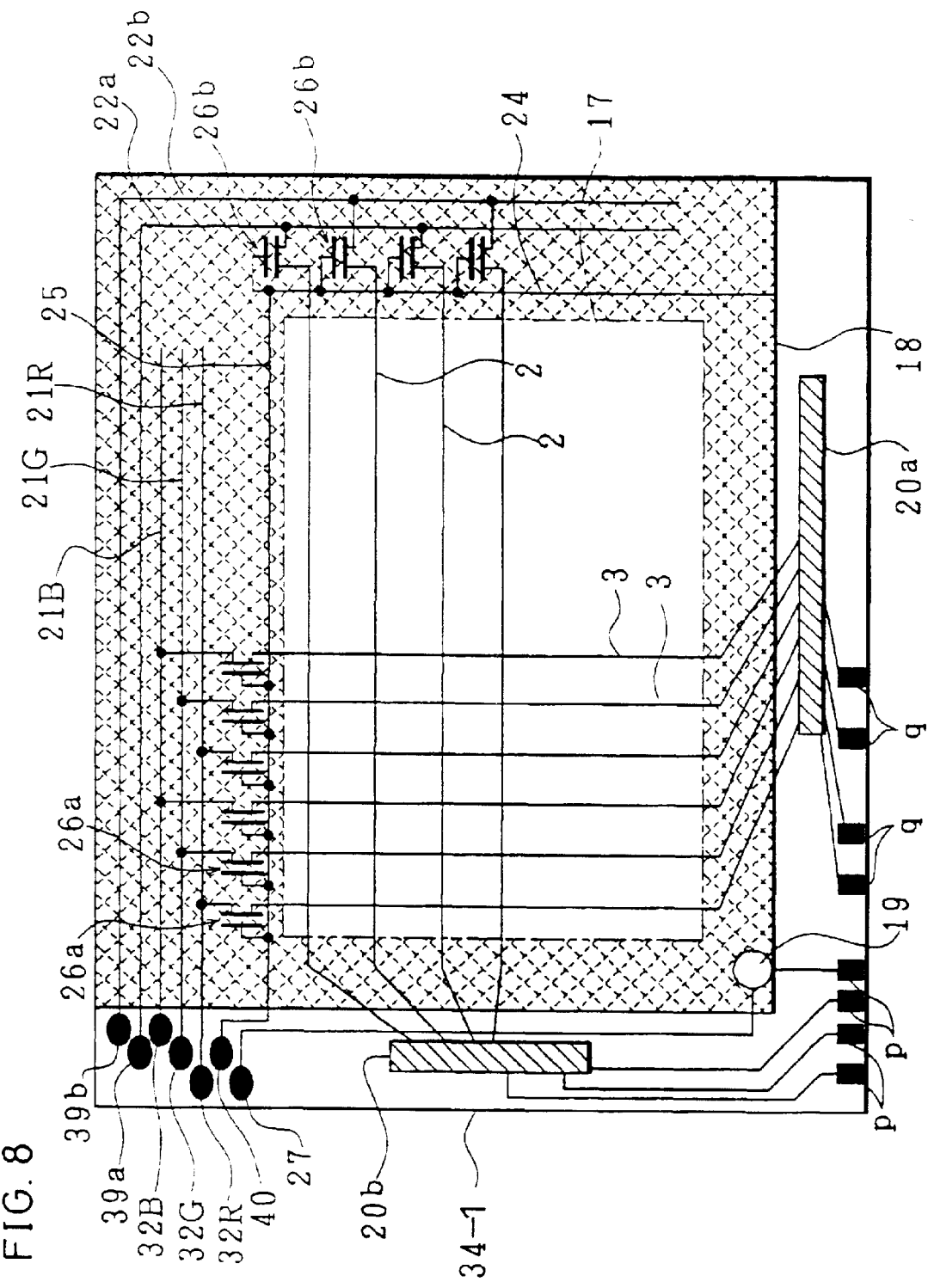
FIG. 8 is a schematic plan view of an active-matrix-type liquid crystal display device in accordance with another embodiment of the present invention.

Moreover, as shown in FIG. 8, with the arrangement where the inspection terminals (39*a*, 39*b*, 32R, 32G, 32B, 40, 27) are centralized-at any-one position in the liquid crystal display panel, i.e., closely disposed within a specific region on one side of an active matrix substrate 34-1, it is possible to easily align the panel with an inspection-use jig, and to improve workability when providing the insulating tape, etc.

Further, in the active matrix substrate 34 shown in FIG. 7, the inspection-use control signal line 25 on the side of the data line 3 and the inspection-use control signal line 24 on the side of the scanning line 2 are electrically connected to each other inside the panel. Therefore, it is unnecessary to secure an extra wiring area. In addition, by only switching the signals to be supplied to the single control signal line between high and low, all the inspection-use TFTs 26*a* and 26*b* are switched between on and off, and the switching between the inspection mode and the actual display mode is possible.

Figure 9:
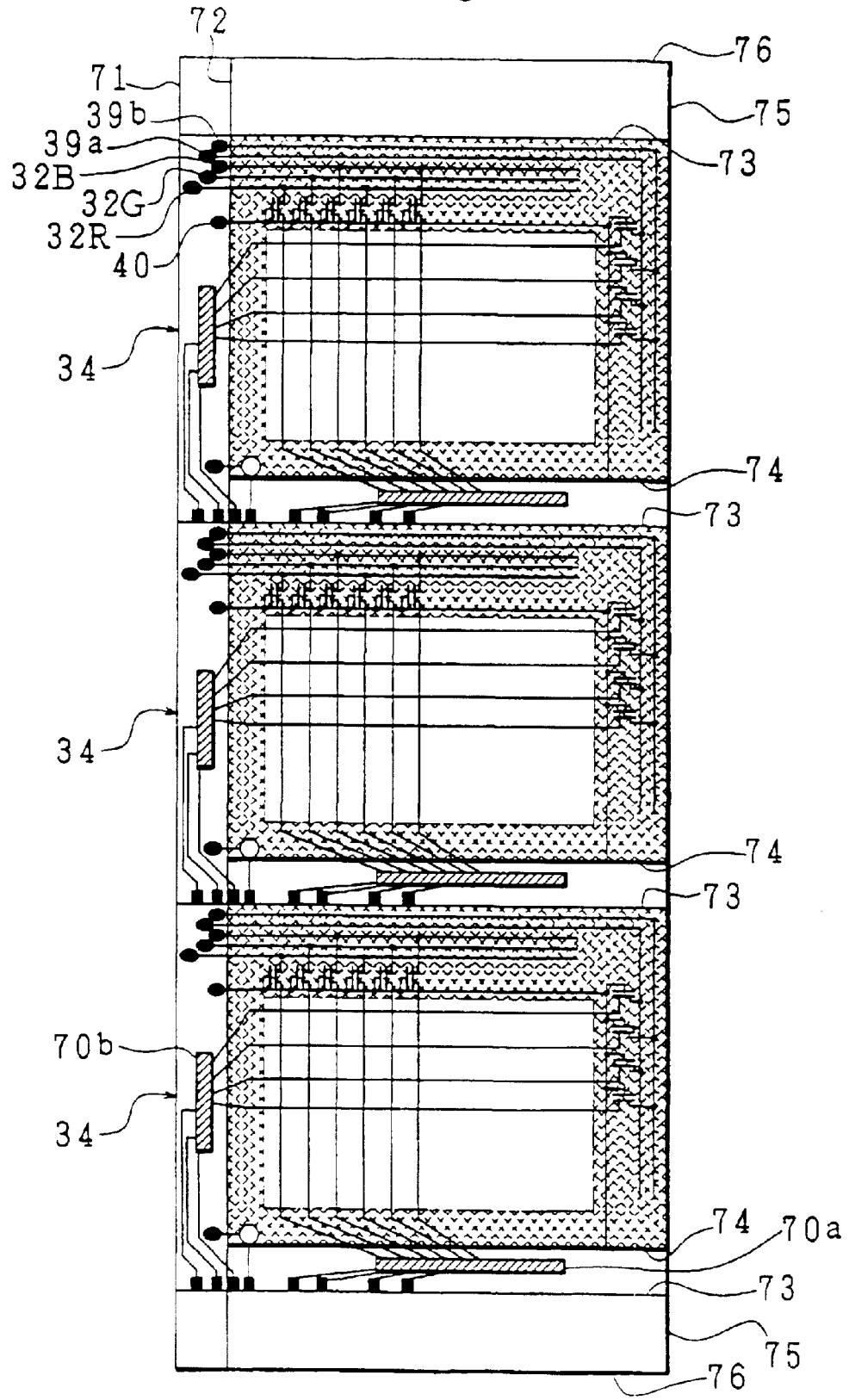
FIG. 9 is a schematic plan view of a mother substrate of an active-matrix-type liquid crystal display device in accordance with another embodiment of the present invention.

FIG. 9 corresponds to the case where the inspection is performed for a plurality of liquid crystal display panels which are formed by dividing the active matrix substrates 34 produced in a state of being a large substrate into rectangular substrates. In FIG. 9, the substrate including a plurality of active-matrix-type liquid crystal display panels formed in the direction of the data line is referred to as a "mother substrate". Conventionally, a plurality of active matrix cells arranged in rows and columns were formed on a mother glass, the opposing substrate was adhered thereto, and the substrate was divided into individual cells. In contrast, in the present embodiment, the substrate is divided into not the individual cells but the rectangular substrates before the inspection. Instead of dividing the substrate after adhering the active matrix substrate 34 to the opposing substrate 18, there is a case where the active matrix substrate 34 and the opposing substrate 18 are divided into a predetermined shape (i.e., a rectangular shape) in advance and then adhered to each other, depending on the processes.

FIG. 9 shows that the liquid crystal display panels are in the inspection step. A division line 71 for the active matrix substrate 34 and a division line 72 for the opposing substrate 18 are deviated from each other. The division lines 71 and 72 are arranged as above so as to expose the region where the inspection terminals (39*a*, 39*b*, 32R, 32G, 32B, 40, 27) are provided, and bring the region into contact with the inspection-use jig. This region becomes a scanning-line-side packaging region when the liquid crystal display panel is completed. In the above arrangement, all the inspection terminals of the respective cells are provided on the side corresponding to the scanning-line-side packaging region. It is thus possible to perform the dynamic operating inspection and the electrical inspection as in normal cases, even in the state where a data-line-side packaging region is covered by the opposing substrate 18 as shown in FIG. 9. The inspection method is the same as that mentioned above.

After the inspection is finished, the substrate is divided into individual cells by cutting the substrate along a division line 73. Then, the opposing substrate 18 is cut along the division line 74 so as to expose the data-line-side packaging region. In FIG. 9, 70a and 70b are parts on which the source driver and the gate driver are installed, respectively, and 75 is an unnecessary part to be discarded after dividing the substrate into the cells.

As described above, in the arrangement shown in FIG. 9, a plurality of cells can be inspected at one time. Therefore, an efficient inspection can be achieved, and the cost of the inspection can be reduced. In addition, in the case of inspecting the mother substrate, the mother substrate is installed on the inspection-use jig by using an end face 76 of the mother glass as a reference. Since the dimension accuracy of the end face 76 is sufficiently high, the mother substrate can be more easily aligned with the inspection-use jig than in the case where the cell produced by cutting the substrate is installed on the inspection-use jig.

Figure 10:
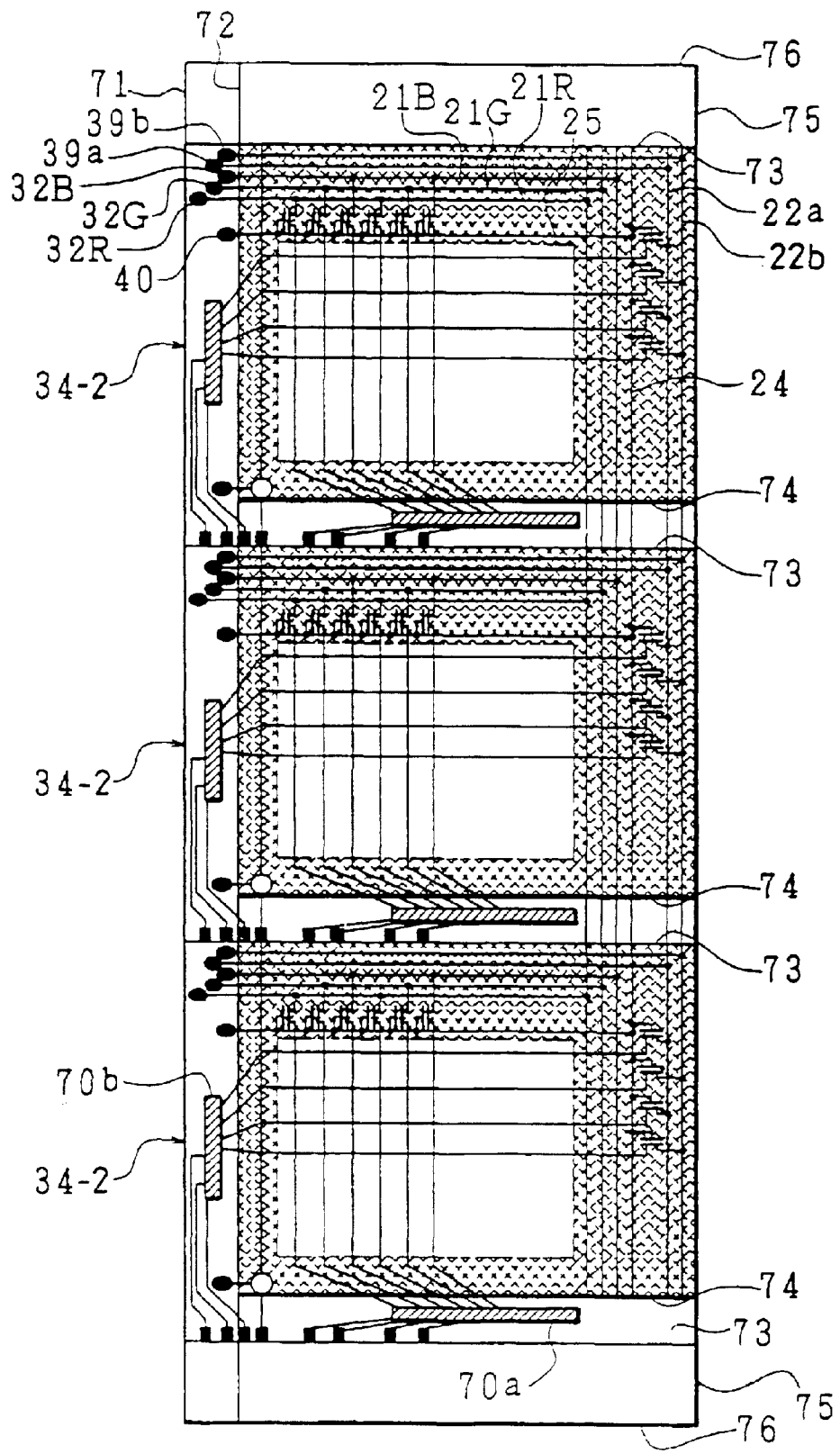
FIG. 10 is a schematic plan view of a mother substrate of an active-matrix-type liquid crystal display device in accordance with another embodiment of the present invention.

Next, FIG. 10 shows the arrangement where wiring for supplying the same signal in the adjacent cells are linked to each other. In FIG. 10, the substrate referred to as a "mother substrate" includes a plurality of active matrix substrates 34-2 with a structure similar to the active matrix substrate 34 in the direction of the data line. The active matrix substrates 34-2 in this mother substrate are arranged so that wiring (22a, 22b, 24, 25, 21B, 21G, 21R) connected to the inspection terminals (39a, 39b, 32R, 32G, 32B, 40) in one cell are linked to the same kind of wiring (22a, 22b, 24, 25, 21B, 21G, 21R) in another cell. The inspection-use control signal line 25 in one cell is linked to the inspection-use control signal line 25 in another cell through the inspection-use control signal lines 24, because the inspection-use control signal line 25 is connected to the inspection-use control signal line 24.

In this case, if some inspection terminals are in poor contact for the signal input due to the deviation of the alignment and the inspection signal input pins, signals are supplied from the adjacent cell through the linkage part, thereby enabling the inspection. Further, in order to reduce the cost of manufacturing the jig, the inspection signal input pins of a cell between other cells may be omitted, and input terminals may be provided alternately in the cells if the pitch of the signal input terminal is small. For example, the inspection terminals 39a, 32G, 40, and 27 may be provided in a first cell, and the inspection terminals 39b, 32B, 32R, and 27 may be provided in an adjacent second cell. With this arrangement, it is possible to facilitate the input of the inspection signals and reduce the cost of manufacturing the inspection-use jig.

Further, in the structure shown in FIG. 10, by linking the wiring for supplying the same signal, it becomes unnecessary to input the inspection signal to inspection-use signal wiring (22a, 22b, 24, 25, 21B, 21G, 21R) in each cell. Therefore, instead of disposing the inspection terminals in the scanning-line-side packaging region, the inspection terminals can be disposed in the margin region 75 of the mother glass in the case where a sufficient space cannot be secured in the vicinity of inspection-use signal wiring in each cell (upper part of each cell in the view), and the case where a sufficient space cannot be secured for disposing the inspection terminals.

In this case, a part of the opposing substrate 18, which faces the margin region 75, is required to be removed before the inspection step so that signals can be inputted to the inspection terminals in the margin region 75.

Figure 11:
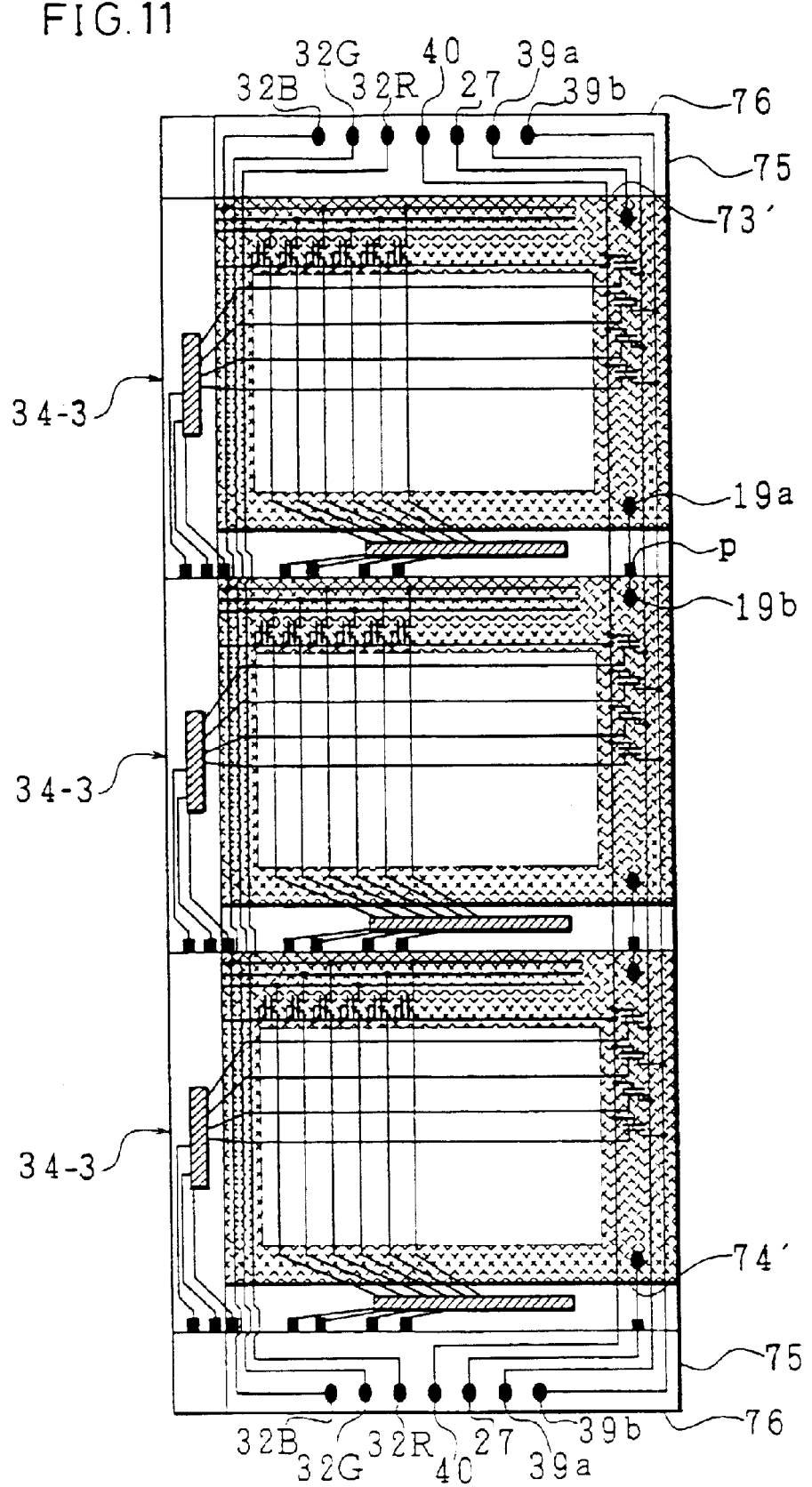
FIG. 11 is a schematic plan view of a mother substrate of an active-matrix-type liquid crystal display device in accordance with another embodiment of the present invention.

FIG. 11 shows a mother substrate having the inspection terminals disposed on the margin region 75 of the mother glass. The mother substrate in FIG. 11 is arranged so that a plurality of active matrix substrates 34-3 having a structure similar to that of the active matrix substrate 34 are formed in the direction of the data line 3.

In the mother substrate, the opposing-substrate-use signal input terminal 27 for inputting signals to a common electrode on the side of the opposing substrate 18 is provided in the margin region 75 like the above-mentioned inspection terminals, and the common electrodes of the adjacent cells are connected through common transfer sections 19a and 19b with the wiring on the side of the active matrix substrate 34-3. Namely, as shown in FIG. 11, the common transfer sections 19a and 19b are provided in an upper section of one cell and in a lower section of the other cell, respectively, with regard to two adjacent cells. The wiring on the side of the active matrix substrate 34-3 connects the common transfer sections 19a and 19b, and includes a terminal p for applying a voltage to the opposing substrate 18 when actually driving the liquid crystal display panel. With this arrangement, a voltage is applied from the terminal p to the opposing substrate 18 through the common transfer section 19a, when actually driving the liquid crystal display panel after dividing the substrate into the cells.

Further, the respective positions of the inspection terminals with respect to the end face 76 of the mother glass are common in all the other models. Therefore, even if the cells are different in specifications such as the size, all the inspections can be performed with a common jig. Consequently, even in the case where the liquid crystal display panels of various models are produced in small amount, it is possible to perform the inspections similarly to the case where the liquid crystal display panels of a single model are produced in large amount, thereby improving the productivity. The alignment with the jig is mechanically performed by using the end face 76 of the mother glass. Since the dimension accuracy of the mother glass is satisfactorily high, the alignment for the signal input can be easily performed, and the input terminals can be sufficiently enlarged in this arrangement.

In the example shown in FIG. 11, the linkage of the inspection-use wiring between the adjacent cells is achieved by a simple electric connection. If there is a sufficient margin in space, the connection through a switching element may be favorable. In this case, a cell which is not subjected to the inspection can be selected by only performing the switching of the switching element. Therefore, this arrangement is favored in the case where a deficiency is caused by overloading the inspection-use wiring when inspecting all the cells at the same time, and the case where a serious leak defect exists in any cell and a sufficient voltage is not applied to the inspection wiring due to too large leakage current, thereby producing an ill effect on the inspection of other cells. Moreover, in the case of the electrical inspection mentioned above, specifying a defective cell becomes easier by performing the inspection while switching the cells.

In the above explanation, the substrate including a plurality of active matrix cells linked in the direction of the data line is referred to as the mother substrate. When the active matrix cells are arranged in the direction of the scanning line, similar effects can be obtained. Therefore, the term "rows" in claims does not define a linkage direction of the cells.

In the structures shown in FIGS. 9 to 11, the data lines 3 are connected to the inspection-use control signal line 25 and the inspection-use display signal lines 21B, 21G, 21R through the inspection-use TFTs 26a. However, when the data lines 3 are brought into conduction with the inspection-use display signal lines 21B, 21G, and 21R while the liquid crystal display panel is actually driven, an ill effect is produced on the display. Therefore, while the liquid crystal display panel is driven, a potential for switching off the inspection-use TFTs 26a is applied to the inspection-use control signal line 25 so as to keep the inspection-use TFTs 26a switched off.

Figure 12:
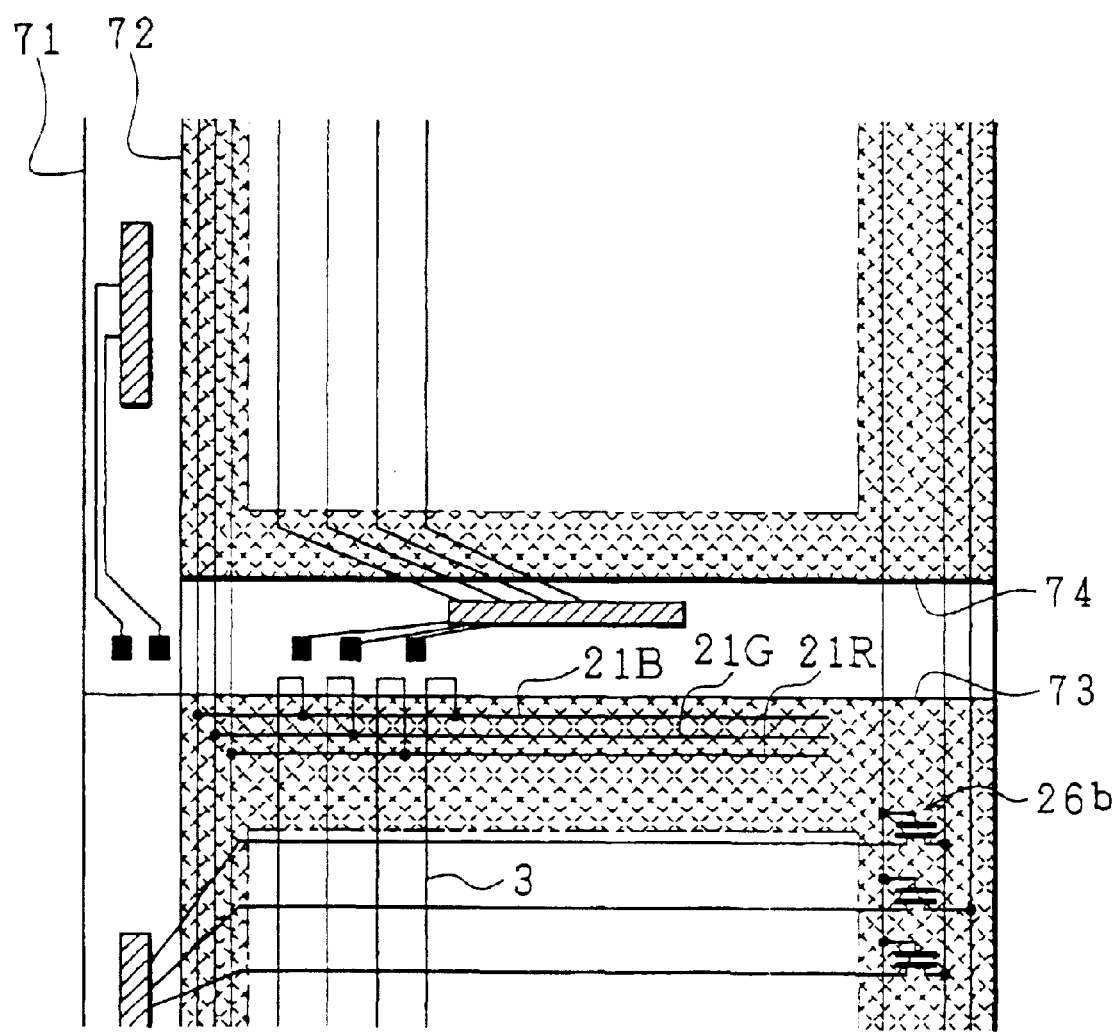
FIG. 12 is a schematic plan view showing a part where adjacent liquid crystal panels are connected to each other in a mother substrate of an active-matrix-type liquid crystal display device in accordance with another embodiment of the present invention.

In contrast, in the structure shown in FIG. 12, the data lines 3 are not connected to the inspection-use control signal line 25 and the inspection-use display signal lines 21B, 21G, 21R through the inspection-use TFTs 26a. Specifically, the data lines 3 in a cell (first cell) are extended to an adjacent cell (second-cell-), folded back to the first cell, and directly connected to the inspection-use display signal lines 21B, 21G, and 21R in the first cell. In this case, since the inspection-use TFTs 26a are not formed, the inspection-use control signal line 25 becomes unnecessary.

With this arrangement, in the state of the mother substrate, the data lines 3 are always connected to the inspection-use display signal lines 21B, 21G, and 21R. Therefore, the inspection can be performed by supplying the signals to the scanning lines 2 through the inspection-use TFTs 26b as described above, and by supplying data signals similar to those in a normal dynamic operating inspection to the inspection-use display signal lines 21B, 21G, and 21R. When dividing the substrate into individual cells after the inspection, extended sections of the data lines 3 are cut in a folded part. Thus, the data lines 3 are separated from the inspection-use display signal lines 21B, 21G, 21R, and become individual wiring independent of each other.

With the above structure, the number of the inspection-use switching elements are substantially reduced. Therefore, a concern over the yield decrease caused by the leakage defect between the data lines in a switching element section is largely reduced, and the structure is favorable in reliability. Further, the restrictions on the space for the inspection-use TFTs 26a are relieved. In addition, since the input resistance of the inspection signal to the data lines 3 is significantly lowered, it is possible to perform the inspection with less write time, resulting in a contribution to the improvement of the inspection accuracy. Although the folded part remains in the adjacent cell (second cell), it produces no electrical deficiency, and it can be removed by chamfering, etc. if necessary. Moreover, when the mother substrate has the arrangement where the cells are formed not in the direction of the data line but in the direction of the scanning line, it is needless to say that not the data lines but the scanning lines are folded back from the adjacent cell.

Figure 13:
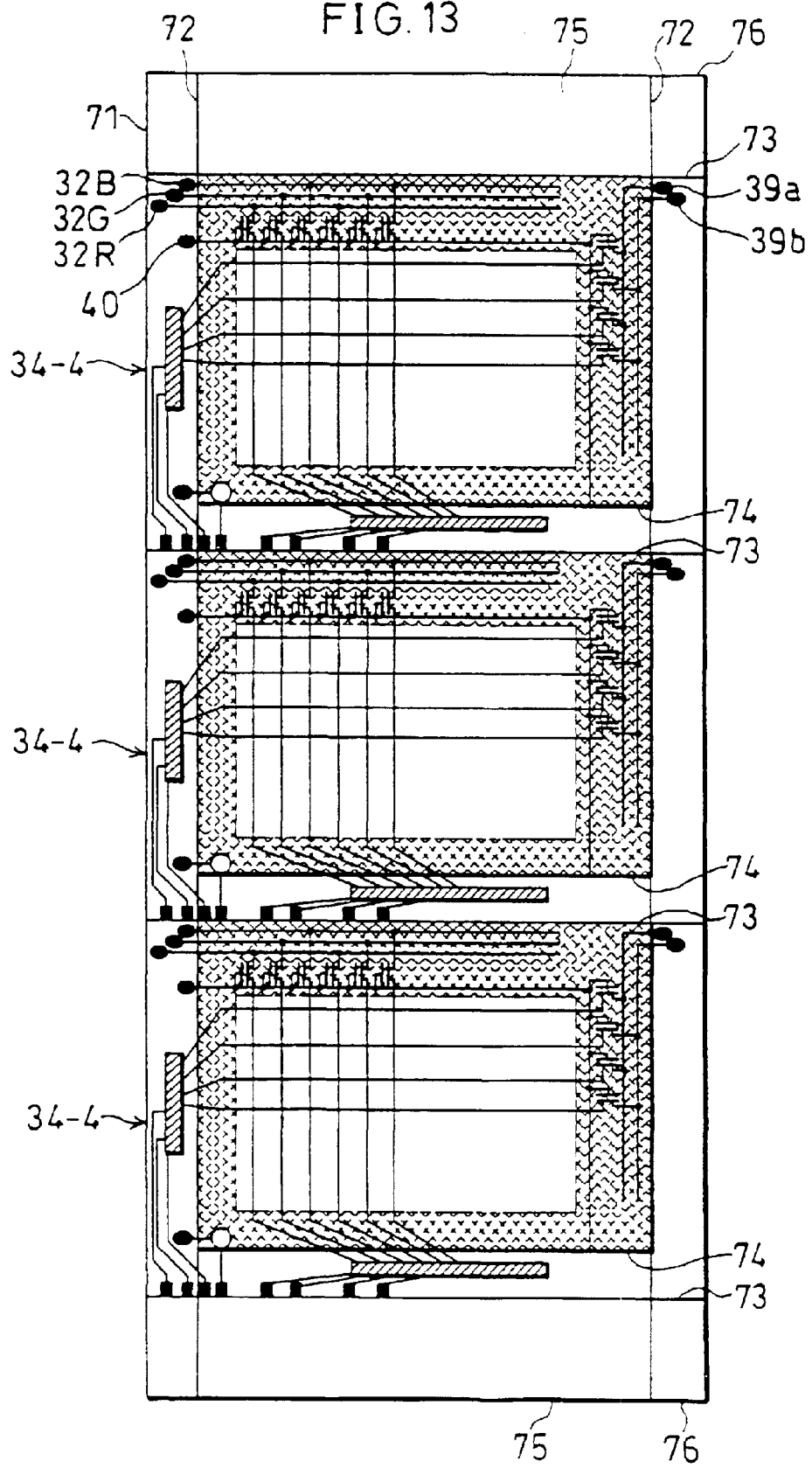
FIG. 13 is a schematic plan view of a mother substrate of an active-matrix-type liquid crystal display device in accordance with another embodiment of the present invention.

In the structures shown in FIGS. 9 and 10, all the inspection terminals (39a, 39b, 32R, 32G, 32B, 40, 27) in the respective cells are provided on one side corresponding to the scanning-line-side packaging region. As shown in FIG. 13, the inspection terminals may be provided on two sides opposing each other. Specifically, in the structure shown in FIG. 13, the inspection terminals 32R, 32G, 32B, 40 and 27 are provided on the side corresponding to the scanning-line-side packaging region, and the inspection terminals 39a and 39b are provided on the opposite side. In the state that a data-line-side packaging region is covered with the opposing substrate 18, the dynamic operating inspection and the electrical inspection can be performed as in normal cases. Namely, it is possible to inspect a mother substrate having a plurality of active-matrix-type liquid crystal display panels linked in a direction of the data line.

Embodiment 4

Referring to drawings, the following descriptions will explain another embodiment of the present invention. For the sake of explanation, the members having the same function as those described above in the explanation of the prior art and the first to third embodiments will be designated by the same reference numbers, and their descriptions will be omitted.

As already described, inspection-use TFTs 26a and 26b make no contribution to the display after the display device is completed. In addition, it is essential that the inspection-use TFTs 26a and 26b have a sufficiently high resistance after completion of the display device, because data lines 3 and scanning lines 2 must be electrically independent of each other.

In order to realize this, it is preferred that signals for switching off the inspection-use TFTs 26a and 26b are supplied to the inspection-use TFTs 26a and 26b while performing the display. In the case where the inspection-use TFTs 26a and 26b are n-type, a negative voltage is preferably applied to the gate during performing the display.

Figure 14:
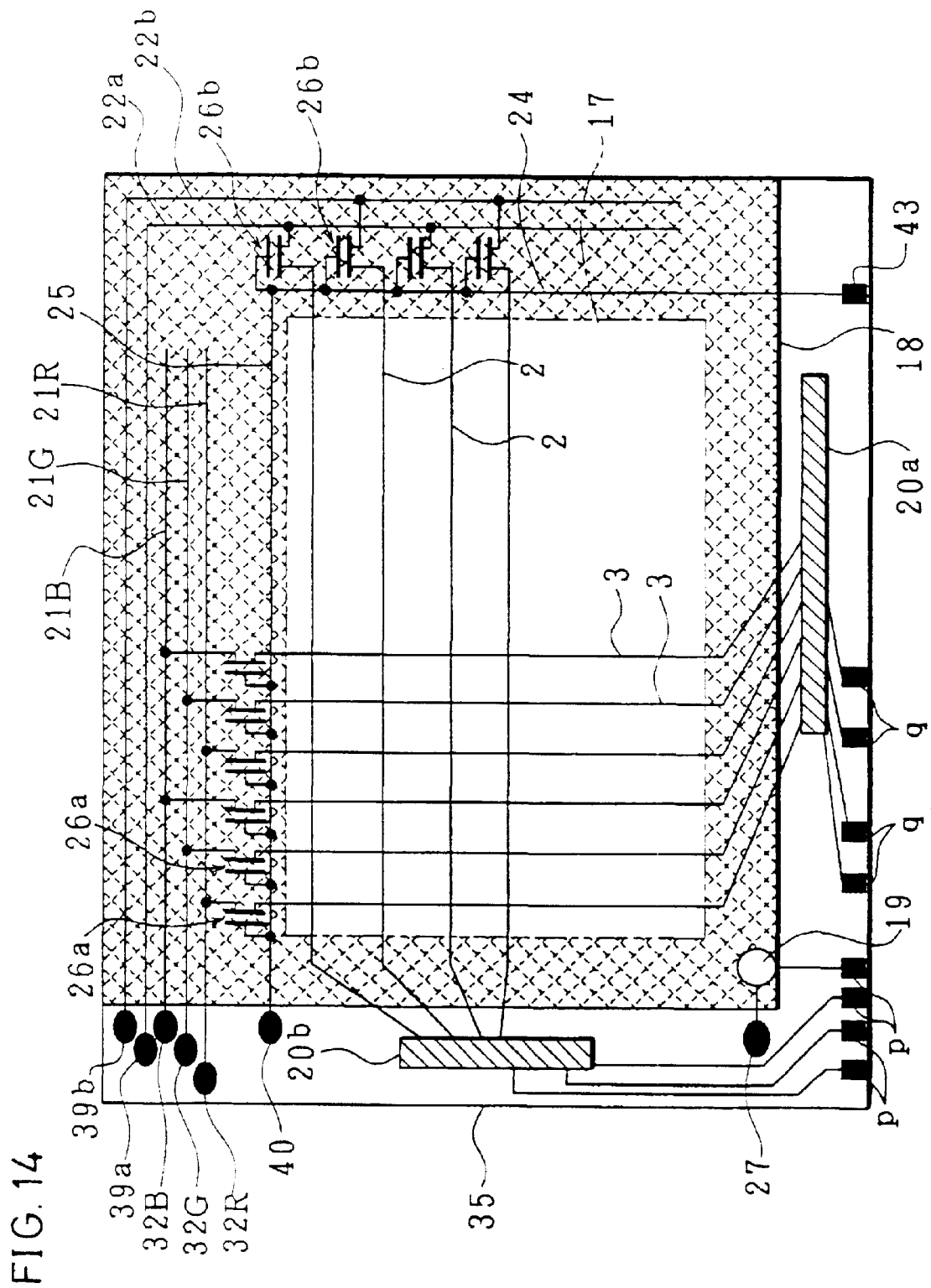
FIG. 14 is a schematic plan view of an active-matrix-type liquid crystal display device in accordance with another embodiment of the present invention.

Thus, in an active matrix substrate 35 of an active-matrix-type liquid crystal display device of this embodiment, shown in FIG. 14, one end of a single inspection-use control signal line 25 (24) connected inside the panel is extended to the bottom end (in the view) of the active matrix substrate 35. Other arrangements are the same as the active matrix substrate 34 of the third embodiment, shown in FIG. 7.

This bottom end is an area where a FPC for supplying signals to drivers 20 is to be connected. A terminal 43 for supplying the signal to the single inspection-use control signal line 25 (24) is provided in this area and connected to the FPC, thereby applying a negative voltage from outside to the inspection-use TFTs 26a and 26b. With this arrangement, the inspection-use TFTs 26a and 26b are invariably switched off while driving the liquid crystal display device, thereby preventing a deficiency in the display.

Figure 15:
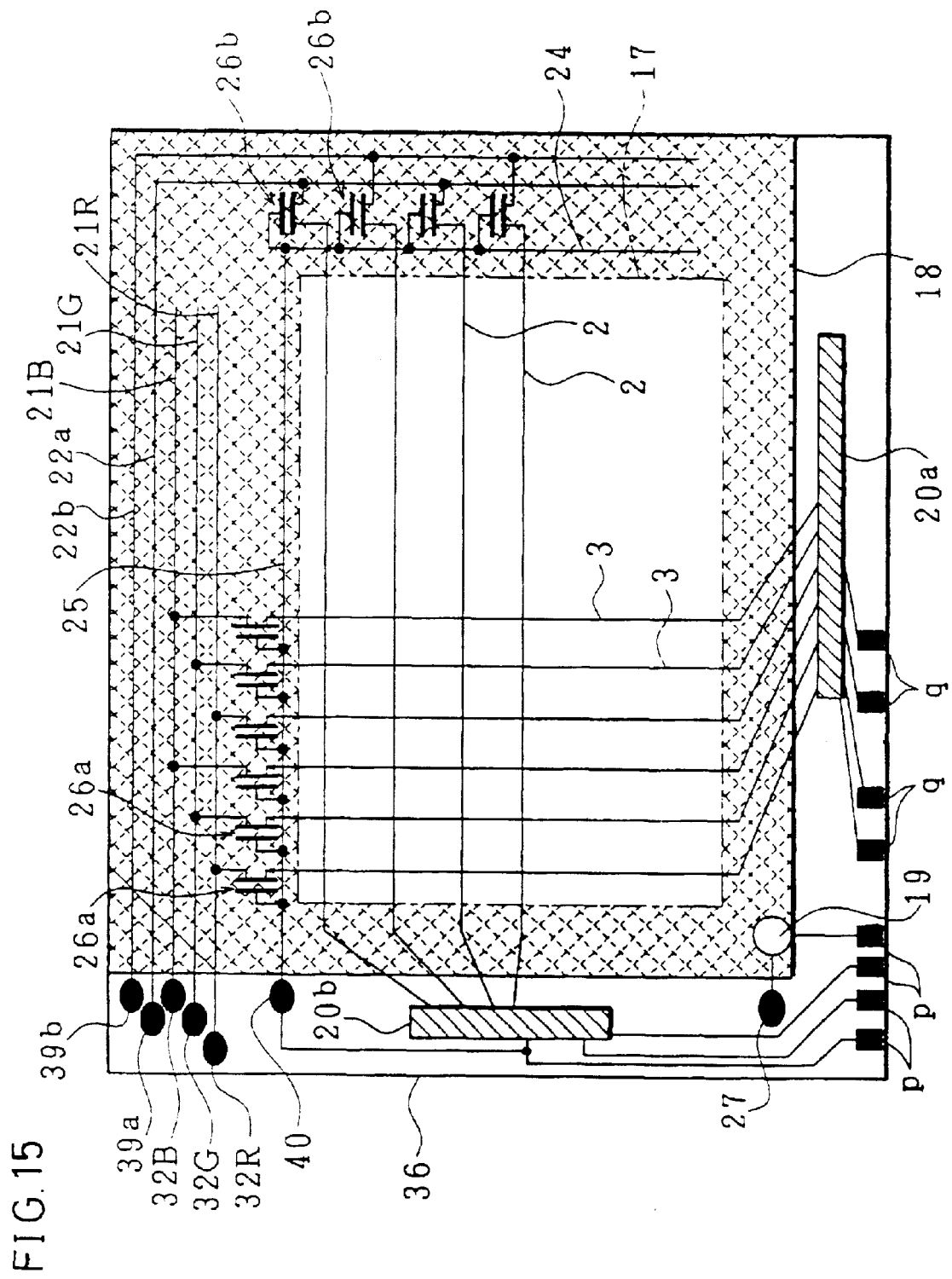
FIG. 15 is a schematic plan view of an active-matrix-type liquid crystal display device in accordance with another embodiment of the present invention.

Further, another arrangement as in an active matrix substrate 36 shown in FIG. 15 is also acceptable. Specifically, the inspection-use control signal line 25 (24) is connected to a negative-side power source of the power sources for driving a gate driver 20b.

This arrangement takes advantage of the power source required for switching on/off the switching elements in the logic circuit inside the IC of the drivers 20, i.e., the gate driver 20b, a source driver 20a, etc. As in the structure of the active matrix substrate 35 shown in FIG. 14, it is unnecessary to newly apply a voltage from outside, and no deficiency is caused in the display.

The connection inside the panel may be built with the negative-side power source of the power sources for driving the drivers 20, or with the power source for supplying the voltage level of the output from the drivers 20 from outside. Further, the connection may be built with the wiring for applying the ground potential to the drivers 20, depending on the characteristics of the inspection-use TFTs 26a and 26b.

Embodiment 5

Referring to drawings, the following descriptions will explain another embodiment of the present invention. For the sake of explanation, the members having the same function as those described above in the explanation of the prior art and the first to fourth embodiments will be designated by the same reference numbers, and their descriptions will be omitted.

Figure 16:
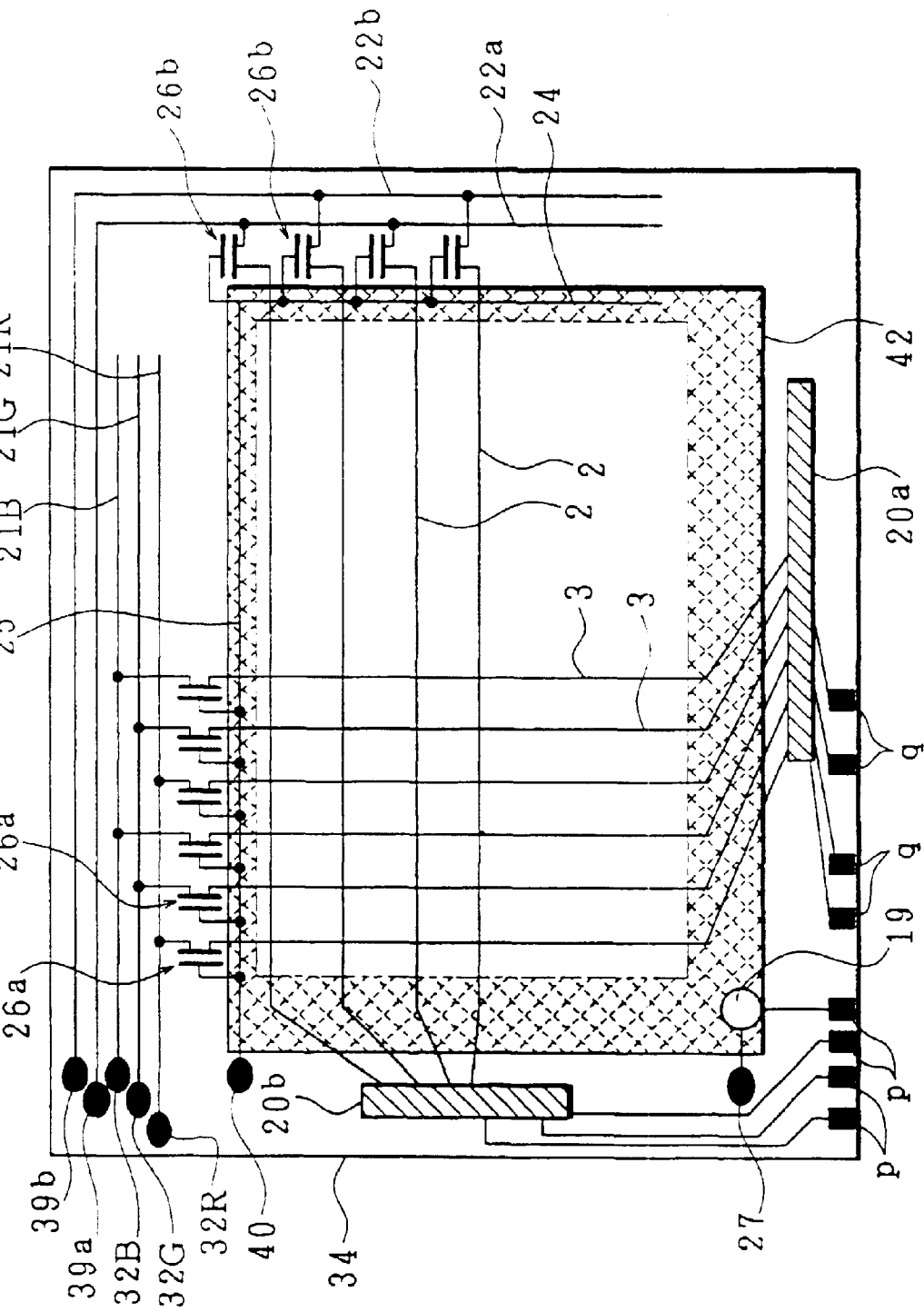
FIG. 16 is a schematic plan view of an active-matrix-type liquid crystal display device in accordance with another embodiment of the present invention.

In the aforementioned first to fourth embodiments, inspection-use TFTs 26a and 26b are provided at a part facing the black matrix of the opposing substrate 18. In contrast, in an active-matrix-type liquid crystal display device of this embodiment, as shown in FIG. 16, a black matrix (crosshatched part in the view) of an opposing substrate 42 is not provided over the inspection-use TFTs 26a and 26b, thereby allowing the inspection-use TFTs 26a and 26b to be exposed to light.

This arrangement has the following advantages. Namely, the smaller resistance value of the inspection-use TFTs 26a and 26b is the better during the inspection. Thus, the value obtained by dividing the channel width W of the inspection-use TFTs 26a and 26b by the channel length L is required to be large. Specifically, in order to detect the leakage resistance between the data lines 3, it is required that the resistance value of the inspection-use TFTs 26a and 26b is not more than 500 kΩ. In the above second embodiment, in order to achieve such a resistance value, W/L was set to be 200/5. It is concerned that providing such large inspection-use TFTs 26a and 26b may cause defectiveness. Further, as described above, it is not allowed that providing the inspection-use TFTs 26a and 26b lowers the rate of non-defective units.

In addition, for example, considering the case where the capacity of the scanning line is large as in the Cs-on-Gate structure of the large-scale model, provided that the inspection-use TFT 26b performs the switching of the scanning line capacity of 600 pF, when setting the resistance value of the inspection-use TFT 26b so that the time constant becomes 3 μs, which is sufficiently smaller than the pulse width of 25 μs in actual driving, the resistance value of the inspection-use TFT 26b must be less than or equal to 5 kΩ. By the calculation according to the following expression as a general approximate expression of the current in the MOSTFT, W/L must be greater than or equal to 1500.

$$Id = (W/L)\mu C\{(Vg-Vth)Vds - Vds^2/2\}$$

Here, $\mu$ is a mobility of electrons and set to be 0.5 cm$^2$/Vs, and C is a capacity of a gate insulating film 9 per unit area and set to be $1.6 \times 10^{-8}$ F/m$^2$.

In addition, the resistance value was calculated with the voltage fixed, provided that the voltage of the scanning line 2 is −10 V or +15 V, and the applied voltage of the inspection-use control signal line 24 (25) is 20 V. Since L cannot be minimized to be less than about 5 μm in actuality, W becomes greater than or equal to 7500 μm in this case. It must be said that such a setting is difficult to put into practice, considering the yield as well.

Hence, by arranging the inspection-use TFTs 26a and 26b to be exposed to light only during the inspection so as to increase the current value, it was made possible to obtain necessary write characteristics even with a small W/L.

Specifically, since the inspection-use TFTs 26a and 26b are semiconductor elements, when they are exposed to light, electron-hole pairs are generated in the intrinsic semiconductors. In the state where the TFT is switched on, photosensitivity as high as the leakage current when the TFT is switched off cannot be obtained. However, since the intrinsic semiconductor is sufficiently inverted, depending on the strength of light, the increase in the current by about five to ten times was confirmed experimentally.

In the active matrix substrate 34, the inspection-use TFTs 26a and 26b are all switched on, and the operation states are varied by switching the signals of the inspection-use display signal lines 21R, 21G, 21B and the inspection-use scanning signal lines 22a, 22b. Therefore, switching the inspection-use TFTs 26a and 26b is unnecessary until the inspection is finished, and the only necessary operation is to keep the inspection-use TFTs 26a and 26b uniformly exposed to strong light.

Note that since the black matrix is provided in the opposing substrate 42 so as not to overlap the inspection-use TFTs 26a and 26b so that the inspection-use TFTs 26a and 26b are exposed to light during the inspection, it is necessary to design exterior members, considering shading after packaging.

Embodiment 6

Referring to drawings, the following descriptions will explain another embodiment of the present invention. For the sake of explanation, the members having the same function as those described above in the explanation of the prior art and the first to fifth embodiments will be designated by the same reference numbers, and their descriptions will be omitted.

Figure 17:
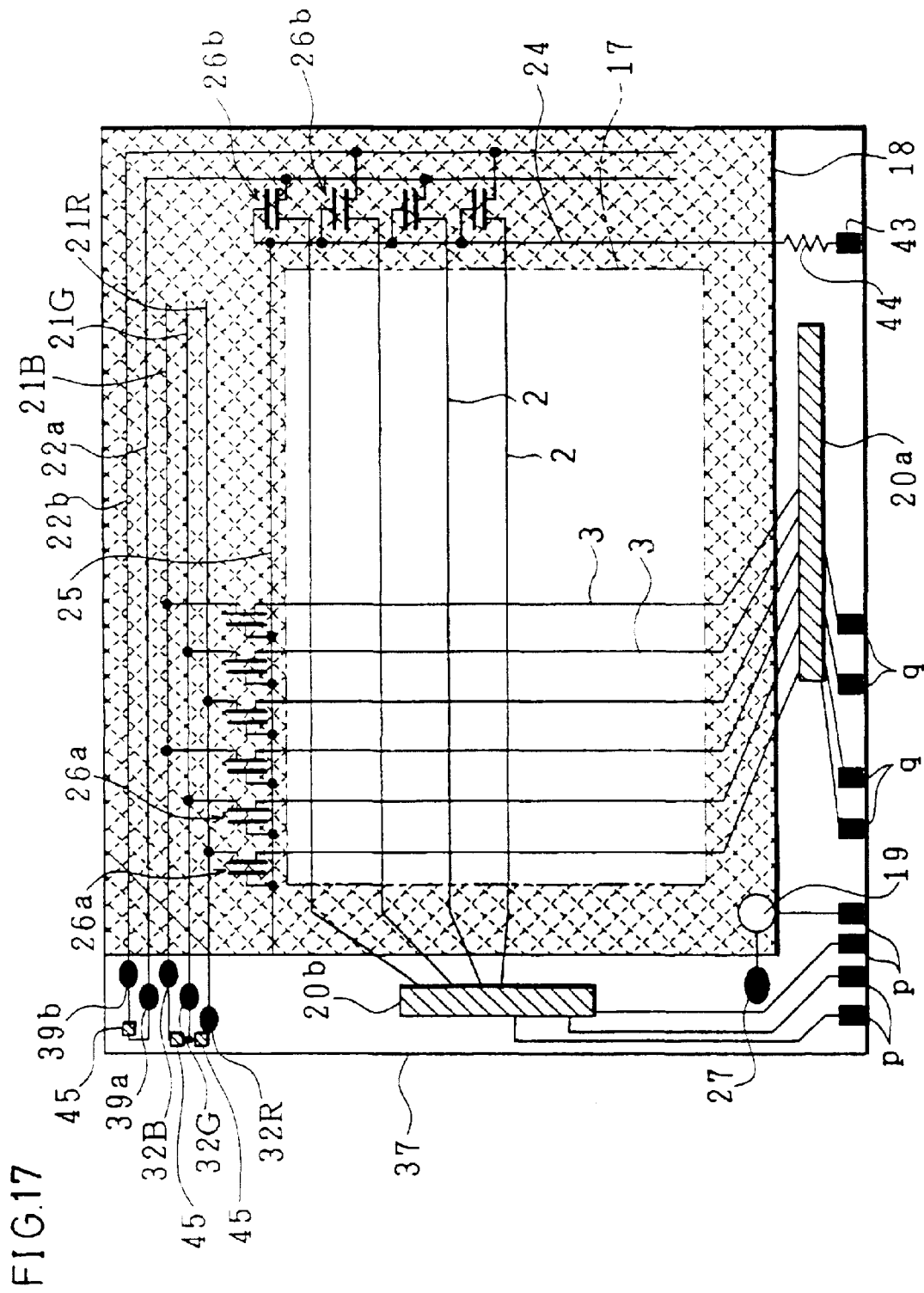
FIG. 17 is a schematic plan view of an active-matrix-type liquid crystal display device in accordance with another embodiment of the present invention.

FIG. 17 is a schematic plan view of an active-matrix-type liquid crystal display device of this embodiment.

An active matrix substrate 37 shown in FIG. 17 has almost the same structure as the active matrix substrate 35 of the fourth embodiment shown in FIG. 14, but different in that the above-mentioned terminal 43 also has a function as the inspection terminal 40, and that a resistive element 44 for input protection is provided between the terminal 43 and inspection-use TFTs 26a, 26b.

The active matrix substrate 37 is arranged in this manner for the following reasons. An inspection-use control signal line 24 (25) is only connected to gate electrodes of inspection-use TFTs 26a and 26b, and has no other path for allowing charges to escape. Thus, the impedance is very high as that of the gate of the general MOS transistor. Consequently, when static electricity enters this wiring, a high-voltage may be applied between the gate and drain of the inspection-use TFTs 26a, 26b, or between the gate and source thereof, resulting in an electrical breakdown, thereby possibly causing a leak defect.

Thus, as described in the third embodiment, performing an insulation treatment in which an insulating tape, etc. are applied to the respective inspection terminals so as to prevent the entry of unnecessary signals is effective. In the structure shown in FIG. 17, the terminal 43 is brought into conduction with an external device after the inspection so as to apply a voltage for switching off the inspection-use TFTs 26a and 26b to the inspection-use TFTs 26a and 26b.

Hence, when the liquid crystal display device is installed on the external device or handled, it often comes into contact with charged bodies, thereby increasing the possibility that defectiveness is caused by static electricity. In addition, since such defectiveness may be produced at user's hands when the liquid crystal display device is actually used, the defective unit cannot be screened in the pre-shipment inspection, which is extremely inconvenient. Therefore, it is necessary to take some countermeasures in the structure of the display device.

Accordingly, what is effective is to let the static electricity escape to the adjacent wiring by bidirectionally connecting the diodes constructed by short-circuiting the gate and source of a transistor like the input protection circuit between the wiring in a conventional display device. As shown in FIG. 17, in the active matrix substrate 37, input protection circuits 45 constituted by such diode-type TFTs are connected between inspection-use scanning signal lines 22a and 22b, between inspection-use display signal lines 21R and 21G, and between inspection-use display signal lines 21G and 21B, thereby taking countermeasures against static electricity.

However, the input protection circuit 45 is not provided between the inspection-use control signal line 24 (25) and the inspection-use scanning signal lines 22a, 22b, and between the inspection-use control signal line 24 (25) and the inspection-use display signal lines 21R, 21G, 21B. In the inspection-use control signal line 24 (25), a resistive element 44 for input protection is provided between the terminal 43 and the inspection-use TFTs 26a, 26b.

The reason for this arrangement is as follows. The inspection-use control signal line 24 (25) is positively biased during the inspection. When the input protection circuit 45 is provided between the inspection-use control signal line 24 (25) and the inspection-use scanning signal lines 22a, 22b, or between the inspection-use control signal line 24(25) and the inspection-use display signal lines 21R, 21G, 21B, due to the application of a voltage between the diodes, which is far exceeding the threshold value, the current flows from the inspection-use control signal line 24 (25) to the inspection-use scanning signal lines 22a, 22b, or to the inspection-use display signal lines 21R, 21G, 21B, through the input protection circuit 45. This increases the possibility that a desired voltage is not applied to the respective terminals of the inspection-use TFTs 26a and 26b, and a deficiency is caused in the inspection.

The resistive element 44 for input protection has the following structure. Namely, the metal film in a part of the wiring is replaced by a n$^+$ layer of a semiconductor, and a highly-resistant part is achieved by the high resistivity. The n$^+$ layer has a resistivity of about 1 kΩcm. Provided that the film thickness is 300 Å, the resistance becomes 1 MΩ, by setting the ratio between the length and width of the pattern to be 3:1. Since this n$^+$ layer is formed at the same time in the process of forming pixel TFTs 1 and the inspection-use TFTs 26a and 26b, the number of processes is not increased.

By connecting such a high resistance to the input part in this manner, the time constant of the path of the static electricity can be enlarged, and the breakdown of the inspection-use TFTs 26a and 26b can be prevented.

Here, the electrostatic capacity of the inspection-use control signal line 24 (25) is about several hundreds picofarads, and thus the time constant is several hundreds microseconds. Consequently, the breakdown is extremely reduced, compared with the case where the resistive element 44 is not provided and the static electricity instantaneously reaches the inspection-use TFTs 26a and 26b.

In FIG. 17, the inspection-use control signal line 24 on the side of the scanning line 2 and the inspection-use control signal line 25 on the side of the data line 3 are brought into conduction on the substrate, and the terminal 43 also functioning as the inspection terminal for applying a voltage to the inspection-use control signal lines 24 and 25 is extended to the FPC part. Therefore, the resistive element 44 for input protection is provided right inside the FPC. However, in the case where the inspection terminal is provided not in the FPC part but in a vacant area, the resistive element 44 should be provided between the inspection terminal and the inspection-use TFTs 26a and 26b.

As in the structures shown in FIGS. 1, 4, and 6, in the case where the inspection-use control signal lines 24 and 25 are not brought into conduction but provided separately, an effective arrangement is such that the resistive elements 44 are provided between the inspection terminal 40 and the inspection-use TFTs 26a, and between the inspection terminal 41 and the inspection-use TFTs 26b.

In addition, more effective countermeasures against static electricity can be taken by connecting the inspection-use control signal lines 24 and 25 through the input protection circuit 45 using the aforementioned diode-type TFTs so as to let the static electricity which has entered one of the inspection-use control signal lines 24 and 25 escape to the other. Note that since the input protection circuit 45 using the diode-type TFTs can be manufactured at the same time in the process of manufacturing pixel TFTs 1, the number of processes is not increased.

Further, as in the structure shown in FIG. 14, in the case where the inspection terminal 40 for inputting the inspection-use control signals and the terminal 43 for applying a voltage for switching off the inspection-use TFTs 26a and 26b after packaging are separately provided, it is preferred that the resistive elements 44 for input protection are each provided between the input parts and the inspection-use TFTs 26a and 26b.

In the above structures, the inspection-use control signals are inputted through the resistive element 44 in the inspection. As already mentioned, since the positive dc voltage is applied as the control signal, a deficiency due to the existence of the resistive element 44 is not caused. In addition, in the step where the drivers 20 are packaged after the inspection, a negative voltage is applied from the terminal 43 through the resistive element 44, and the voltage is the dc voltage. Thus, no consideration of the time constant, etc. is necessary, and no deficiency due to the resistive element 44 is caused.

Embodiment 7

Referring to drawings, the following descriptions will explain another embodiment of the present invention. For the sake of explanation, the members having the same function as those described above in the explanation of the prior art and the first to sixth embodiments will be designated by the same reference numbers, and their descriptions will be omitted.

Figure 18:
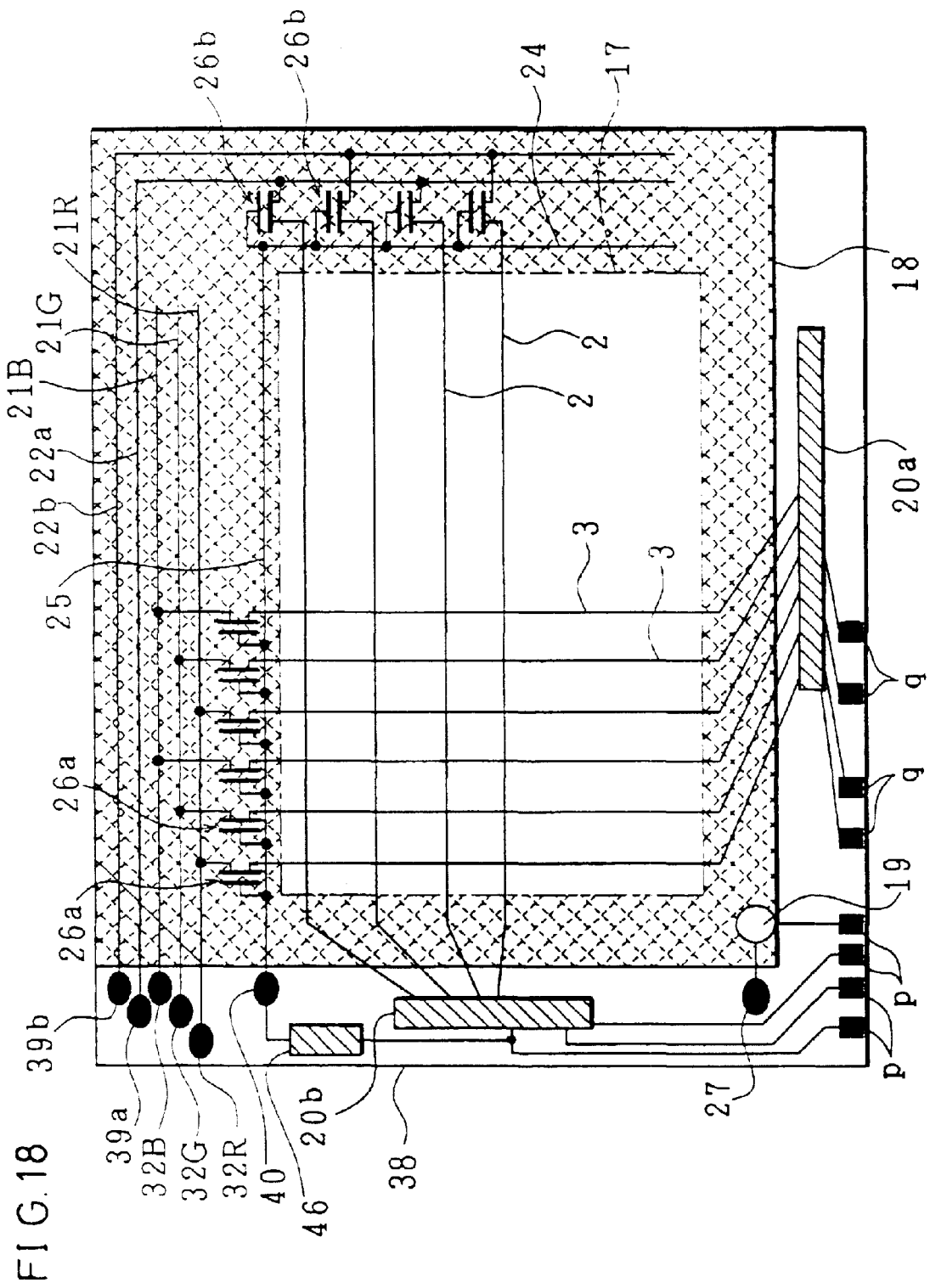
FIG. 18 is a schematic plan view of an active-matrix-type liquid crystal display device in accordance with another embodiment of the present invention.

FIG. 18 is a schematic plan view of an active-matrix-type liquid crystal display device of this embodiment.

An active matrix substrate 38 shown in FIG. 18 has almost the same structure as the active matrix substrate 36 of the fourth embodiment, shown in FIG. 15, but different in that an input protection circuit 46 is provided in the wiring where an inspection-use control signal line 24 (25) is connected to a negative-side power source of power sources for driving a gate driver 20b. Static electricity is delayed by the time constant determined by the resistance value of the input protection circuit 46, the electrostatic capacity of the inspection-use control signal line 24 (25), and the electrostatic capacity of the power source system of the external circuit, thereby preventing the breakdown.

The input protection circuit 46 is formed by diodes as non-linear elements, instead of a simple linear element like the above-mentioned resistive element 44 for input protection.

Figure 19:
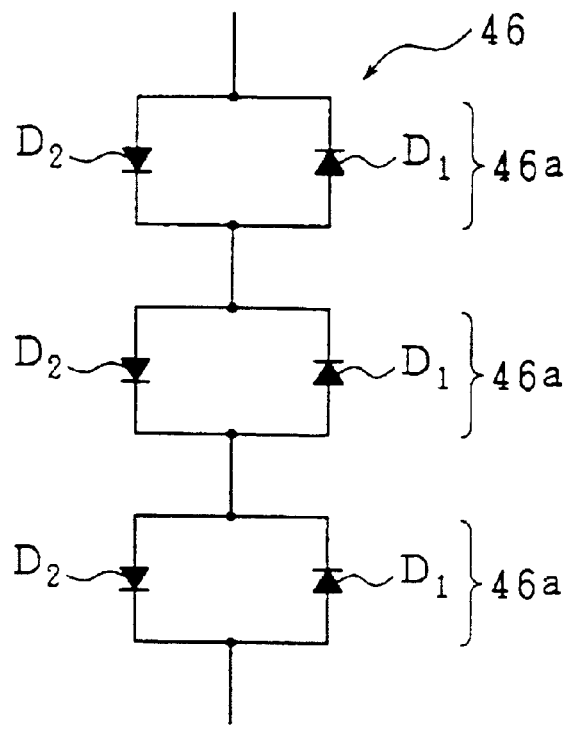
FIG. 19 is a circuit diagram of an input protection circuit in the active-matrix-type liquid crystal display device shown in FIG. 18.
Figure 20:
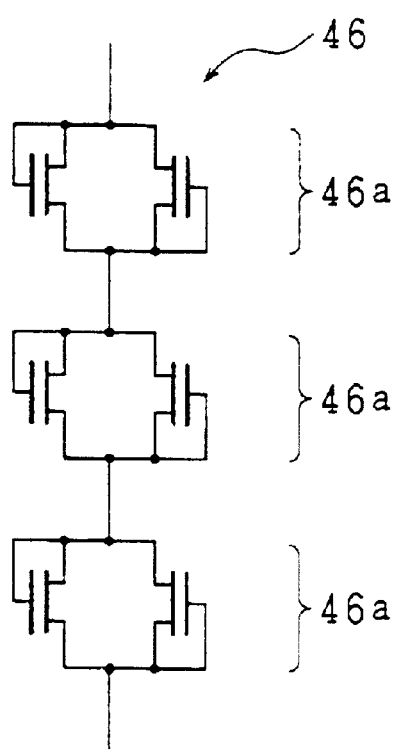
FIG. 20 is a circuit diagram of an input protection circuit in the active-matrix-type liquid crystal display device shown in FIG. 18.

FIG. 19 shows a circuit diagram of the input protection circuit 46. The input protection circuit 46 includes a plurality of resistive circuits 46a connected in series. In the resistive circuit 46a as a compositing unit, diodes $D_1$, $D_2$ whose forward directions are opposite to each other are placed in parallel. The circuit like the input protection circuit 46 using the diodes $D_1$, $D_2$ is generally used as countermeasures against static electricity in the wiring like the aforementioned input protection circuit 45 of the sixth embodiment, and formed in the same process as pixel TFTs 1 by using the diode-type TFTs as two-terminal elements formed by short-circuiting the gate and source. FIG. 20 shows a circuit diagram produced by expressing the circuit diagram of FIG. 19 on the transistor level.

The resistive element 44 for input protection, provided in the above-mentioned active matrix substrate 37 of the sixth embodiment, is advantageous in that it is easy to design because the resistance value is uniform irrespective of the voltage of the static electricity. However, the resistive element 44 cannot be provided in the case where highly-resistive wiring is difficult to form, like the case where the photo-process for forming the n⁺ layer is eliminated in order to reduce the number of processes, and the photo resist is substituted by the metal film constituting the source and drain electrodes on the top of the n⁺ layer.

In addition, even if the convenience in the process is ignored, the structure formed by the non-linear elements as in this embodiment is advantageous in the following points.

Namely, in the case of highly-resistive elements like the resistive element 44, when an overcurrent flows through the resistive element 44 by the entry of static electricity, the resistive element 44 is fused by the Joule heat generated therein, and becomes electrically separated. In this state, the voltage for switching off the inspection-use TFTs 26a and 26b cannot be applied, resulting in a problem in insuring the reliability.

However, as in the present embodiment, in the case of using the diodes $D_1$ and $D_2$, when a high voltage is applied to the diodes $D_1$ and $D_2$, the semiconductor layer is deteriorated, and simultaneously the gate insulating films of the diodes $D_1$ and $D_2$ are broken. Thus, the both ends of the diodes $D_1$ and $D_2$ become easy to short-circuit. Namely, even if the input protection circuit 46 is broken by the static electricity, the inspection-use control signal line 24 (25) is electrically connected to the wiring to which a voltage defining the low level of the output voltage is applied among the wiring on the substrate, for driving the external circuit after packaging. Consequently, there is no need to worry about ill effects exerted by the inspection-use TFTs 26a and 26b.

In the input protection circuit 46 of the present embodiment, a plurality of resistive circuits 46a each of which includes a pair of diodes $D_1$ and $D_2$ are connected in series. The reason for this structure is as follows. Namely, even when the diodes $D_1$ and $D_2$ of the resistive circuit 46a in the first stage are broken by the static electricity, the function as a protection resistance can be maintained by the resistive circuit 46a in the second stage.

The input protection circuit 46 can be provided in place of the resistive element 44 in the active matrix substrate 37 of the sixth embodiment, shown in FIG. 17.

In this case, the inspection-use control signal is inputted through the input protection circuit 46 in the inspection. As already mentioned, the positive dc voltage is applied as the control signal. Further, in the step where the drivers 20 are packaged after the inspection, the negative voltage is applied from a terminal 43 through the input protection circuit 46, and the voltage is also the dc voltage. Thus, no consideration of the time constant, etc. is necessary, and no deficiency due to the input protection circuit 46 is caused.

In the input protection circuit 46, a voltage corresponding to the threshold value of the diodes $D_1$ and $D_2$ is applied to each resistive circuit 46a. Therefore, in order to make the inspection-use TFTs 26a and 26b sufficiently perform the function, the number of resistive circuits 46a included in the input protection circuit 46 should be less than or equal to about five.

Embodiment 8

The following descriptions will explain another embodiment of the present invention with reference to drawings. For the sake of explanation, the members having the same function as those described above in the explanation of the prior art and the first to seventh embodiments will be designated by the same reference numbers, and their descriptions will be omitted.

An active matrix substrate includes a structure for preventing the static-electricity breakdown of a specific part. Specifically, the bus lines and the pixel switching elements are protected from the static electricity by letting the static electricity in a specific line escape to other bus lines, and by distributing the charge throughout the panel. Of course, a current path for connecting the bus lines must have a high resistance to a certain degree so as not to cause a deficiency in the display. Therefore, the bus lines are connected with resistive elements which usually have a resistance not lower than a few megaohms. However, in the above structure, a plurality of resistive elements are arranged in parallel so as to supply signals to a plurality of bus lines at one time in the inspection. As a result, the actual resistance value is decreased, thereby causing a deficiency in the inspection.

Figure 21:
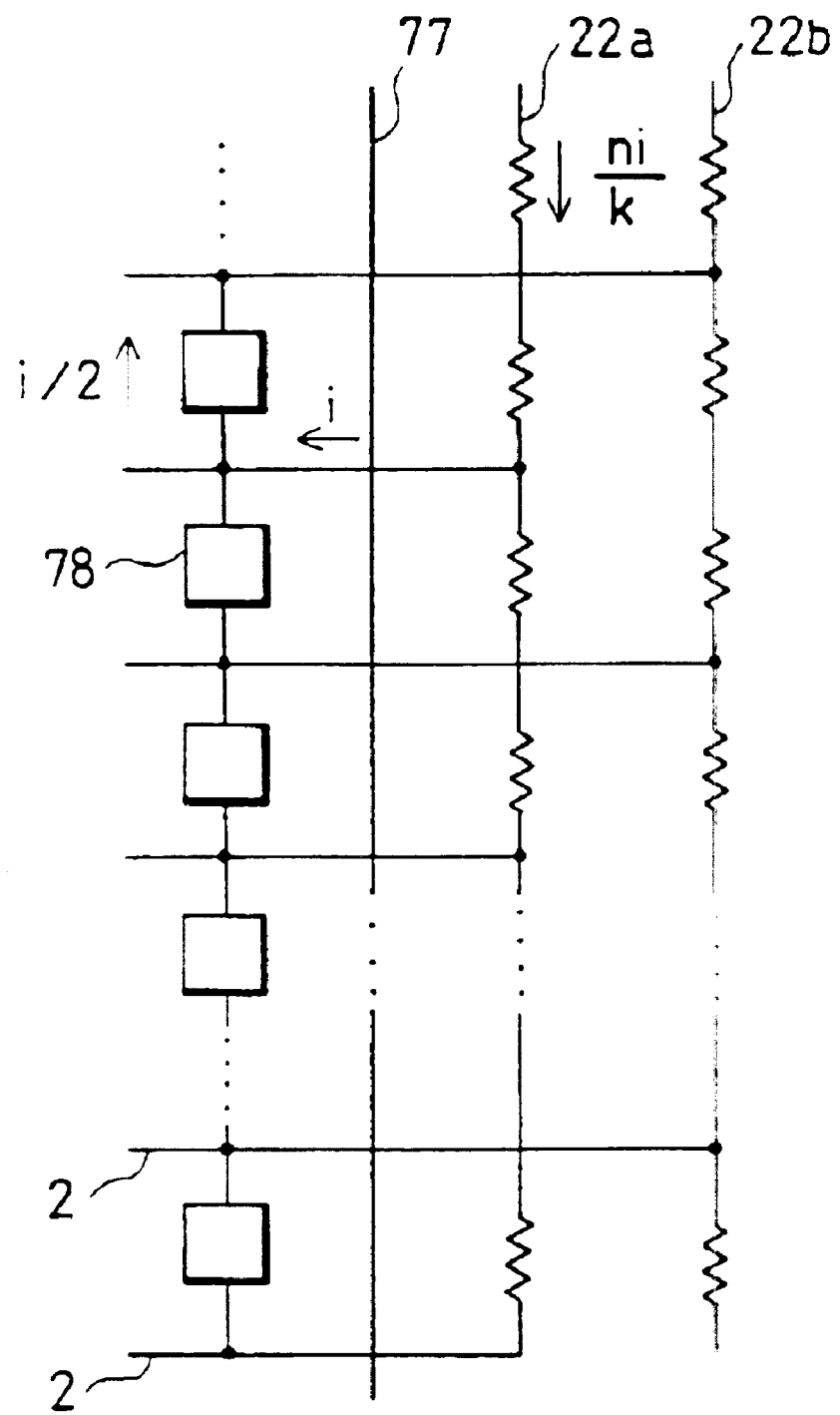
FIG. 21 is an explanatory view showing relations of scanning lines, inspection-use scanning signal lines, and resistive elements connected between scanning lines in an active-matrix-type liquid crystal display device in accordance with another embodiment of the present invention.

FIG. 21 is a partial view of the scanning lines 2 and the inspection-use scanning signal lines 22a and 22b in accordance with the present embodiment. The scanning lines 2 are alternately connected to one of the inspection-use scanning signal lines 22a and 22b. Each pair of adjacent scanning lines are connected with a resistive element 78. Provided that a current flowing through the resistive element 78 is i/2, a current flowing through one of the scanning lines 2 is i, and a current flowing through the whole inspection-use scanning signal line is ni/k. Here, n is a number of scanning lines 2, and k is a number of the inspection-use scanning signal lines. In the present embodiment, k is equal to 2. A voltage drop occurs in the inspection-use scanning signal line due to the current of ni/k. As a result, a predetermined voltage is not applied to the scanning lines. Further, the inspection-use scanning signa lines 22a and 22b are divided along a division line 77 after the inspection.

Figure 22:
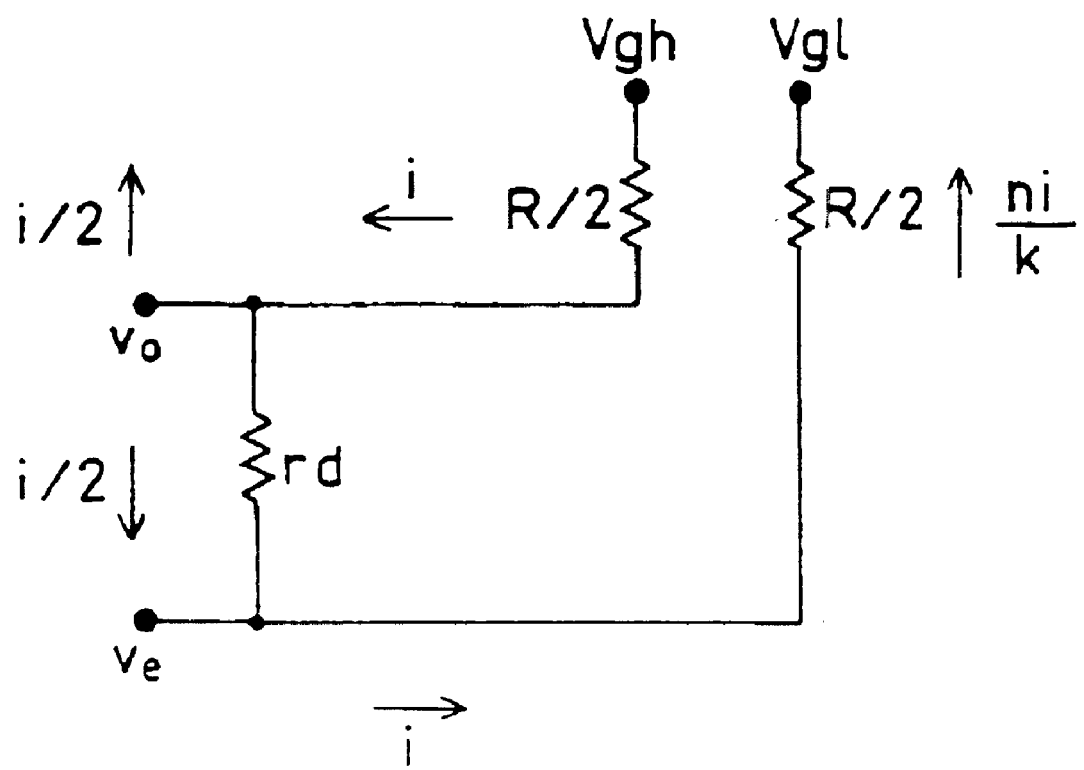
FIG. 22 is an equivalent circuit diagram showing a part of the structure shown in FIG. 21.

FIG. 22 shows an equivalent circuit when focusing a pair of scanning lines 2 in FIG. 21. Here, the resistance value of the inspection-use scanning signal line is R, and a resistance value of R/2 is placed in the vicinity of each of the input terminals (written as Vgh and Vgl; Vgh and Vgl also mean the voltages applied thereto). Further, it is assumed that all the scanning lines 2 are centralized in the center of the inspection-use scanning signal lines 22a and 22b. This assumption was confirmed to be reasonable by the result of a trial product described below.

In FIG. 22, the voltage at each part can be easily obtained from the current flowing through each resistance. Provided that inputs are Vgh and Vgl, the voltage actually applied to the scanning lines 2 is $$v_o - v_e = (Vgh - Vgl)(rd/2)/\{R(n/k) + rd/2\} \quad (1)$$

where $v_o$ and $v_e$ are voltages respectively applied to the pair of scanning lines shown in FIG. 22, and rd is a resistance value of one resistive element 78. As is clear from the expression (1), the potential difference ($v_o - v_e$) between the pair of scanning lines becomes smaller than the potential difference between the applied voltages Vgh and Vgl applied to the input terminals of the inspection-use scanning signal lines 22a and 22b. However, it is preferred that at least 80% of the applied voltage is applied to the scanning line. When the voltage applied to the scanning line is smaller than the preferred value, the pixel switching element is not sufficiently brought into conduction, and a deficiency in detecting switched-on-defective pixels is caused, thereby significantly decreasing the accuracy of the inspection. Therefore, it is required that the following expression is satisfied.

$$v_o - v_e > (Vgh - Vgl)8/10 \quad (2)$$

From the above expressions (1) and (2), it is found that the following expression must be satisfied.

$$R < (rd/8)/(n/k) \quad (3)$$

Although the above explanation is made on the scanning line, the same things can be said on the data line. Specifically, the above expression (3) must be satisfied, provided that a resistive element is disposed between adjacent data lines 3, a resistance value of each resistive element is rd, the number of the data lines 3 is n, the number of the inspection-use display signal lines is k, and the resistance value of the inspection-use display signal lines is R.

Figure 23:
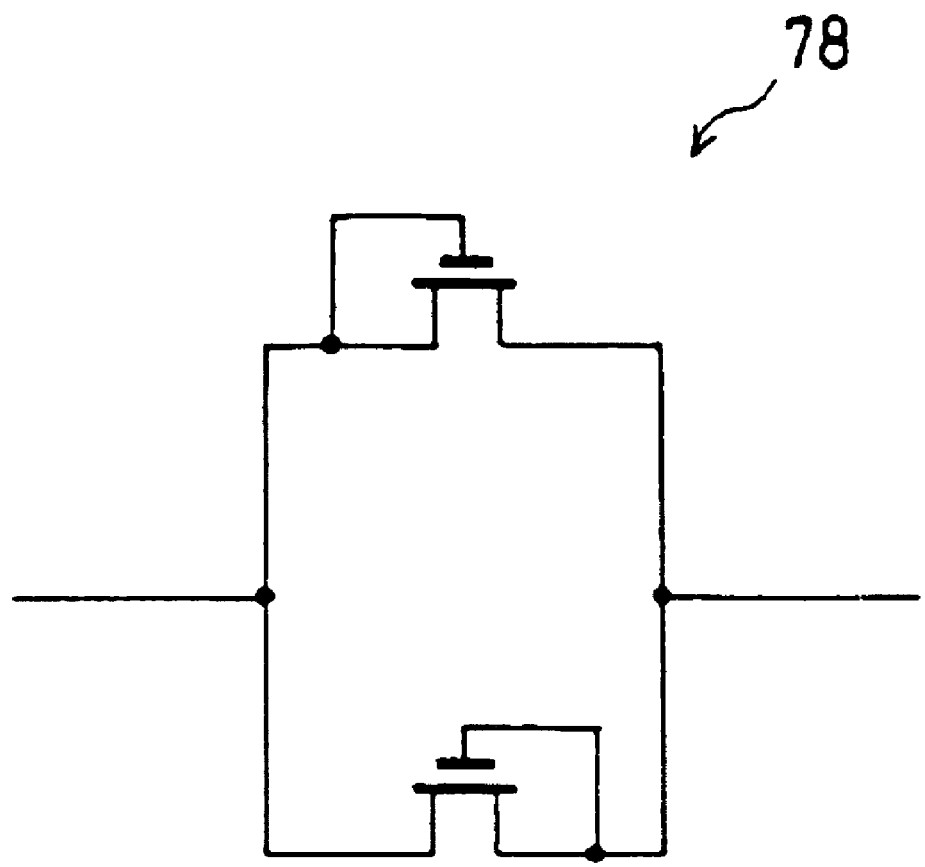
FIG. 23 is a circuit diagram showing one example of the structure-where the resistive element shown in FIG. 21 is constituted by non-linear elements.

By the way, as shown in FIG. 23, the resistive element 78 often has such a structure that non-linear elements arranged to show diode characteristics by connecting the gate and drain of the transistor are disposed bidirectionally and in parallel. This is for the following reasons. Namely, the above structure produces such an effect that the resistive element 78 can be manufactured in the same process as a pixel transistor, and that the increase in the number of processes can be prevented. In addition, the above structure shows a high resistance against a weak voltage and a low resistance against a strong voltage which may cause the static-electricity breakdown, and such characteristics are favorable as a protection-use resistive element.

Also in this case, according to the above way of thinking, the design can be performed considering the voltage drop in the inspection-use scanning signal lines 22a and 22b, based on the calculations of the voltage actually applied to the non-linear element and the current. Specifically, the resistive element 78 was formed by a transistor having mobility of 0.5 and Vth of 1 V, and calculations were performed on the assumption that Vgh is 15 V, Vgl is −10 V, the total resistance value of the inspection-use scanning signal line is 5 kΩ, and the number of the scanning lines is 220. The result was such that the ratio of the channel width to the channel length of the transistor in the resistive element 78 must be not more than 3.25. Conversely, when the ratio of the channel width to the channel length of the transistor in the resistive element 78 is 3.25, the voltage drop which occurs in the inspection-use scanning signal line in accordance with the magnitude of the current flowing through the resistive element is 2.5 V on each of the Vgh side and the Vgl side. The voltages applied to each of the scanning lines 2 (the voltages applied between two ends of the resistive element) are 12.5 V and −7.5 V (difference between High and Low is 80% of the applied voltage). Thus, the voltage of 20 V is applied to the resistive element, and its resistance value at this voltage is 4.4 MΩ. (In this case, the current i/2 flowing through a single resistive element is 4.5 μA, and the current flowing through the inspection-use scanning signal line is 1 mA (=110×i). Therefore, the voltage drop in the inspection-use scanning signal line is 2.5 V (=1 mA×5 kΩ/2), which is identical to the amount of the voltage drop mentioned above.) When the resistance value of the resistive element is smaller than 4.4 MΩ, a larger amount of current flows through the inspection-use scanning signal line. As a result, the voltage drop in the inspection-use scanning signal line is enlarged, and the voltage applied to each of the scanning lines becomes smaller (less than 80% of the applied voltage), thereby causing a deficiency in the inspection. By substituting the values rd=4.4 MΩ, n=110, and k=2 into the right side of the expression (3), the right side becomes 5 kΩ, which coincides with the calculation result that R is the minimum of the values which should be satisfied by the resistance value R of the inspection-use scanning signal line.

A liquid crystal display panel having, such a structure was actually manufactured. The result obtained from the inspection using the inspection-use wiring was identical to the result obtained when the liquid crystal display panel is actually driven after packaging the packaging members. In addition, when performing the inspection using the inspection-use wiring, the resistive element 78 was intentionally exposed to light so as to decrease the resistance value. As a result, in some panels, more dot defects were visually recognized than in actually driving the panel, and the inspection accuracy became worse.

Figure 24:
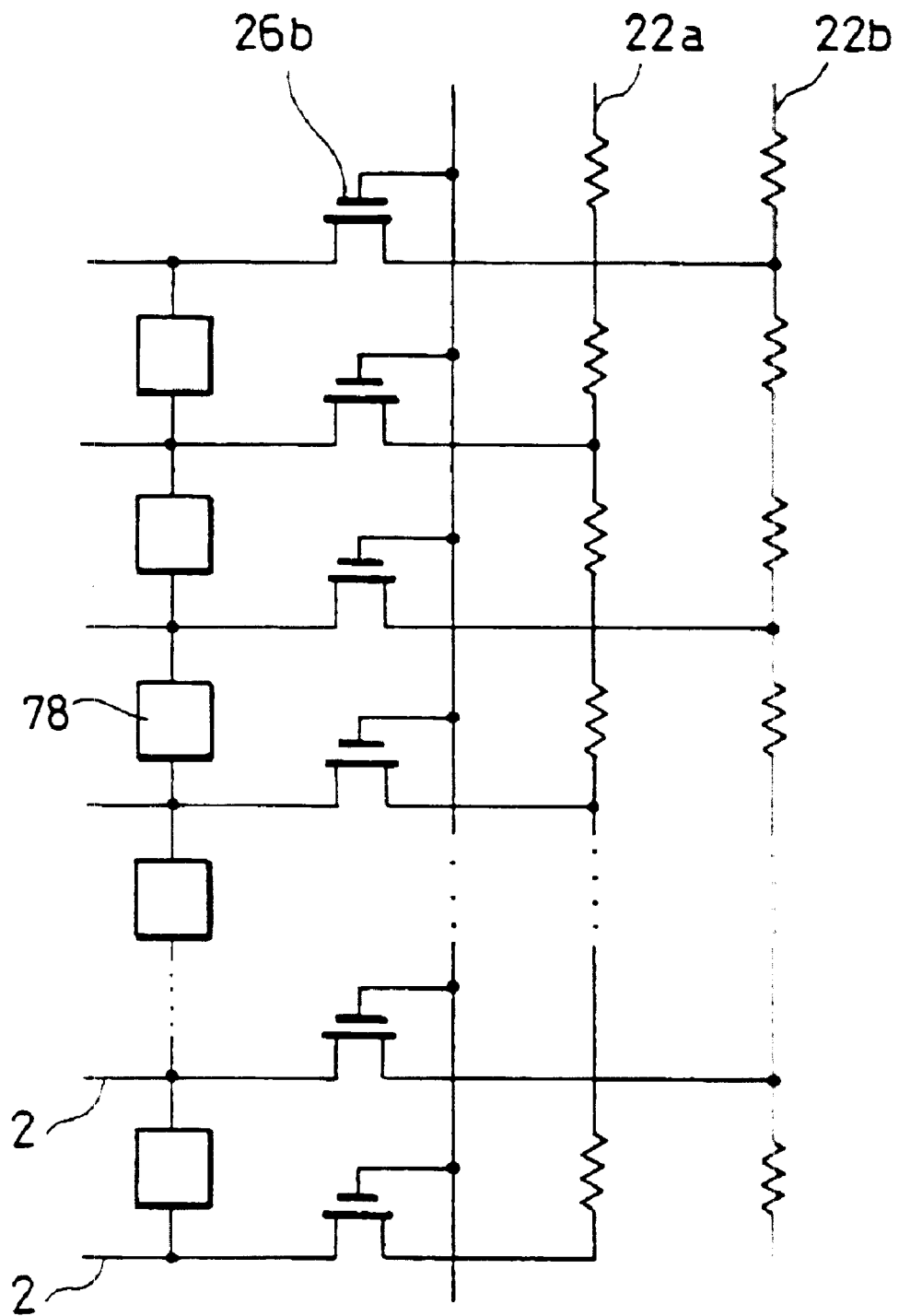
FIG. 24 is an explanatory view showing relations of scanning lines, scanning-line inspection-use switching elements, inspection-use scanning signal lines, and resistive elements connected between scanning lines in an active-matrix-type liquid crystal display device in accordance with another embodiment of the present invention.
Figure 25:
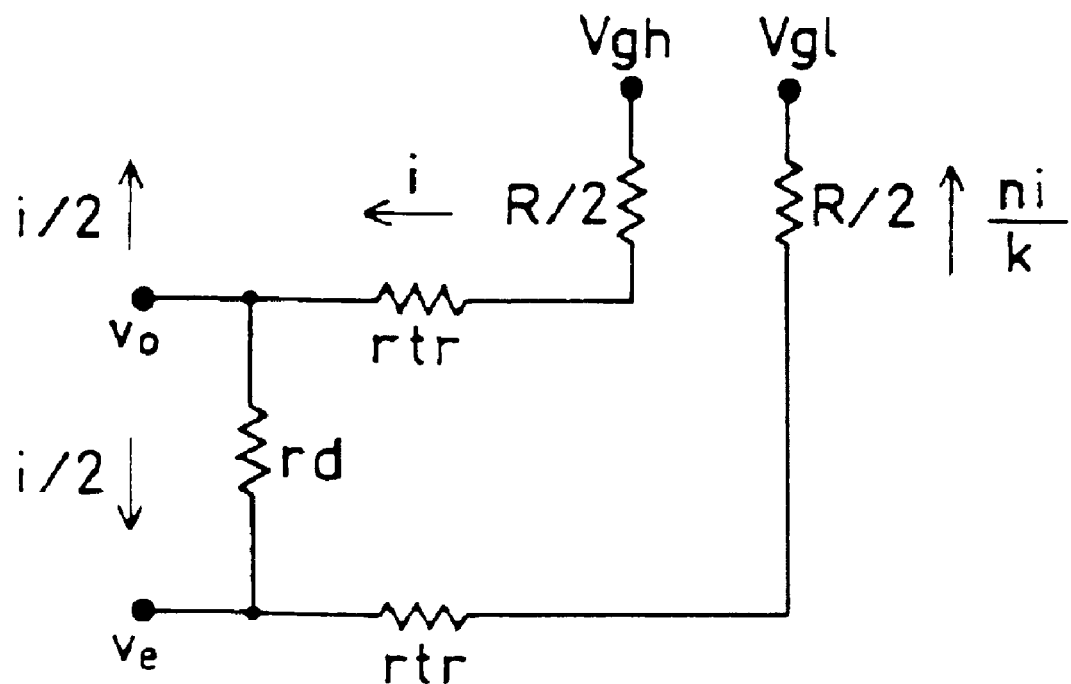
FIG. 25 is an equivalent circuit diagram showing a part of the structure shown in FIG. 24.

FIG. 24 shows the case where the inspection-use signals are supplied from the inspection-use scanning signal lines 22a and 22b to the scanning lines 2 through the inspection-use TFTs 26b. FIG. 25 shows an equivalent circuit when focusing a pair of scanning lines 2 in FIG. 24. In this case, the resistance value of the inspection-use TFT 26b must be also considered. According to the way of thinking similar to the above one, $v_o$ and $v_e$ satisfy the following expression.

$$v_o - v_e = (Vgh - Vgl)(rd/2)/\{R(n/k) + 2rtr + rd/2\} \quad (4)$$

Here, rtr is a resistance value of the inspection-use TFT 26b. Therefore, the condition to be satisfied by the resistance value of the resistive element 78 is as follows.

$$R < (rd/8 - 2rtr)/(n/k) \quad (5)$$

Specifically, the resistive element 78 and the inspection-use TFT 26b were formed by the transistor having mobility of 0.5 and Vth of 1 V, and calculations were performed on the assumption that the channel width and the channel length of the inspection-use TFT 26b are 200 μm and 7 μm, respectively, the voltage, applied to the scanning-line inspection-use control signal line, for switching on the inspection-use switching elements is 25 V, Vgh is 15 V, Vgl is −10 V, the resistance value of the inspection-use scanning signal line is 5 kΩ, and the number of the scanning lines is 220. The result was such that the ratio of the channel width to the channel length of the transistor in the resistive element 78 must be not more than 1.6. Conversely, when the ratio of the channel width to the channel length of the transistor in the resistive element 78 is 1.6, the voltage drops in the inspection-use scanning signal line and in the inspection-use TFTs 26b in accordance with the magnitude of the current flowing through the resistive element are 3.1 V and 1.9 V on the Vgh side and the Vgl side, respectively. The voltages applied to each of the scanning lines 2 (the voltages applied between two ends of the resistive element) are 11.9 V and −8.1 V (difference between High and Low is 80% of the applied voltage). Thus, the voltage of 20 V is applied to the resistive element, and its resistance value at this voltage is 8.7 MΩ. (In this case, the current i/2 flowing through a single resistive element is 2.3 μA, and the current flowing through the inspection-use scanning signal line is 0.51 mA (=110×i). Therefore, the voltage drop in the inspection-use scanning signal line is 1.3 V (=0.51 mA×5 kΩ/2). In this condition, the resistance values between the source and drain of the inspection-use TFT 26b are 396 kΩ and 136 kΩ on the Vgh side and the Vgl side, respectively, and the voltage drops are 1.8 V (=396 kΩ×i) and 0.6 V (=136 kΩ×i), respectively. The sum of the voltage drops in the inspection-use scanning signal line and in the inspection-use switching elements are identical to the amount of the above-mentioned voltage drop on both Vgh and Vgl sides.) When the resistance value of the resistive element is smaller than 8.7 MΩ, a larger amount of current flows through the inspection-use scanning signal line. As a result, the voltage drops in the inspection-use scanning signal line and in the inspection-use switching elements are enlarged, and the voltage applied to each of the scanning lines becomes smaller (less than 80% of the applied voltage), thereby causing a deficiency in the inspection. By substituting the values rd=8.7 MΩ, rtr=(396 kΩ+136 kΩ)/2=0.27 MΩ, n=110, and k=2 into the right side of the expression (5), the right side becomes 5 kΩ, which coincides with the calculation result that R is the minimum of the values which should be satisfied by the resistance value R of the inspection-use scanning signal line.

A liquid crystal display panel having such a structure was actually manufactured. The result obtained from the inspection using the inspection-use wiring was identical to the result obtained when the liquid crystal display panel is actually driven after packaging the packaging members. In addition, when performing the inspection using the inspection-use wiring, the resistive element 78 was intentionally exposed to light so as to decrease the resistance value. As a result, in some panels, more dot defects were visually recognized than in actually driving the panel, and the inspection accuracy became worse.

Although the above explanation is made on the scanning line in the case of providing the inspection-use switching elements, the same things can be said on the data line. Specifically, the above expression (5) must be satisfied, provided that a resistive element is disposed between adjacent data lines 3, a resistance value of each resistive element is rd, the resistance value of the inspection-use TFTs 26a is rtr, the number of the data lines 3 is n, the number of the inspection-use display signal lines is k, and the resistance value of the inspection-use display signal lines is R.

Embodiment 9

The following descriptions will explain another embodiment of the present invention with reference to drawings. For the sake of explanation, the members having the same function as those described above in the explanation of the prior art and the first to eighth embodiments will be designated by the same reference numbers, and their descriptions will be omitted.

Figure 26:
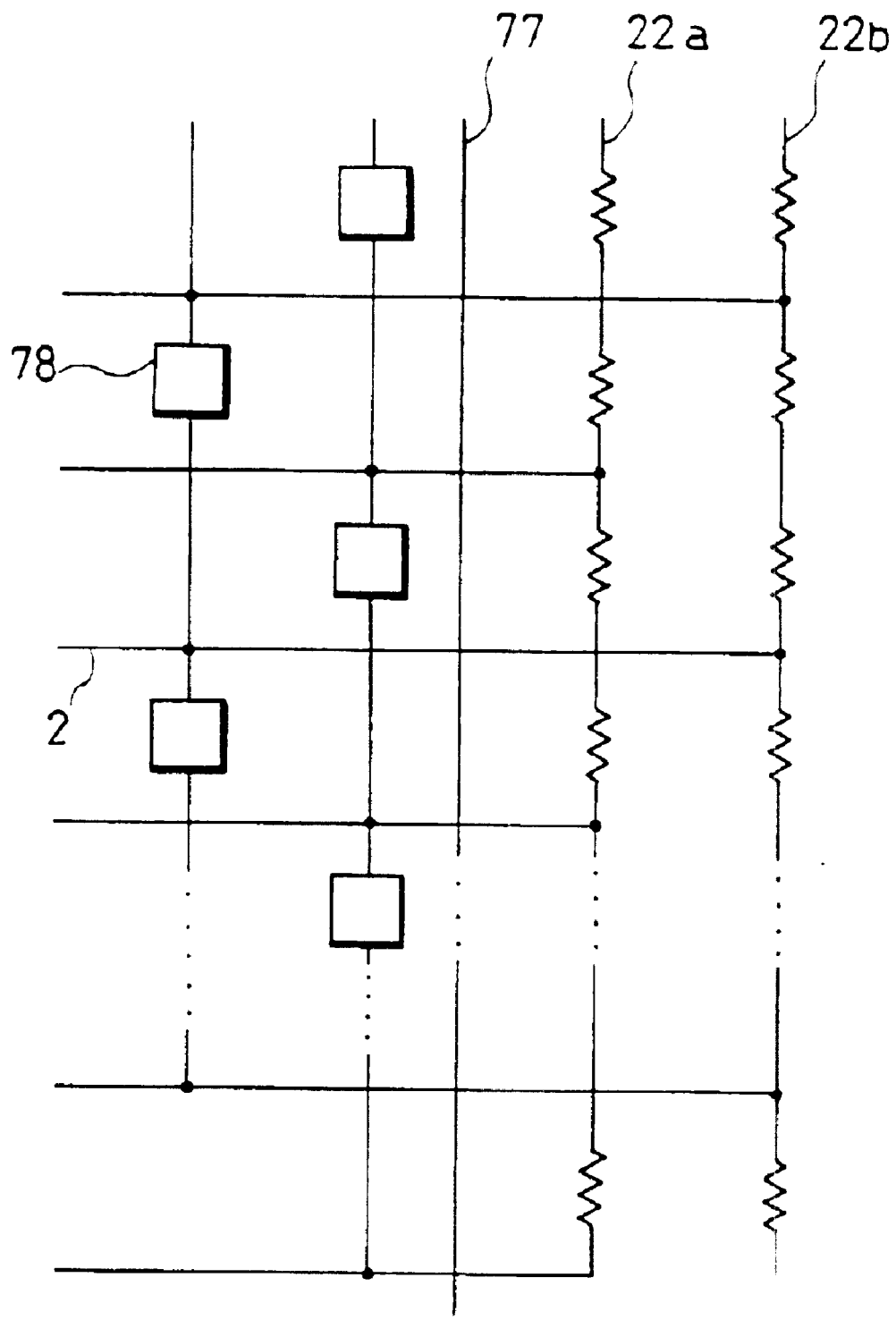
FIG. 26 is an explanatory view showing relations of scanning lines, inspection-use scanning signal lines, and resistive elements connected between scanning liens in an active-matrix-type liquid crystal display device in accordance with another embodiment of the present invention.

FIG. 26 is a partial view of scanning lines 2 and inspection-use scanning signal lines 22a and 22b in accordance with the present embodiment. The scanning lines 2 are alternately connected to one of the inspection-use scanning line 22a and 22b. A resistive element 78 connects a pair of scanning lines for the purpose of protecting the panel from static electricity. Unlike the case shown in FIG. 21 where the resistive element 78 connects the adjacent scanning lines 2, the resistive element 78 connects the scanning lines 2 which are connected to the same inspection-use scanning signal line. With this arrangement, during the inspection, a voltage is not applied to the resistive element 78, and the current does not flow through the resistive element 78. Therefore, the arrangement for letting the static electricity escape is maintained, and the inspection accuracy is further improved since a voltage drop in the inspection-use scanning signal line due to the flow of the current through the resistive element 78 does not occur. The inspection-use scanning signal lines 22a and 22b are divided along a division line 77 after the inspection.

Figure 27:
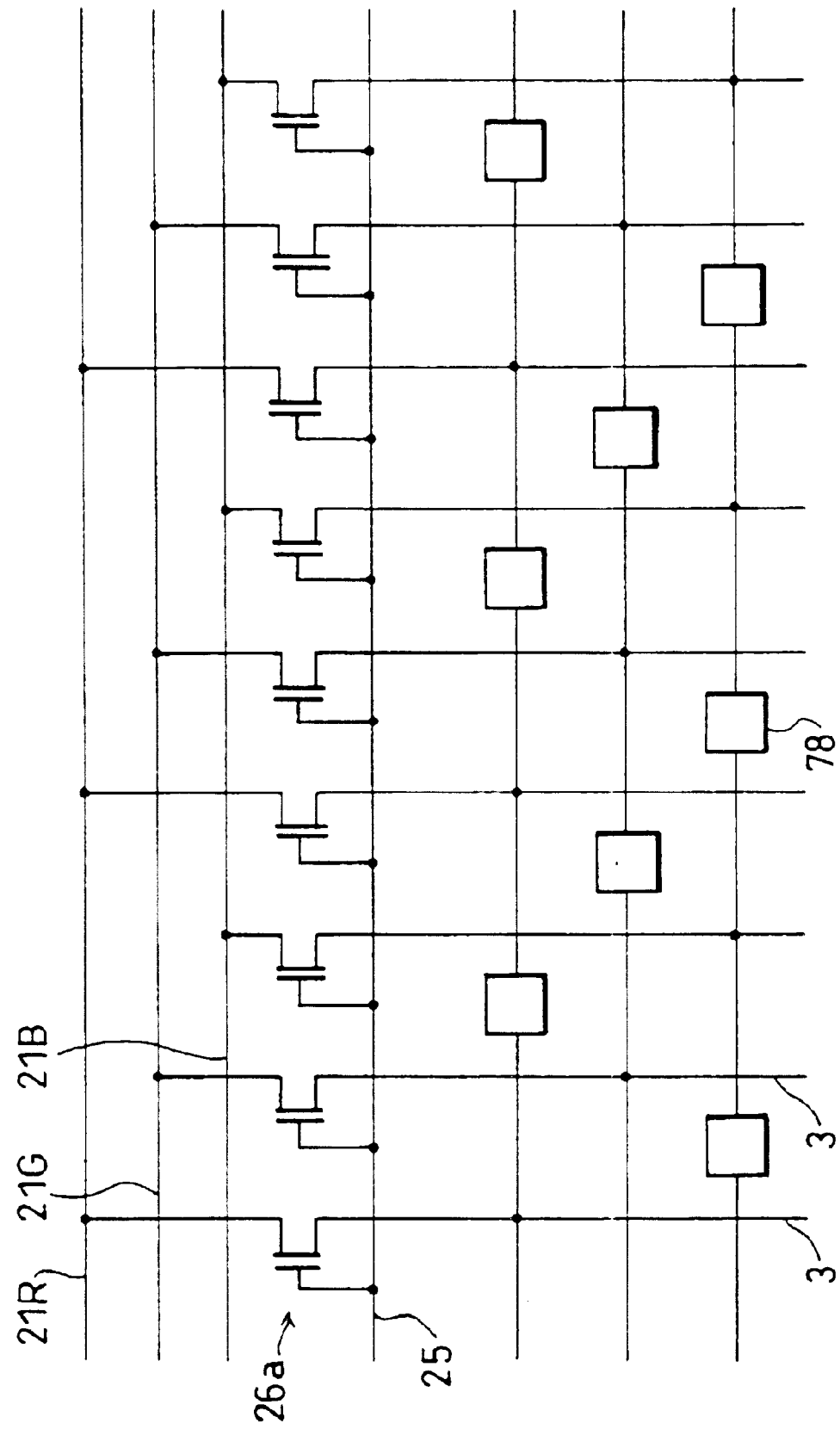
FIG. 27 is an explanatory view showing relations of data lines, data-line inspection-use switching elements, inspection-use display signal lines, and resistive elements connected between the data lines in an active-matrix-type liquid crystal display device in accordance with another embodiment of the present invention.

FIG. 27 shows the case where inspection-use display signal lines 21R, 21G, and 21B are arranged to have the structure similar to that shown in FIG. 26. Although FIG. 27 shows the case where the inspection is performed by using inspection-use TFTs 26a, the structure is similar to that shown in FIG. 26 in that each of the resistive elements 78 connects the data lines which are connected to the same inspection-use display signal line. Since a voltage drop occurs in the inspection-use TFTs 26a, the effect produced by this embodiment becomes larger by the voltage drop than the case where the substrate is separated from the inspection-use wiring by dividing the substrate after the inspection.

In the structure shown in FIG. 27, since three inspection-use display signal lines are provided, the resistive element 78 connects a first data line and a data line fourth from the first data line. In addition, the resistive element 78 connects the data lines in correspondence with the colors (Red, Green, Blue). Therefore, even in the case where the resistive element 78 is formed by the above non-linear element, and a small leakage is caused when the device is being used, the leakage is an adjacent leakage between the data lines of the same color, and such a leakage is hard to visually recognize on the display, which is favorable.

As described so far, a first active-matrix-type liquid crystal display panel is based on an active-matrix-type liquid crystal display panel including:

an active matrix substrate having, on an insulating substrate, a plurality of pixel electrodes, pixel switching elements individually connected to the pixel electrodes, and a plurality of scanning lines and a plurality of data lines, provided in a matrix form, for driving the pixel electrodes through the pixel switching elements; and an opposing substrate having a common electrode, the active matrix substrate and the opposing substrate being adhered to each other with a liquid crystal layer therebetween, and the first active-matrix-type liquid crystal display panel is characterized in including:

inspection-use switching elements for performing a switching of a supply of an inspection-use display signal, the inspection-use switching elements being connected to the plurality of data lines individually;

an inspection-use display signal line provided for the inspection-use switching elements in common, for supplying the inspection-use display signal to the data lines through the inspection-use switching elements; and a plurality of control signal lines for inputting control signals for switching on/off the inspection-use switching elements so that different control signals are inputted to adjacent data lines.

First, with this arrangement, since the inspection-use switching elements for performing switching of the supply of the inspection-use display signal are individually connected to a plurality of data lines, it is unnecessary to cut off the inspection-use wiring after the inspection, and the number of processes is not increased. In addition, since the inspection-use switching elements can be manufactured in the same process as the pixel switching elements, the number of processes is not increased.

In this case, it is preferred that inspection-use switching elements for performing the switching of the input of the inspection-use scanning signals are provided on the scanning-line side. However, for example, the arrangement for inputting the inspection-use scanning signals can be the same as the conventional structure shown in FIG. 30, and the inspection-use wiring on the scanning-line side can be cut off in the process of dividing the substrate after the inspection. Further, when the increase in the process number resulting from cutting the inspection-use wiring is not allowed, it is effective to perform the inspection process with a plurality of panels connected in the direction of the scanning line, and cut off the inspection-use wiring at the same time when dividing the substrate into individual panels after the inspection.

Next, with the above structure, a plurality of control signal lines for inputting the control signals for switching on/off the inspection-use switching elements connected to the data lines are provided so that different control signals are inputted to the adjacent data lines. Therefore, the leakage between the signal lines can be electrically detected, and the visual inspection of the leakage between the data lines can be performed as well.

In particular, in the above arrangement, the inspection-use display signal line for supplying the inspection-use display signal to the inspection-use switching elements connected to the data lines is provided as a common inspection-use display signal line for the inspection-use switching elements. Therefore, the wiring requiring the consideration of the signal delay in supplying the inspection-use display signals to the respective data lines is only a single line, and accordingly the design of the wiring is easy.

A second active-matrix-type liquid crystal display panel of the present invention is based on the first active-matrix-type liquid crystal display panel, and may be arranged so that the plurality of control signal lines provided for the inspection-use switching elements connected to the data lines are connected to the data lines in correspondence with a plurality of display colors of the pixels through the inspection-use switching elements.

A first method of inspecting an active-matrix-type liquid crystal display panel, the active-matrix-type liquid crystal display panel being the second active-matrix-type liquid crystal display panel, the first method being characterized in including the step of performing a color display by sequentially switching the control signals supplied to the plurality of control signal lines while supplying the inspection-use display signal to the inspection-use display signal line.

In the above arrangement, a plurality of control signal lines are connected to the data lines through the inspection-use switching elements in correspondence with a plurality of display colors of the pixels. Therefore, in addition to the function of the first active-matrix-type liquid crystal display panel, it is possible to perform the color display in the inspection and visually detect the leakage between the data lines and the leakage defect between the adjacent pixels easily by performing the dynamic operating inspection by the above first method.

A third active-matrix-type liquid crystal display panel of the present invention is based on an active-matrix-type liquid crystal display panel including:
- an active matrix substrate having, on an insulating substrate, a plurality of pixel electrodes, pixel switching elements individually connected to the pixel electrodes, and a plurality of scanning lines and a plurality of data lines, provided in a matrix form, for driving the pixel electrodes through the pixel switching elements; and
- an opposing substrate having a common electrode, the active matrix substrate and the opposing substrate being adhered to each other with a liquid crystal layer, and the third active-matrix-type liquid crystal display panel is characterized in including:
- inspection-use switching elements for performing a switching of a supply of an inspection-use display signal, the inspection-use switching elements being connected to the plurality of data lines individually;
- a control signal line, provided for the inspection-use switching elements in common, for inputting control signals for switching on/off the inspection-use switching elements; and
- a plurality of inspection-use display signal lines for supplying inspection-use display signals to the inspection-use switching elements so that different display signals are inputted to adjacent data lines.

With this arrangement, like the first active-matrix-type liquid crystal display panel, it is unnecessary to cut off the inspection-use wiring after the inspection, and the number of processes is not increased. Further, a plurality of inspection-use display signal lines for supplying the inspection-use display signals to the inspection-use switching elements connected to the data lines are provided so that different display signals are inputted to the adjacent data lines. Therefore, like the first active-matrix-type liquid crystal display panel, the leakage between the signal lines can be electrically detected, and the visual inspection of the leakage between the data lines can be performed as well.

Moreover, in this case, by measuring the electric resistance between the inspection-use display signal lines after the inspection, it is possible to detect the leakages which are too small in amount to be visually detected between the signal lines or between the data lines (prospective defects which may be visually recognized as defects later).

A fourth active-matrix-type liquid crystal display panel is based on the third active-matrix-type liquid crystal display panel, and may be arranged so that the plurality of inspection-use display signal lines provided for the inspection-use switching elements connected to the data lines are connected to the data lines in correspondence with the plurality of display colors of the pixels through the inspection-use switching elements.

A second method of inspecting an active-matrix-type liquid crystal display panel, the active-matrix-type liquid crystal display panel being the fourth active-matrix-type liquid crystal display panel, the second method being characterized in including the step of performing a color display by sequentially switching the inspection-use display signals supplied to the plurality of inspection-use display signal lines while supplying the control signals to the control signal line.

In addition to the function of the third active-matrix-type liquid crystal display panel, since a plurality of inspection-use display signal lines are connected to the data lines through the inspection-use switching elements in correspondence with a plurality of display colors of the pixels, the color display can be performed in the inspection. In addition, like the third active-matrix-type liquid crystal display panel, it is possible to visually detect the leakage between the data lines and the leakage defect between the adjacent pixels easily by performing the dynamic operating inspection by the above second method.

Moreover, in this case, by measuring the electric resistance between the inspection-use display signal lines after the dynamic operating inspection, it is possible to detect the leakages which are too small in amount to be visually detected between the signal lines or between the data lines (prospective defects which may be visually recognized as defects later).

A fifth active-matrix-type liquid crystal display panel is based on any one of the first to fourth active-matrix-type liquid crystal display panels, and may be arranged so as to include:

inspection-use switching elements for performing a switching of a supply of an inspection-use display signal, the inspection-use switching elements connected to the plurality of scanning lines individually;

a control signal line for inputting control signals for switching on/off the inspection-use switching elements, the control signal line being provided for the inspection-use switching elements connected to the scanning lines; and an inspection-use scanning signal line for supplying an inspection-use scanning signal to the inspection-use switching elements, the inspection-use scanning signal line being provided for the inspection-use switching elements connected to the scanning lines.

With this arrangement, since inspection-use switching elements for switching the input of the inspection-use scanning signals are also provided on the scanning-line side, it is unnecessary to cut off the inspection-use wiring on the scanning-line side as well. Therefore, in the case of performing the inspection after dividing the substrate into individual liquid crystal display panels, the number of processes is not increased at all.

A sixth active-matrix-type liquid crystal display panel is based on the fifth active-matrix-type liquid crystal display panel, and may be arranged so as to include a plurality of inspection-use scanning signal lines for supplying inspection-use scanning signals to the inspection-use switching elements connected to the scanning lines so that different inspection-use scanning signals are inputted to adjacent scanning lines.

With this arrangement, the inspection-use scanning signal lines for supplying the inspection-use scanning signals to the inspection-use switching elements connected to the scanning lines are arranged so that different inspection-use scanning signal lines are connected to the adjacent scanning lines through the switching elements. Therefore, in addition to the function of the fifth active-matrix-type liquid crystal display panel, the dynamic operating inspection can be performed without a hitch in the case of the so-called Cs-on-Gate structure using the adjacent scanning line as the auxiliary capacity of the pixel electrode.

A seventh active-matrix-type liquid crystal display panel is based on the fifth or sixth active-matrix-type liquid crystal display panel, and may be arranged so that the control signal line for inputting the control signal to the inspection-use switching elements connected to the data lines and the control signal line for inputting the control signal to the inspection-use switching elements connected to the scanning lines are electrically connected to each other on the insulating substrate.

In addition to the function of the fifth or sixth active-matrix-type liquid crystal display panel, since the two control signal lines become a common control signal line, the region where the inspection-use wiring is formed can be made smaller, and the control signal can be easily inputted in the inspection and in the dynamic operation after packaging.

An eighth active-matrix-type liquid crystal display panel is based on any one of the first to seventh active-matrix-type liquid crystal display panels, and may be arranged so that a voltage for switching off the inspection-use switching elements is applied, while the liquid crystal display panel is driven, to the control signal line for inputting the control signal to the inspection-use switching elements connected to the data lines and/or the control signal line for inputting the control signal to the inspection-use switching elements connected to the scanning lines.

With this arrangement, since the voltage for switching off the inspection-use switching elements is applied to the control signal line while the liquid crystal display panel is driven, it is possible to prevent a malfunction from occurring while the liquid crystal display panel is driven.

A ninth active-matrix-type liquid crystal display panel is based on the eighth active-matrix-type liquid crystal display panel, and may be arranged to include:

an external circuit, formed on the insulating substrate, for driving the liquid crystal display panel; and wiring for driving the external circuit, the wiring being formed on the insulating substrate and including wiring for applying a ground potential, wiring to which a voltage for switching off a switching element inside a logic of an external circuit is applied, and wiring to which a voltage for defining a low level of an output voltage of an external circuit is applied, and the ninth active-matrix-type liquid crystal display panel is arranged so that the control signal line for inputting the control signal to the inspection-use switching elements connected to the data lines and/or the control signal line for inputting the control signal to the inspection-use switching elements connected to the scanning lines are/is connected to either the wiring for applying the ground potential, the wiring to which the voltage for switching off the switching element inside the logic of the external circuit is applied, or the wiring to which the voltage for defining the low level of the output voltage of the external circuit is applied.

This arrangement is a specific example of the eighth active-matrix-type liquid crystal display panel. The control signal line is arranged to be connected to any one of the wiring for driving the external circuit, i.e., either the wiring for applying the ground potential, the wiring to which a voltage for switching off the switching element inside the logic of the external circuit is applied, or the wiring to which a voltage for defining the low level of the output voltage of the external circuit is applied. With this arrangement, it is possible to prevent a malfunction from occurring while the liquid crystal display panel is driven, without newly providing another power supply system.

A tenth active-matrix-type liquid crystal display panel is based on any one of the first to eighth active-matrix-type liquid crystal display panels, and may be arranged to include a resistive element between a signal input point of the control signal line for inputting the control signal to the inspection-use switching element connected to the data line and the inspection-use switching elements connected to the control signal line, and/or between a signal input point of the control signal line for inputting the control signal to the inspection-use switching element connected to the scanning line and the inspection-use switching elements connected to the control signal line.

With this arrangement, since the resistive element is provided between the signal input point of the control signal line and the inspection-use switching elements to which the control signal line is connected, it is possible to prevent the inspection-use switching elements from being broken by the static electricity flowing through the control signal line, without a hitch in the inspection.

An eleventh active-matrix-type liquid crystal display panel is based on the ninth active-matrix-type liquid crystal display panel, and may be arranged to include a resistive element between wiring and the inspection-use switching elements connected to the control signal line connected to the wiring, the wiring being either the wiring for applying the ground potential, the wiring to which the voltage for switching off the switching element inside the logic of the external circuit is applied, or the wiring to which the voltage for defining the low level of the output voltage of the external circuit is applied.

This arrangement is based on the ninth active-matrix-type liquid crystal display panel, and counter-measures are taken against the static electricity. With the arrangement, it is possible to prevent the inspection-use switching elements from being broken by the static electricity flowing through the control signal line, without a hitch in the inspection.

A twelfth active-matrix-type liquid crystal display panel is based on the tenth or eleventh active-matrix-type liquid crystal display panel, and may be arranged so that the resistive element is a non-linear element manufactured in a same process as the pixel switching element.

In the case of the resistive element formed by the linear element, when fused by the Joule heat generated by the overcurrent due to the entry of the static electricity, the resistive element loses conductivity, and a voltage for switching off the inspection-use switching element cannot be applied thereafter. However, in the case of the non-linear element, even when the element is broken by the overcurrent, it does not lose conductivity, and the voltage for switching off the inspection-use switching element can be applied. It is thus possible to prevent a malfunction of the inspection-use switching element and improve the reliability.

A thirteenth active-matrix-type liquid crystal display panel is based on the twelfth active-matrix-type liquid crystal display panel, and may be arranged so that a plurality of non-linear elements are connected in series.

With this arrangement, in addition to the function of the twelfth active-matrix-type liquid crystal display panel, even when one of the non-linear elements is broken by the flow of the overcurrent, the function as the resistive element provided as counter-measures against the static electricity can be secured by the non-linear element in the next stage. It is thus possible to further improve the reliability, compared with the twelfth active-matrix-type liquid crystal display panel.

A fourteenth active-matrix-type liquid crystal display panel is based on any one of the first to thirteenth active-matrix-type liquid crystal display panels, and may be arranged so that an external circuit for driving the liquid crystal display panel and wiring for driving the external circuit are formed on the insulating substrate, and that the inspection-use switching elements are provided on an opposite side of the external circuit.

With this arrangement, the inspection-use switching elements are provided on the opposite side of the external circuit. Therefore, a margin in space can be achieved in pattern forming in the vicinity of the driver circuit. In addition, when the inspection-use switching elements are broken, they can be cut off as necessary.

A fifteenth active-matrix-type liquid crystal display panel is based on any one of the first to fourteenth active-matrix-type liquid crystal display panels, and may be arranged so that the inspection-use switching elements are shaded.

With this arrangement, since the inspection-use switching elements are shaded, it is possible to reduce the leakage current when the elements are switched off. Thus, when the liquid crystal display panel is driven, a malfunction can be prevented, and the problem on reliability can be eliminated.

A sixteenth active-matrix-type liquid crystal display panel is based on any one of the first to fifteenth active-matrix-type liquid crystal display panels, and may be arranged so that the inspection-use switching elements are provided so as to face a shading film formed on the opposing substrate.

With this arrangement, since the inspection-use switching elements are provided so as to face the shading film formed on the opposing substrate, the same function as that of the eleventh active-matrix-type liquid crystal display panel is produced.

A third method of inspecting an active-matrix-type liquid crystal display panel, the active-matrix-type liquid crystal display panel being any one of the first to seventh active-matrix-type liquid crystal display panels, the third method being characterized in including the step of sequentially switching the control signals supplied to the control signal line while measuring an electric resistance between the inspection-use display signal line and other wiring or a terminal.

This suggests another inspection method. In the first to seventh active-matrix-type liquid crystal display panels, the leakage defect between the data lines, etc. can be detected by performing the inspection in the above manner.

A fourth method of inspecting an active-matrix-type liquid crystal display panel, the active-matrix-type liquid crystal display panel being any one of the third to seventh active-matrix-type liquid crystal display panels, the fourth method being characterized in including the step of measuring an electric resistance between arbitrary wiring among the plurality of inspection-use display signal lines and/or the inspection-use display signal line, the inspection-use scanning signal line, the common electrode on the opposing substrate, and auxiliary capacity wiring for improving hold characteristics for a pixel electric potential, while supplying a control signal for switching on the inspection-use switching elements to the control signal line.

This suggests another inspection method. In the third to seventh active-matrix-type liquid crystal display panels, the leakage defect between arbitrary wiring can be detected by performing the inspection in the above manner.

The fifth method of inspecting an active-matrix-type liquid crystal display panel is based on any one of the first to fourth methods, and may include the step of performing an inspection while applying light to the inspection-use switching elements.

By applying light to the inspection-use switching elements in the inspection, it is possible to lower the electric resistance of the inspection-use switching elements and prevent the inspection-use switching elements from being upsized. Therefore, the decrease of the rate of non-defective units can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An active-matrix-type liquid crystal display panel comprising:
   an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;
   an opposing substrate including a common electrode, the opposing substrate being adhered to the active matrix substrate with a liquid crystal layer therebetween;

data-line inspection-use switching elements, individually connected to the plurality of data lines, for controlling a supply of an inspection-use display signal;

an inspection-use display signal line, provided for the data-line inspection-use switching elements, for supplying an inspection-use display signal to the data lines through the data-line inspection-use switching elements; and a data-line inspection-use control signal line, provided for the data-line inspection-use switching elements, for inputting control signals for switching on/off the data-line inspection-use switching elements;

wherein a voltage for switching off the data-line inspection-use switching elements is applied to the data-line inspection-use control signal line while the liquid crystal display panel is driven so that all data-line inspection-use switching elements are off when the liquid crystal display panel is driven.

2. The active-matrix-type liquid crystal display panel as set forth in claim 1, further comprising on the insulating substrate:

an external circuit for driving the liquid crystal display panel; and wiring for driving the external circuit, the wiring including: first wiring for applying a ground potential; second wiring to which a voltage for switching off a switching element inside a logic of the external circuit is applied; and third wiring to which a voltage for defining a low level of an output voltage of the external circuit is applied;

wherein the data-line inspection-use control signal line is connected to any one of the first to third wiring.

3. An active-matrix-type liquid crystal display panel comprising:

an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

an opposing substrate including a common electrode, the opposing substrate being adhered to the active matrix substrate with a liquid crystal layer therebetween;

scanning-line inspection-use switching elements, individually connected to the plurality of scanning lines, for controlling a supply of an inspection-use scanning signal;

an inspection-use scanning signal line, provided for the scanning-line inspection-use switching elements, for supplying an inspection-use scanning signal to the scanning lines through the scanning-line inspection-use switching elements; and a scanning-line inspection-use control signal line, provided for the scanning-line inspection-use switching elements, for inputting control signals for switching on/off the scanning-line inspection-use switching elements;

wherein a voltage for switching off the scanning-line inspection-use switching elements is applied to the scanning-line inspection-use control signal line while the liquid crystal display panel is driven.

4. The active-matrix-type liquid crystal display panel as set forth in claim 3, further comprising on the insulating substrate:

an external circuit for driving the liquid crystal display panel; and wiring for driving the external circuit, the wiring including: first wiring for applying a ground potential; second wiring to which a voltage for switching off a switching element inside a logic of the external circuit is applied; and third wiring to which a voltage for defining a low level of an output voltage of the external circuit is applied;

wherein the scanning-line inspection-use control signal line is connected to any one of the first to third wiring.

5. The active-matrix-type liquid crystal display panel as set forth in claim 4, further comprising a resistive element between one of the first to third wiring, connected to the scanning-line inspection-use control signal line, and the scanning-line inspection-use switching elements to which the scanning-line inspection-use control signal line is connected.

6. The active-matrix-type liquid crystal display panel as set forth in claim 5, wherein the resistive element is formed by a non-linear element manufactured in a same process as the pixel switching elements.

7. The active-matrix-type liquid crystal display panel as set forth in claim 5, wherein the resistive element is formed by a plurality of the non-linear elements connected to each other in series.

8. An active-matrix-type liquid crystal display panel comprising:

an active matrix substrate including on an insulating substrate: a plurality of pixel electrodes; pixel switching elements individually connected to the pixel electrodes; and a plurality of scanning lines and a plurality of data lines, provided in a lattice form, for driving the pixel electrodes through the pixel switching elements;

an opposing substrate including a common electrode, the opposing substrate being adhered to the active matrix substrate with a liquid crystal layer therebetween;

data-line inspection-use switching elements, individually connected to the plurality of data lines, for controlling a supply of an inspection-use display signal;

an inspection-use display signal line, provided for the data-line inspection-use switching elements for supplying an inspection-use display signal to the data lines through the data-line inspection-use switching elements;

a data-line inspection-use control signal line, provided for the data-line inspection-use switching elements for inputting control signals for switching on/off the data-line inspection-use switching elements;

wherein a voltage for switching off the data-line inspection-use switching elements is applied to the data-line inspection-use control signal line while the liquid crystal display panel is driven further comprising on the insulating substrate: an external circuit for driving the liquid crystal display panel; and wiring for driving the external circuit, the wiring including first wiring for applying a ground potential second wiring to which a voltage for switching off a switching element inside a logic of the external circuit is applied, and third wiring to which a voltage for defining a low level of an output voltage of the external circuit is applied;

wherein the data-line inspection-use control signal line is connected to any one of the first to third wiring; and a resistive element between one of the first to third wiring, connected to the data-line inspection-use control signal line, and the data-line inspection-use switching elements to which the data-line inspection-use control signal line is connected.

9. The active-matrix-type liquid crystal display panel as set forth in claim 8, wherein the resistive element is formed by a non-linear element manufactured in a same process as the pixel switching elements.

10. The active-matrix-type liquid crystal display panel as set forth in claim 8, wherein the resistive element is formed by a plurality of the non-linear elements connected to each other in series.

* * * * *